(12) United States Patent
Choi et al.

(10) Patent No.: US 12,155,863 B2
(45) Date of Patent: Nov. 26, 2024

(54) IMAGE DECODING METHOD USING TRANSFORM SKIP ENABLED FLAG AND DEPENDENT QUANTIZATION ENABLED FLAG, AND APPARATUS THEREFOR

(71) Applicant: LG ELECTRONICS INC., Seoul (KR)

(72) Inventors: Jungah Choi, Seoul (KR); Sunmi Yoo, Seoul (KR); Jaehyun Lim, Seoul (KR); Jin Heo, Seoul (KR); Jangwon Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/894,026

(22) Filed: Aug. 23, 2022

(65) Prior Publication Data
US 2022/0408095 A1 Dec. 22, 2022

Related U.S. Application Data

(63) Continuation of application No. PCT/KR2021/002403, filed on Feb. 25, 2021.
(Continued)

(51) Int. Cl.
*H04N 19/60* (2014.01)
*H04N 19/12* (2014.01)
(Continued)

(52) U.S. Cl.
CPC ............. *H04N 19/60* (2014.11); *H04N 19/12* (2014.11); *H04N 19/124* (2014.11);
(Continued)

(58) Field of Classification Search
None
See application file for complete search history.

(56) References Cited

U.S. PATENT DOCUMENTS

| | | |
|---|---|---|
| 2013/0294524 A1 | 11/2013 | Van Der Auwera et al. |
| 2014/0146894 A1 | 5/2014 | Yu et al. |

(Continued)

FOREIGN PATENT DOCUMENTS

| | | | |
|---|---|---|---|
| CN | 113301338 A | 8/2021 | |
| WO | WO-2021136789 A1 * | 7/2021 | ............. H04N 19/12 |

OTHER PUBLICATIONS

Benjamin Bross et al., "Versatile Video Coding (Draft 8)", JVET-Q2001-vB, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-481, see pp. 40, 58-60, 69, 80-86, 105, 120, 146, 169, 179-187 and 305-334.

(Continued)

*Primary Examiner* — Mohammed Jebari
(74) *Attorney, Agent, or Firm* — Bryan Cave Leighton Paisner LLP

(57) ABSTRACT

An image decoding method performed by a decoding apparatus, according to the present document, comprises the steps of: acquiring a transform skip available flag; acquiring a TSRC available flag on the basis of the transform skip available flag; acquiring prediction-related information regarding a current block; deriving a prediction sample of the current block on the basis of the prediction-related information; acquiring residual information of a residual coding syntax for the current block, derived on the basis of the TSRC available flag; deriving a residual sample of the current block on the basis of the residual information; and generating a reconstructed picture on the basis of the prediction sample and the residual sample.

11 Claims, 18 Drawing Sheets

Related U.S. Application Data

(60) Provisional application No. 62/981,473, filed on Feb. 25, 2020.

(51) Int. Cl.

| | | |
|---|---|---|
| *H04N 19/124* | (2014.01) |
| *H04N 19/132* | (2014.01) |
| *H04N 19/176* | (2014.01) |
| *H04N 19/46* | (2014.01) |
| *H04N 19/70* | (2014.01) |

(52) U.S. Cl.
CPC ........... *H04N 19/176* (2014.11); *H04N 19/70* (2014.11); *H04N 19/132* (2014.11); *H04N 19/46* (2014.11)

(56) References Cited

U.S. PATENT DOCUMENTS

| | | | |
|---|---|---|---|
| 2021/0112279 A1* | 4/2021 | Karczewicz | H04N 19/46 |
| 2022/0141495 A1* | 5/2022 | Kim | H04N 19/119 375/240.26 |
| 2022/0224942 A1* | 7/2022 | Hashimoto | H04N 19/157 |
| 2023/0254509 A1* | 8/2023 | Hashimoto | H04N 19/176 375/240.18 |
| 2024/0171777 A1* | 5/2024 | Hashimoto | H04N 19/70 |

OTHER PUBLICATIONS

Zhi-Yi Lin et al., "CE3-related: TB-level residual coding selection for lossless coding", JVET-Q0186-v1, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7, see pp. 1-2.

Mohammed Golam Sarwer et al., "CE3-related: CTU level local lossless coding of VVC", JVET-Q0294-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-6, see pp. 1-3.

Benjamin Bross, et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q2001-vC.

Shih-Ta Hsiang, et al., "AHG9: HLS on disabling TSRC", Joint Video Experts Team (JVET) of ITU-T SG 16 WP 3 and ISO/IEC JTC 1/SC 29/WG 11, 18th Meeting: by teleconference, Apr. 15-24, 2020 JVET-R0049-v1.

Jungah Choi, et al., "AHG9/AHG16: On slice_ts_residual_coding_disabled_flag", Joint Video Experts Team (JVET) of ITU-T SG 16 WP 3 and ISO/IEC JTC 1/SC 29/WG 11, 18th Meeting: by teleconference, Apr. 15-24, 2020. JVET-R0153-v3.

* cited by examiner

IMAGE DECODING METHOD USING TRANSFORM SKIP ENABLED FLAG AND DEPENDENT QUANTIZATION ENABLED FLAG, AND APPARATUS THEREFOR

This application is a Continuation Application of International Application No. PCT/KR2021/002403, filed on Feb. 25, 2021, which claims the benefit of U.S. Provisional Application No. 62/981,473, filed on Feb. 25, 2020, the contents of which are all hereby incorporated by reference herein in their entirety.

BACKGROUND OF THE DISCLOSURE

Field of the Disclosure

The present disclosure relates to an image coding technology, and more particularly, to an image decoding method and an apparatus thereof, which code flag information representing whether TSRC is enabled in coding residual data of a current block in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

The present disclosure also provides a method and apparatus for improving residual coding efficiency.

According to an embodiment of the present disclosure, an image decoding method performed by a decoding apparatus is provided. The method includes: obtaining a transform skip enabled flag; obtaining a transform skip residual coding (TSRC) enabled flag based on the transform skip enabled flag; obtaining prediction related information for a current block; deriving a prediction sample of the current block based on the prediction related information; obtaining residual information of a residual coding syntax for the current block derived based on the TSRC enabled flag; deriving a residual sample of the current block based on the residual information; and generating a reconstructed picture based on the prediction sample and the residual sample, wherein the transform skip enabled flag is information for whether transform skip is enabled, wherein the TSRC enabled flag is information for whether TSRC is enabled, and wherein the TSRC enabled flag is obtained based on the transform skip enabled flag having a value of 1.

According to another embodiment of the present disclosure, a decoding apparatus performing image decoding is provided. The decoding apparatus includes: an entropy decoder configured to: obtain a transform skip enabled flag, obtain a transform skip residual coding (TSRC) enabled flag based on the transform skip enabled flag, obtain prediction related information for a current block, and obtain residual information of a residual coding syntax for the current block derived based on the TSRC enabled flag; a predictor configured to derive a prediction sample of the current block based on the prediction related information; a residual processor configured to derive a residual sample of the current block based on the residual information; and an adder configured to generate a reconstructed picture based on the prediction sample and the residual sample, wherein the transform skip enabled flag is information for whether transform skip is enabled, wherein the TSRC enabled flag is information for whether TSRC is enabled, and wherein the TSRC enabled flag is obtained based on the transform skip enabled flag having a value of 1.

According to still another embodiment of the present disclosure, a video encoding method performed by an encoding apparatus is provided. The method includes: deriving a prediction sample of a current block based on inter prediction or intra prediction; deriving a residual sample of the current block based on the prediction sample; encoding prediction related information for the current block; encoding a transform skip enabled flag for whether transform skip is enabled and a transform skip residual coding (TSRC) enabled flag for whether TSRC is enabled; encoding residual information of a residual coding syntax for the residual sample derived based on the TSRC enabled flag; and generating a bitstream including the prediction related information, the transform skip enabled flag, the TSRC enabled flag, and the residual information, wherein the TSRC enabled flag is encoded based on the transform skip enabled flag having a value of 1.

According to still another embodiment of the present disclosure, a video encoding apparatus is provided. The encoding apparatus includes a predictor configured to derive a prediction sample of a current block based on inter prediction or intra prediction; a residual processor configured to derive a residual sample of the current block based on the prediction sample; and an entropy encoder configured to: encode prediction related information for the current block, encode a transform skip enabled flag for whether transform skip is enabled and a transform skip residual coding (TSRC) enabled flag for whether TSRC is enabled, encode residual information of a residual coding syntax for the residual sample derived based on the TSRC enabled flag, and generate a bitstream including the prediction related information, the transform skip enabled flag, the TSRC enabled flag, and the residual information, wherein the TSRC enabled flag is encoded based on the transform skip enabled flag having a value of 1.

According to still another embodiment of the present disclosure, a non-transitory computer-readable storage medium storing a bitstream including image information causing to perform an image decoding method is provided. In the non-transitory computer-readable storage medium, the image decoding method includes: obtaining a transform skip enabled flag; obtaining a transform skip residual coding (TSRC) enabled flag based on the transform skip enabled flag; obtaining prediction related information for a current block; deriving a prediction sample of the current block based on the prediction related information; obtaining residual information of a residual coding syntax for the current block derived based on the TSRC enabled flag; deriving a residual sample of the current block based on the residual information; and generating a reconstructed picture based on the prediction sample and the residual sample, wherein the transform skip enabled flag is information for whether transform skip is enabled, wherein the TSRC enabled flag is information for whether TSRC is enabled, and wherein the TSRC enabled flag is obtained based on the transform skip enabled flag having a value of 1.

According to the present disclosure, the residual coding efficiency can be enhanced.

According to the present disclosure, the signaling relationship between a dependent quantization enabled flag and a TSRC enabled flag is established, and if the dependent quantization is not enabled, the TSRC enabled flag can be signaled, and through this, if the TSRC is not enabled and an RRC syntax is coded for a transform skip block, the dependent quantization is not to be used, so that the coding efficiency is improved, and the overall residual coding efficiency can be improved through reduction of the amount of bits being coded.

According to the present disclosure, the signaling relationship between a transform skip enabled flag and the TSRC enabled flag is established, and if the transform skip is enabled, the TSRC enabled flag can be signaled, and through this, the overall residual coding efficiency can be improved through reduction of the amount of bits being coded.

DESCRIPTION OF EXEMPLARY EMBODIMENTS

Figure 1:
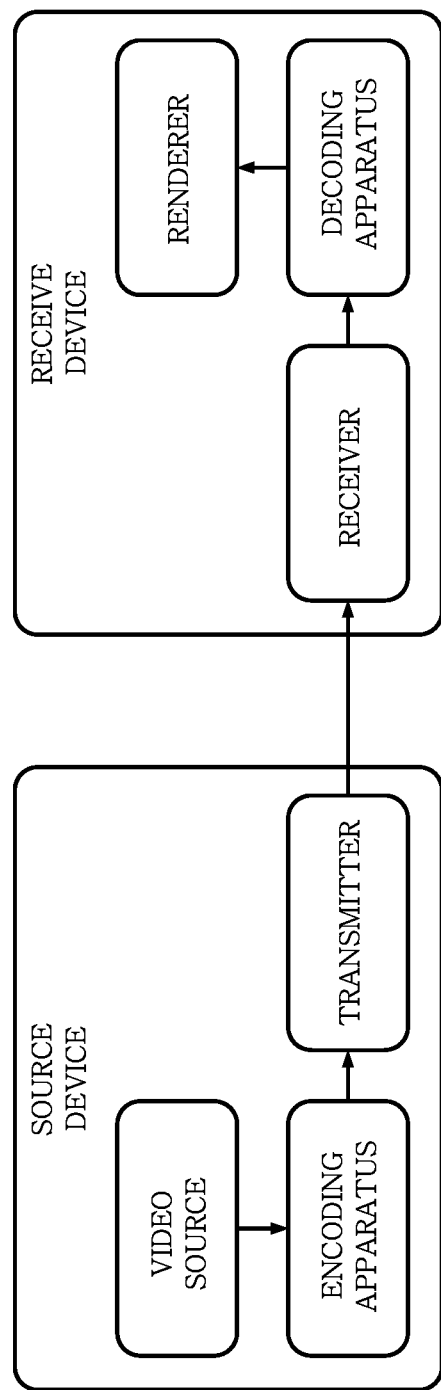
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
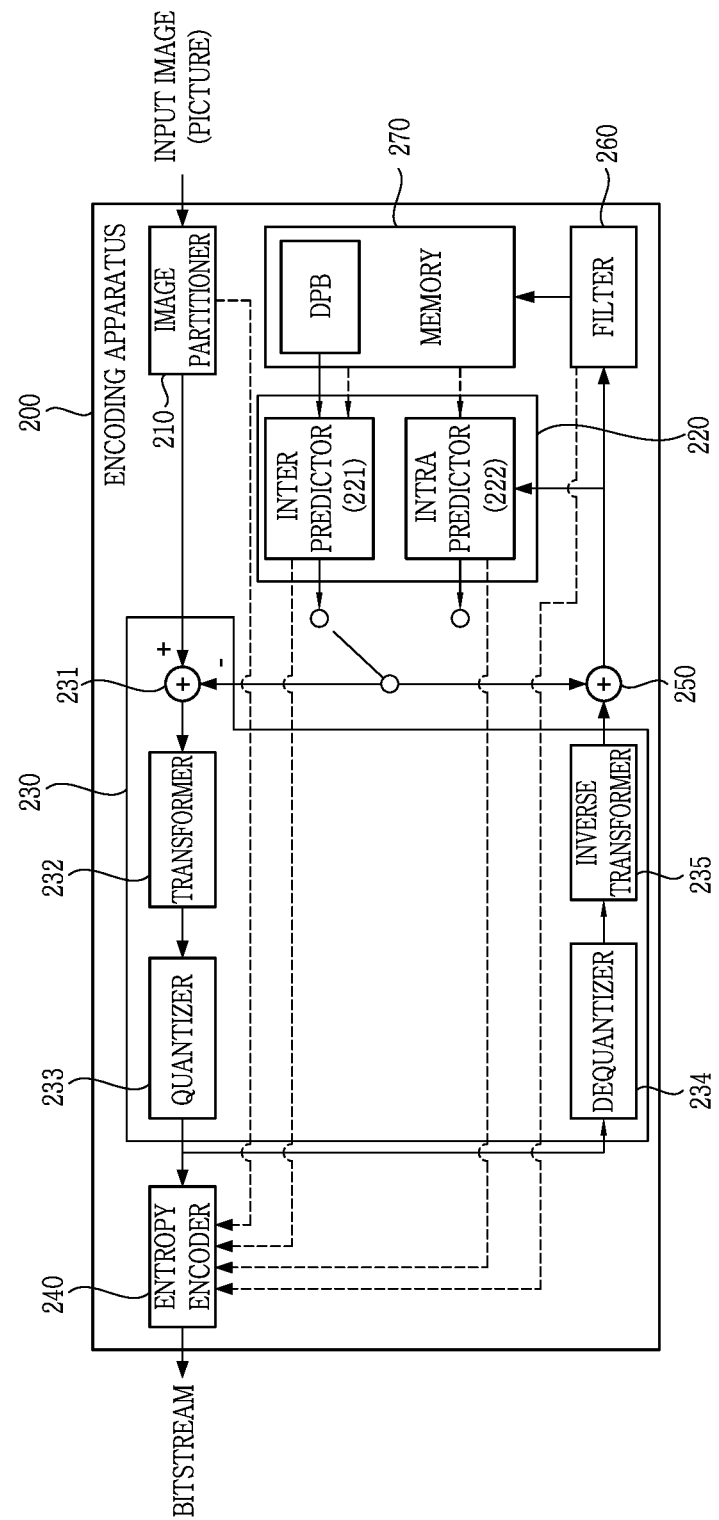
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
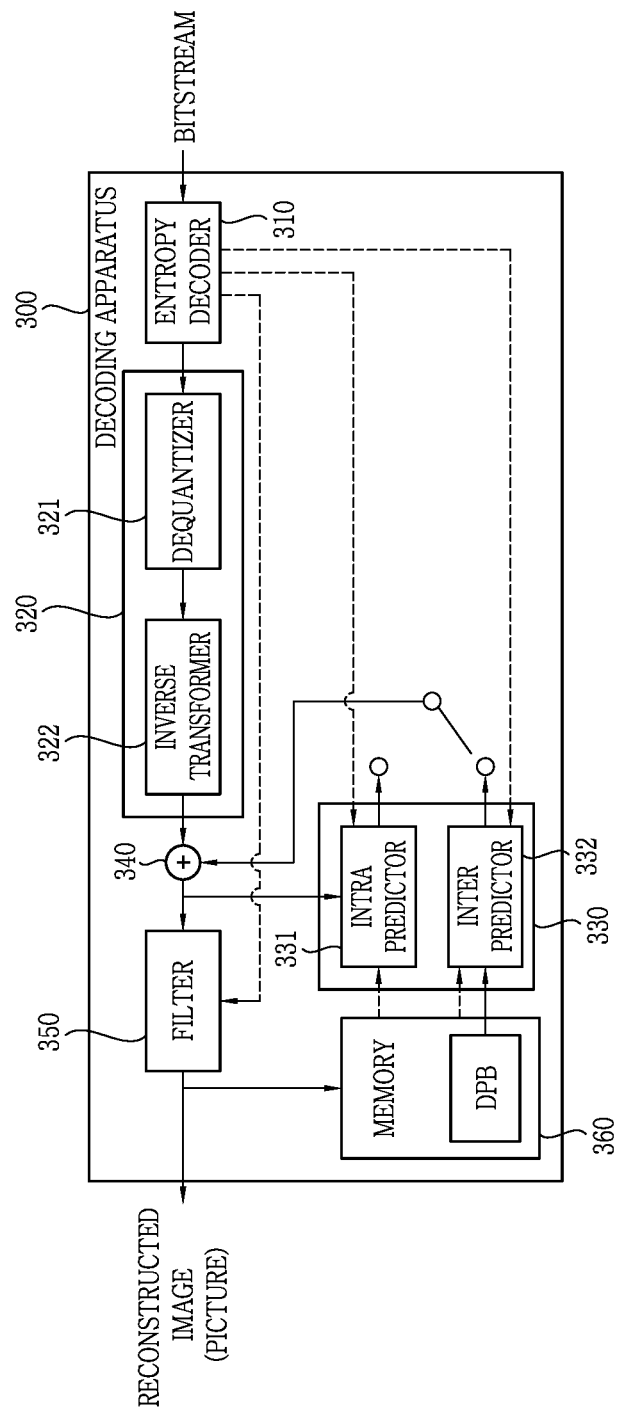
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample.

Figure 4:
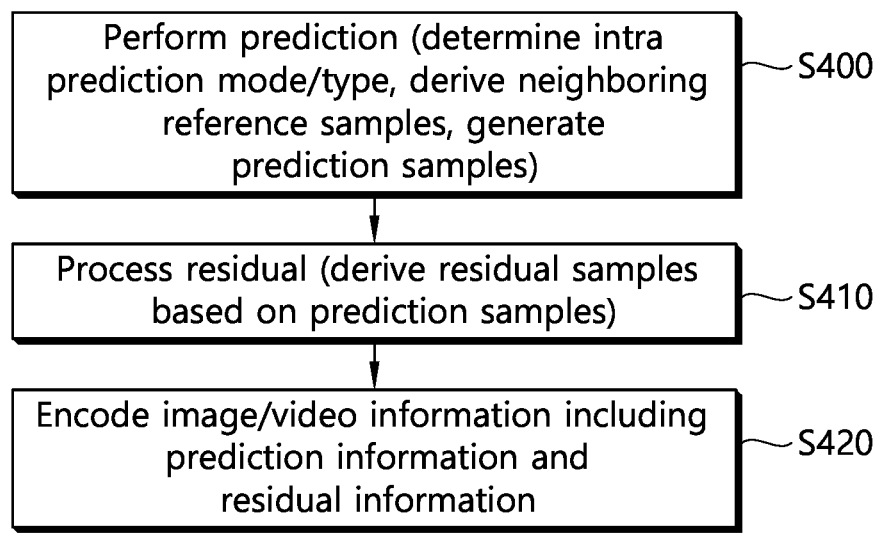
FIG. 4 illustrates an example of an intra prediction based video/image encoding method.

FIG. 4 illustrates an example of an intra prediction based video/image encoding method.

Referring to FIG. 4, the encoding device performs intra prediction on the current block S400. The encoding device derives an intra prediction mode/type for the current block, derives neighboring reference samples of the current block, generates prediction samples in the current block based on the intra prediction mode/type and the neighboring reference samples. Here, the intra prediction mode/type determination, neighboring reference samples derivation, and prediction samples generation procedures may be performed simultaneously, or one procedure may be performed before another procedure. The encoding device may determine a mode/type applied to the current block from among a plurality of intra prediction modes/types. The encoding device may compare RD costs for the intra prediction mode/types and determine an optimal intra prediction mode/type for the current block.

Meanwhile, the encoding device may perform a prediction sample filtering procedure. The prediction sample filtering may be referred to as post filtering. Some or all of the prediction samples may be filtered by the prediction sample filtering procedure. In some cases, the prediction sample filtering procedure may be omitted.

The encoding device generates residual samples for the current block based on the (filtered) prediction samples S410. The encoding device may compare the prediction samples in the original samples of the current block based on the phase and derive the residual samples.

The encoding device may encode image information including information on the intra prediction (prediction information) and residual information on the residual samples S420. The prediction information may include the intra prediction mode information and the intra prediction type information. The encoding device may output encoded image information in the form of a bitstream. The output bitstream may be transmitted to the decoding device through a storage medium or a network.

The residual information may include residual coding syntax, which will be described later. The encoding device may transform/quantize the residual samples to derive quantized transform coefficients. The residual information may include information on the quantized transform coefficients.

Meanwhile, as described above, the encoding device may generate a reconstructed picture (including reconstructed samples and reconstructed blocks). To this end, the encoding device may derive (modified) residual samples by performing inverse quantization/inverse transformation on the quantized transform coefficients again. The reason for performing the inverse quantization/inverse transformation again after transforming/quantizing the residual samples in this way is to derive the same residual samples as the residual samples derived in the decoding device as described above. The encoding device may generate a reconstructed block including reconstructed samples for the current block based on the prediction samples and the (modified) residual samples. A reconstructed picture for the current picture may be generated based on the reconstructed block. As described above, an in-loop filtering procedure may be further applied to the reconstructed picture.

Figure 5:
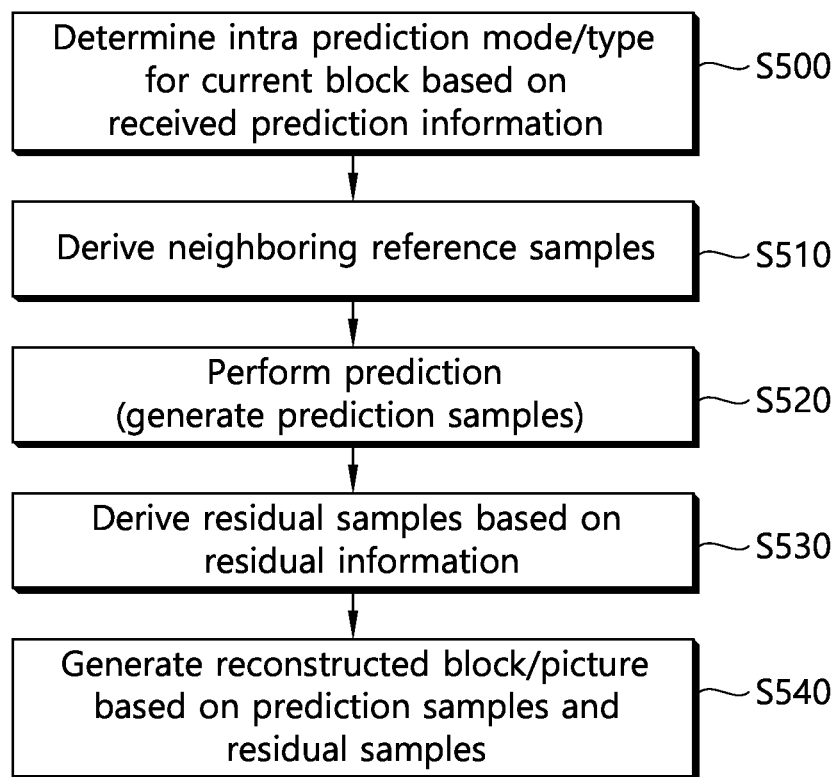
FIG. 5 illustrates an example of an intra prediction based video/image encoding method.

FIG. 5 illustrates an example of an intra prediction based video/image decoding method.

The decoding device may perform an operation corresponding to the operation performed by the encoding apparatus.

Prediction information and residual information may be obtained from a bitstream. Residual samples for the current block may be derived based on the residual information. Specifically, transform coefficients may be derived by performing inverse quantization based on the quantized transform coefficients derived based on the residual information, residual samples for the current block may be derived by performing inverse transform on the transform coefficients.

Specifically, the decoding device may derive the intra prediction mode/type for the current block based on the received prediction information (intra prediction mode/type information) S500. The decoding device may derive neighboring reference samples of the current block S510. The decoding device generates prediction samples in the current block based on the intra prediction mode/type and the neighboring reference samples S520. In this case, the decoding device may perform a prediction sample filtering procedure. The Predictive sample filtering may be referred to as post filtering. Some or all of the prediction samples may be filtered by the prediction sample filtering procedure. In some cases, the prediction sample filtering procedure may be omitted.

The decoding device generates residual samples for the current block based on the received residual information S530. The decoding device may generate reconstructed samples for the current block based on the prediction samples and the residual samples, and may derive a reconstructed block including the reconstructed samples S540. A reconstructed picture for the current picture may be generated based on the reconstructed block. As described above, an in-loop filtering procedure may be further applied to the reconstructed picture.

The intra prediction mode information may include, for example, flag information (ex. intra_luma_mpm_flag) indicating whether MPM (most probable mode) is applied to the current block or whether a remaining mode is applied, and, when the MPM is applied to the current block, the prediction mode information may further include index information (e.g., intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information includes remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

Also, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

The intra prediction mode information and/or the intra prediction type information may be encoded/decoded through a coding method described in the present disclosure. For example, the intra prediction mode information and/or the intra prediction type information may be encoded/decoded through entropy coding (e.g., CABAC, CAVLC).

Figure 6:
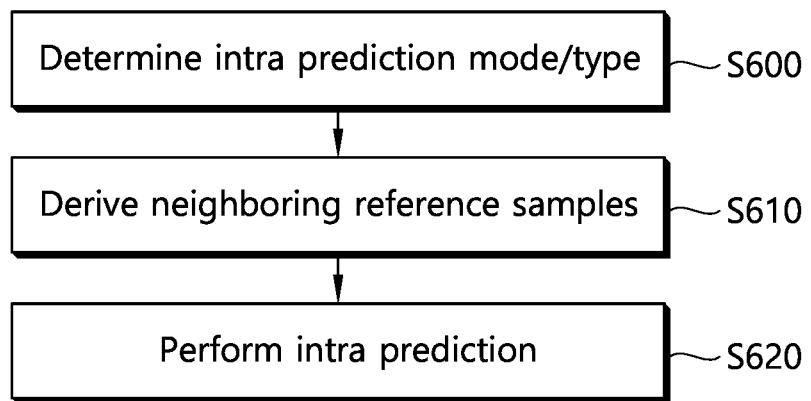
FIG. 6 schematically shows an intra prediction procedure.

FIG. 6 schematically shows an intra prediction procedure.

Referring to FIG. 6, as described above, the intra prediction procedure may include a step of determining an intra prediction mode/type, a step of deriving neighboring reference samples, and a step of performing intra prediction (generating a prediction sample). The intra prediction procedure may be performed by the encoding device and the decoding device as described above. In the present disclosure, a coding device may include the encoding device and/or the decoding device.

Referring to FIG. 6, the coding device determines an intra prediction mode/type S600.

The encoding device may determine an intra prediction mode/type applied to the current block from among the various intra prediction modes/types described above, and may generate prediction related information. The prediction related information may include intra prediction mode information representing an intra prediction mode applied to the current block and/or intra prediction type information representing an intra prediction type applied to the current block. The decoding device may determine an intra prediction mode/type applied to the current block based on the prediction related information.

The intra prediction mode information may include, for example, flag information (ex. intra_luma_mpm_flag) representing whether a most probable mode (MPM) is applied to the current block or a remaining mode is applied, and the When the MPM is applied to the current block, the prediction mode information may further include index information (e.g., intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information may further include remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

For example, when intra prediction is applied, an intra prediction mode applied to the current block may be determined using an intra prediction mode of a neighboring block. For example, the coding device may select one of most probable mode (MPM) candidates in the MPM list derived based on additional candidate modes and/or an intra prediction mode of the neighboring block (e.g., the left and/or top neighboring block) of the current block, or select one of the remaining intra prediction modes not included in the MPM candidates (and planar mode) based on the MPM remainder information (remaining intra prediction mode information). The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (ex. intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (e.g., intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (ex. intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (ex. intra_luma_mpm_flag), the not planar flag (ex. intra_luma_not_planar_flag), the MPM index (ex. mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList.

When the MIP is applied to the current block, a separate mpm flag (ex. intra_mip_mpm_flag) for the MIP, an mpm index (ex. intra_mip_mpm_idx), and remaining intra prediction mode information (ex. intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

The coding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoding device may perform prediction based on various intra prediction modes, and may determine an optimal intra prediction mode based on rate-distortion optimization (RDO) based thereon. In this case, the encoding device may determine the optimal intra prediction mode by using only the MPM candidates and planar mode configured in the MPM list, or by further using the remaining intra prediction modes as well as the MPM candidates and planar mode configured in the MPM list. Specifically, for example, if the intra prediction type of the current block is a specific type (ex. LIP, MRL, or ISP) other than the normal intra prediction type, the encoding device may determine the optimal intra prediction mode by considering only the MPM candidates and the planar mode as intra prediction mode candidates for the current block. That is, in this case, the intra prediction mode for the current block may be determined only from among the MPM candidates and the planar mode, and in this case, encoding/signaling of the mpm flag may not be performed. In this case, the decoding device may infer that the mpm flag is 1 without separately signaling the mpm flag.

Meanwhile, in general, when the intra prediction mode of the current block is not the planar mode and is one of the MPM candidates in the MPM list, the encoding device generates an mpm index (mpm idx) indicating one of the MPM candidates. when the intra prediction mode of the current block is not included in the MPM list, the encoding device generates MPM reminder information (remaining intra prediction mode information) indicating the same mode as the intra prediction mode of the current block among the remaining intra prediction modes not included in the MPM list (and planar mode). The MPM reminder information may include, for example, an intra_luma_mpm_remainder syntax element.

The decoding device obtains intra prediction mode information from the bitstream. As described above, the intra prediction mode information may include at least one of an MPM flag, a not planner flag, an MPM index, and MPM remaster information (remaining intra prediction mode information). The decoding device may construct the MPM list. The MPM list is constructed the same as the MPM list constructed in the encoding device. That is, the MPM list may include intra prediction modes of neighboring blocks, or may further include specific intra prediction modes according to a predetermined method.

The decoding device may determine the intra prediction mode of the current block based on the MPM list and the intra prediction mode information. For example, when the value of the MPM flag is 1, the decoding device may derive the planar mode as the intra prediction mode of the current block (based on not planar flag) or derive the candidate indicated by the MPM index from among the MPM candidates in the MPM list as the intra prediction mode of the current block. Here, the MPM candidates may represent only candidates included in the MPM list, or may include not only candidates included in the MPM list but also the planar mode applicable when the value of the MPM flag is 1.

As another example, when the value of the MPM flag is 0, the decoding device may derive an intra prediction mode indicated by the remaining intra prediction mode information (which may be referred to as mpm remainder information) among the remaining intra prediction modes not included in the MPM list and the planner mode as the intra prediction mode of the current block. Meanwhile, as another example, when the intra prediction type of the current block is a specific type (ex. LIP, MRL or ISP, etc.), the decoding device may derive a candidate indicated by the MPM flag in the planar mode or the MPM list as the intra prediction mode of the current block without parsing/decoding/checking the MPM flag.

The coding device derives neighboring reference samples of the current block S610. When intra prediction is applied to the current block, the neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

On the other hand, when the MRL is applied (that is, when the value of the MRL index is greater than 0), the neighboring reference samples may be located on lines 1 to 2 instead of line 0 adjacent to the current block on the left/top side, and in this case, the number of the neighboring reference samples may be further increased. Meanwhile, when the ISP is applied, the neighboring reference samples may be derived in units of sub-partitions.

The coding device derives prediction samples by performing intra prediction on the current block S620. The coding device may derive the prediction samples based on the intra prediction mode/type and the neighboring samples. The coding device may derive a reference sample according to an intra prediction mode of the current block among neighboring reference samples of the current block, and may derive a prediction sample of the current block based on the reference sample.

Meanwhile, when inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

A video/image encoding process based on inter prediction may schematically include, for example, the following.

Figure 7:
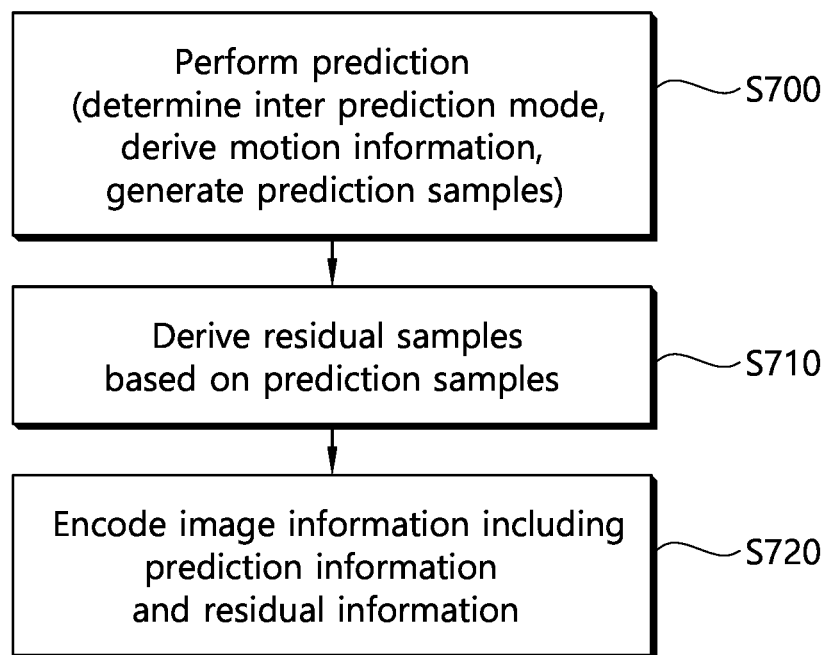
FIG. 7 illustrates an example of an inter prediction based video/image encoding method.

FIG. 7 illustrates an example of an inter prediction based video/image encoding method.

The encoding apparatus performs the inter prediction for the current block (S700). The encoding apparatus may derive the inter prediction mode and the motion information of the current block and generate the prediction samples of the current block. Here, an inter prediction mode determining process, a motion information deriving process, and a generation process of the prediction samples may be simultaneously performed and any one process may be performed earlier than other process. For example, the inter-prediction unit of the encoding apparatus may include a prediction mode determination unit, a motion information derivation unit, and a prediction sample derivation unit, and the prediction mode determination unit may determine the prediction mode for the current block, the motion information derivation unit may derive the motion information of the current block, and the prediction sample derivation unit may derive the prediction samples of the current block. For example, the inter-prediction unit of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S710). The encoding apparatus may derive the residual samples by comparing original samples and the prediction samples of the current block.

The encoding apparatus encodes image information including prediction information and residual information (S720). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering process may be further applied to the reconstruction picture as described above.

A video/image decoding process based on inter prediction may schematically include, for example, the following.

Figure 8:
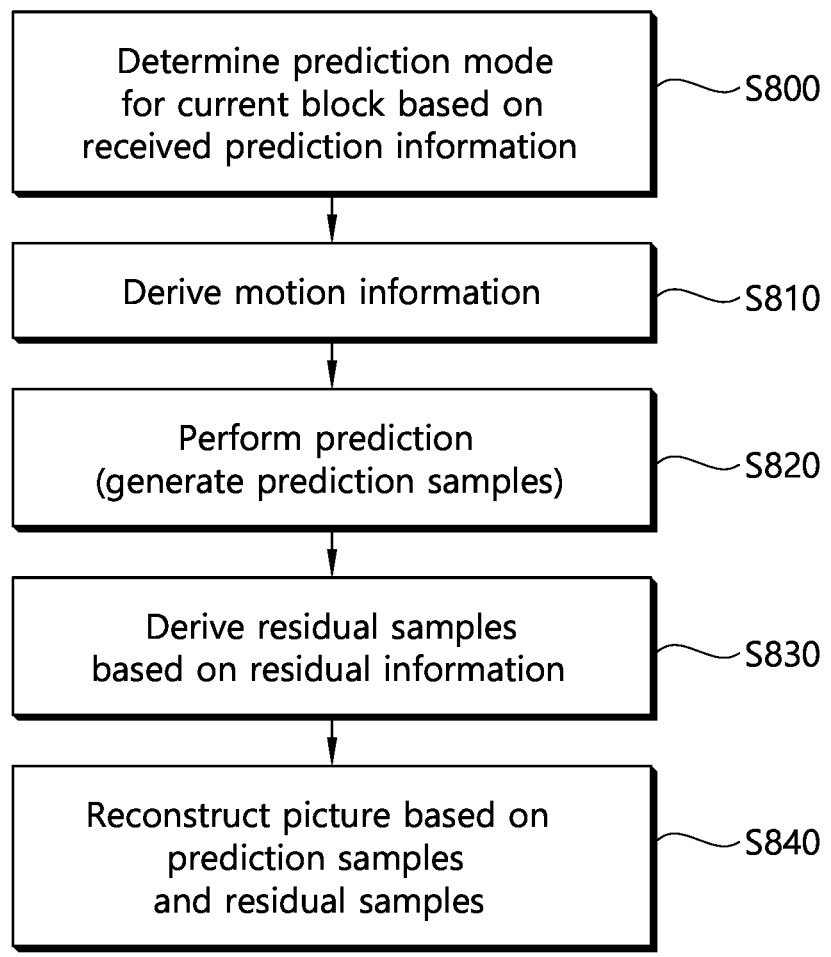
FIG. 8 illustrates an example of an inter prediction based video/image decoding method.

FIG. 8 illustrates an example of an inter prediction based video/image decoding method.

Referring to FIG. 8, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S800). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S810). For example, when the skip mode or the merge mode is applied to the current block, the decoding apparatus may configure the merge candidate list to be described below and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, as described below, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S820). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit of the decoding apparatus may include a prediction mode determination unit, a motion information derivation unit, and a prediction sample derivation unit, and the prediction mode determination unit may determine the prediction mode for the current block based on the received prediction mode information, the motion information derivation unit may derive the motion information (the motion vector and/or reference picture index) of the current block based on the information on the received motion information, and the prediction sample derivation unit may derive the predicted samples of the current block.

The decoding apparatus generates the residual samples for the current block based on the received residual information (S830). The decoding apparatus may generate the reconstruction samples for the current block based on the prediction samples and the residual samples and generate the reconstruction picture based on the generated reconstruction samples (S840). Thereafter, the in-loop filtering procedure may be further applied to the reconstruction picture as described above.

Figure 9:
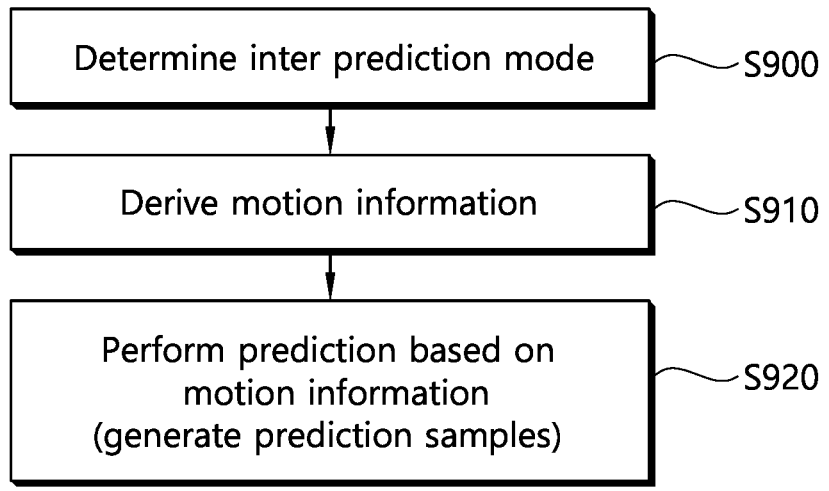
FIG. 9 schematically shows an inter prediction procedure.

FIG. 9 schematically shows an inter prediction procedure.

Referring to FIG. 9, as described above, the inter prediction process may include an inter prediction mode determination step, a motion information derivation step according to the determined prediction mode, and a prediction processing (prediction sample generation) step based on the derived motion information. The inter prediction process may be performed by the encoding apparatus and the decoding apparatus as described above. In the present disclosure, a coding device may include the encoding apparatus and/or the decoding apparatus.

Referring to FIG. 9, the coding apparatus determines an inter prediction mode for the current block (S900). Various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present disclosure, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

The coding apparatus derives motion information for the current block (S910). Motion information derivation may be derived based on the inter prediction mode.

The coding apparatus may perform inter prediction using motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

The coding apparatus performs inter prediction based on motion information for the current block (S920). The coding apparatus may derive prediction sample(s) for the current block based on the motion information. A current block including prediction samples may be referred to as a predicted block.

Meanwhile, as described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 10:
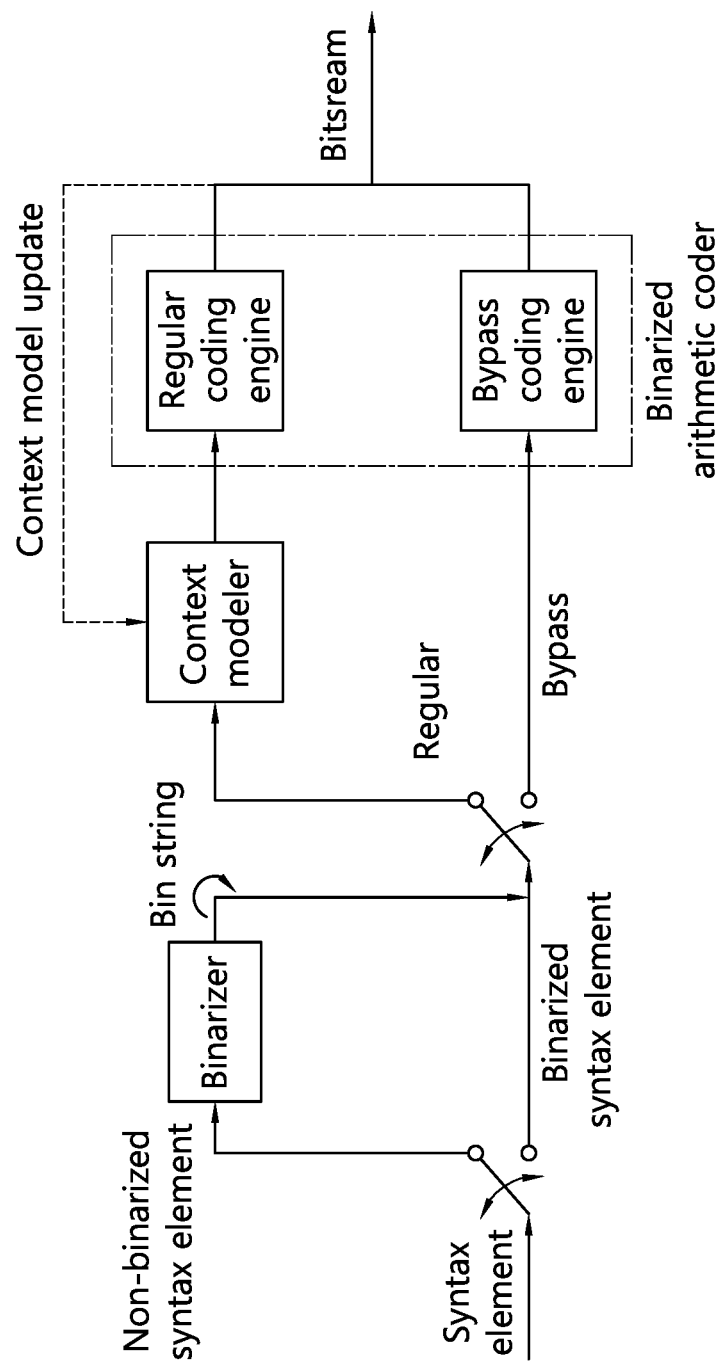
FIG. 10 exemplarily shows context-adaptive binary arithmetic coding (CABAC) for encoding a syntax element.

FIG. 10 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

For example, syntax elements related to residual data encoding/decoding may be represented as shown in the following table.

TABLE 1

| | Descriptor |
|---|---|
| transform_unit( x0, y0, tbWidth, tbHeight, treeType, subTuIndex, chType ) { | |
|   if( IntraSubPartitionsSplitType != ISP_NO_SPLIT && | |
|       treeType = = SINGLE_TREE && subTuIndex = = NumIntraSubPartitions − 1 ) { | |
|     xC = CbPosX[ chType ][ x0 ][ y0 ] | |
|     yC = CbPosY[ chType ][ x0 ‖ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && sps_chroma_format_idc != 0 && | |
|     ( IntraSubPartitionsSplitType = = ISP_NO_SPLIT ‖ | |
|     ( IntraSubPartitionsSplitType != ISP_NO_SPLIT && | |
|     subTuIndex = = NumIntraSubPartitions − 1 ) ) | |
|   if( ( treeType = = SINGLE_TREE ‖ treeType = = DUAL_TREE_CHROMA ) && | |
|      sps_chroma_format_idc != 0 && | |
|      ( ( IntraSubPartitionsSplitType = = ISP_NO_SPLIT && !( cu_sbt_flag && | |
|       ( ( subTuIndex = = 0 && cu_sbt_pos_flag ) ‖ | |
|       ( subTuIndex = = 1 && !cu_sbt_pos_flag ) ) ) ‖ | |
|      ( IntraSubPartitionsSplitType != ISP_NO_SPLIT && | |
|      ( subTuIndex = = NumIntraSubPartitions − 1 ) ) ) ) { | |
|     tu_cb_coded_flag[ xC ][ yC ] | ae(v) |
|     tu_cr_coded_flag[ xC ][ yC ] | ae(v) |
|   } | |
|   if( treeType = = SINGLE_TREE ‖ treeType = = DUAL_TREE_LUMA ) { | |
|     if( ( IntraSubPartitionsSplitType = = ISP_NO_SPLIT && !( cu_sbt_flag && | |
|        ( ( subTuIndex = = 0 && cu_sbt_pos_flag ) ‖ | |
|        ( subTuIndex = = 1 && !cu_sbt_pos_flag ) ) && | |
|        ( ( CuPredMode[ chType ][ x0 ][ y0 ] = = MODE_INTRA && | |
|        !cu_act_enabled_flag[ x0 ][ y0 ] ) ‖ | |
|        ( chromaAvailable && ( tu_cb_coded_flag[ xC ][ yC ] ‖ | |
|        tu_cr_coded_flag[ xC ][ yC ] ) ) ‖ | |
|        CbWidth[ chType ][ x0 ][ y0 ] > MaxTbSizeY ‖ | |
|        CbHeight[ chType ][ x0 ][ y0 ] > MaxTbSizeY ) ) ‖ | |
|       ( IntraSubPartitionsSplitType != ISP_NO_SPLIT && | |
|       ( subTuIndex < NumIntraSubPartitions − 1 ‖ !InferTuCbfLuma ) ) ) | |
|       tu_y_coded_flag[ x0 ][ y0 ] | ae(v) |
|     if(IntraSubPartitionsSplitType != ISP_NO_SPLIT ) | |
|       InferTuCbfLuma = InferTuCbfLuma && !tu_y_coded_flag[ x0 ][ y0 ] | |
|   } | |

TABLE 1-continued

| | Descriptor |
|---|---|
| `if( ( CbWidth[ chType ][ x0 ][ y0 ] > 64 || CbHeight[ chType ][ x0 ]`<br>`[ y0 ] > 64 ||`<br>    `tu_y_coded_flag[ x0 ][ y0 ] || ( chromaAvailable && ( tu_cb_coded_flag`<br>`[ xC ][ yC ] ||`<br>    `tu_cr_coded_flag[ xC ][ yC ] ) ) && treeType != DUAL_TREE_`<br>`CHROMA &&`<br>    `pps_cu_qp_delta_enabled_flag && !IsCuQpDeltaCoded ) {`<br>        `cu_qp_delta_abs` | ae(v) |
|         `if( cu_qp_delta_abs )`<br>            `cu_qp_delta_sign_flag`<br>`}`<br>    `if( ( CbWidth[ chType ][ x0 ][ y0 ] > 64 || CbHeight[ chType ][ x0 ]`<br>`[ y0 ] > 64 ||`<br>    `( chromaAvailable && ( tu_cb_coded_flag[ xC ][ yC ] ||`<br>    `tu_cr_coded_flag[ xC ][ yC ] ) ) &&`<br>    `treeType != DUAL_TREE_LUMA && sh_cu_chroma_qp_offset_`<br>`enabled_flag &&`<br>    `!IsCuChromaQpOffsetCoded ) {`<br>        `cu_chroma_qp_offset_flag` | ae(v)<br><br>ae(v) |
|         `if( cu_chroma_qp_offset_flag && pps_chroma_qp_offset_list_len_minus1 >`<br>`0 )`<br>            `cu_chroma_qp_offset_idx` | ae(v) |
| `}`<br>    `if( sps_joint_cbcr_enabled_flag && ( ( CuPredMode[ chType ][ x0 ][ y0 ] == `<br>`MODE_INTRA`<br>        `&& ( tu_cb_coded_flag[ xC ][ yC ] || tu_cr_coded_flag[ xC ][ yC ] ) ) ||`<br>        `( tu_cb_coded_flag[ xC ][ yC ] && tu_cr_coded_flag [ xC ][ yC ] ) ) &&`<br>        `chromaAvailable )`<br>    `tu_joint_cbcr_residual_flag[ xC ][ yC ]` | ae(v) |
| `if( tu_y_coded_flag[ x0 ][ y0 ] && treeType != DUAL_TREE_CHROMA ) {`<br>    `if( sps_transform_skip_enabled_flag && !BdpcmFlag[ x0 ][ y0 ][ 0 ] &&`<br>        `tbWidth <= MaxTsSize && tbHeight <= MaxTsSize &&`<br>        `( IntraSubPartitionsSplitType == ISP_NO_SPLIT ) && !cu_sbt_flag )`<br>        `transform_skip_flag[ x0 ][ y0 ][ 0 ]` | ae(v) |
|     `if( !transform_skip_flag[ x0 ][ y0 ][ 0 ] || sh_ts_residual_coding_disabled_`<br>`flag )`<br>        `residual_coding( x0, y0, Log2( tbWidth ), Log2( tbHeight ), 0 )`<br>    `else`<br>        `residual_ts_coding( x0, y0, Log2( tbWidth ), Log2( tbHeight ), 0 )`<br>`}`<br>`if( tu_cb_coded_flag[ xC ][ yC ] && treeType != DUAL_TREE_LUMA ) {`<br>    `if( sps_transform_skip_enabled_flag && !Bdpcm_Flag[ x0 ][ y0 ][ 1 ] &&`<br>        `wC <= MaxTsSize && hC <= MaxTsSize && !cu_sbt_flag )`<br>        `transform_skip_flag[ xC ][ yC ][ 1 ]` | ae(v) |
|     `if( !transform_skip_flag[ xC ][ yC ][ 1 ] || sh_ts_residual_coding_disabled_`<br>`flag )`<br>        `residual_coding( xC, yC, Log2( wC ), Log2( hC ), 1 )`<br>    `else`<br>        `residual_ts_coding( xC, yC, Log2( wC ), Log2( hC ), 1 )`<br>`}`<br>`if( tu_cr_coded_flag[ xC ][ yC ] && treeType != DUAL_TREE_LUMA &&`<br>    `!( tu_cb_coded_flag[ xC ][ yC ] && tu_joint_cbcr_residual_flag[ xC ]`<br>`[ yC ] ) ) {`<br>    `if( sps_transform_skip_enabled_flag && !BdpcmFlag[ x0 ][ y0 ][ 2 ] &&`<br>        `wC <= MaxTsSize && hC <= MaxTsSize && !cu_sbt_flag )`<br>        `transform_skip_flag[ xC ][ yC ][ 2 ]` | ae(v) |
|     `if( !transform_skip_flag[ xC ][ yC ][ 2 ] || sh_ts_residual_coding_disabled_`<br>`flag )`<br>        `residual_coding( xC, yC, Log2( wC ), Log2( hC ), 2 )`<br>    `else`<br>        `residual_ts_coding( xC, yC, Log2( wC ), Log2( hC ), 2 )`<br>    `}`<br>`}` | | transform_skip_flag indicates whether transform is skipped in an associated block. The transform_skip_flag may be a syntax element of a transform skip flag. The associated block may be a coding block (CB) or a transform block (TB). Regarding transform (and quantization) and residual coding procedures, CB and TB may be used interchangeably. For example, as described above, residual samples may be derived for CB, and (quantized) transform coefficients may be derived through transform and quantization for the residual samples, and through the residual coding procedure, information (e.g., syntax elements) efficiently indicating a position, magnitude, sign, etc. of the (quantized) transform coefficients may be generated and signaled. The quantized transform coefficients may simply be called transform coefficients. In general, when the CB is not larger than a maximum TB, a size of the CB may be the same as a size of the TB, and in this case, a target block to be transformed (and quantized) and residual coded may be called a CB or a TB. Meanwhile, when the CB is greater than the maximum TB, a target block to be transformed (and quantized) and residual coded may be called a TB. Hereinafter, it will be described that syntax elements related to residual coding are signaled in units of transform blocks (TBs) but this is an example and the TB may be used interchangeably with coding blocks (CBs as described above.

Meanwhile, syntax elements which are signaled after the transform skip flag is signaled may be the same as the syntax elements disclosed in Table 2 and/or Table 3 below, and detailed descriptions on the syntax elements are described below.

TABLE 2

| | Descriptor |
|---|---|
| residual coding( x0, y0, log2TbWidth, log2TbHeight, cIdx ) {    if( sps_mts_enabled_flag && cu_sbt_flag && cIdx = = 0 &&       log2TbWidth = = 5 && log2TbHeight < 6 )     log2ZoTbWidth = 4    else     log2ZoTbWidth = Min( log2TbWidth, 5 )    if( sps_mts_enabled_flag && cu_sbt_flag && cIdx = = 0 &&       log2TbWidth < 6 && log2TbHeight = = 5 )     log2ZoTbHeight = 4    else     log2ZoTbHeight = Min( log2TbHeight, 5 )    if( log2TbWidth > 0 ) | |
|     last_sig_coeff_x_prefix | ae(v) |
|    if( log2TbHeight > 0 ) | |
|     last_sig_coeff_y_prefix | ae(v) |
|    if( last_sig_coeff_x_prefix > 3 ) | |
|     last_sig_coeff_x_suffix | ae(v) |
|    if( last_sig_coeff_y_prefix > 3 ) | |
|     last_sig_coeff_y_suffix | ae(v) |
|    log2TbWidth = log2ZoTbWidth    log2TbHeight = log2ZoTbHeight    remBinsPass1 = ( ( 1 << ( log2TbWidth + log2TbHeight ) ) * 7 ) >> 2    log2SbW = ( Min( log2TbWidth, log2TbHeight ) < 2 ? 1 : 2 )    log2SbH = log2SbW    if( log2TbWidth + log2TbHeight > 3 )     if( log2TbWidth < 2 ) {       log2SbW = log2TbWidth       log2SbH = 4 − log2SbW     } else if( log2TbHeight < 2 ) {       log2SbH = log2TbHeight       log2SbW = 4 − log2SbH     }    numSbCoeff= 1 << ( log2SbW + log2SbH )    lastScanPos = numSbCoeff    lastSubBlock = ( 1 << ( log2TbWidth + log2TbHeight − ( log2SbW + log2SbH ) ) ) − 1    do {     if( lastScanPos = = 0 ) {       lastScanPos = numSbCoeff       lastSubBlock- -     }     lastScanPos- -     xS = DiagScanOrder[ log2TbWidth − log2SbW ][ log2TbHeight − log2SbH ]        [ lastSubBlock ][ 0 ]     yS = DiagScanOrder[ log2TbWidth − log2SbW ][ log2TbHeight − log2SbH ]        [ lastSubBlock ][ 1 ]     xC = ( xS << log2SbW ) + DiagScanOrder[ log2SbW ][ log2SbH ] [ lastScanPos ][ 0 ]     yC = ( yS << log2SbH ) + DiagScanOrder[ log2SbW ][ log2SbH ] [ lastScanPos ][ 1 ]    } while( ( xC != LastSignificantCoeffX ) || ( yC != LastSignificantCoeffY ) )    if( lastSubBlock = = 0 && log2TbWidth >= 2 && log2TbHeight >= 2 &&      !transform_skip_flag[ x0 ][ y0 ][ cIdx ] && lastScanPos > 0 )     LfnstDcOnly = 0    if( ( lastSubBlock > 0 && log2TbWidth >= 2 && log2TbHeight >= 2 ) ||      ( lastScanPos > 7 && ( log2TbWidth = = 2 || log2TbWidth = = 3 ) &&      log2TbWidth = = log2TbHeight ) )     LfnstZeroOutSigCoeffFlag = 0    if( ( lastSubBlock > 0 || lastScanPos > 0 ) && cIdx = = 0 )     MtsDcOnly = 0    QState = 0    for( i = lastSubBlock; i >= 0; i- - ) {     startQStateSb = QState     xS = DiagScanOrder[ log2TbWidth − log2SbW ][ log2TbHeight − log2SbH ]        [ i ][ 0 ]     yS = DiagScanOrder[ log2TbWidth − log2SbW ][ log2TbHeight − log2SbH ]        [ i ][ 1 ]     inferSbDcSigCoeffFlag = 0 | |

TABLE 2-continued

|  | Descriptor |
|---|---|
| ```
        if( i < lastSubBlock && i > 0 ) {
            sb_coded_flag[ xS ][ yS ]
            inferSbDcSigCoeffFlag = 1
        }
        if( sb_coded_flag[ xS ][ yS ] && ( xS > 3 || yS > 3 ) && cIdx = = 0 )
            MtsZeroOutSigCoeffFlag = 0
        firstSigScanPosSb = numSbCoeff
        lastSigScanPosSb = −1
        firstPosMode0 = ( i = = lastSubBlock ? lastScanPos : numSbCoeff − 1 )
        firstPosMode1 = firstPosMode0
        for( n = firstPosMode0; n >= 0 && remBinsPass1 >= 4; n- - ) {
            xC = ( xS << log2SbW) + DiagScanOrder[ log2SbW ][ log2SbH ][ n ]
            yC = ( yS << log2SbH ) + DiagScanOrder[ log2SbW ][ log2SbH ][ n ]
            if( sb_coded_flag[ xS ][ yS ] && ( n > 0 || !inferSbDcSigCoeffFlag ) &&
                ( xC != LastSignificantCoeffX || yC != Last SignificantCoeffY ) )
            {
                sig_coeff_flag[ xC ][ yC ]
                remBinsPass1- -
                if( sig_coeff_flag[ xC ][ yC ] )
                    inferSbDcSigCoeffFlag = 0
            }
            if( sig_coeff_flag[ xC ][ yC ] ) {
                abs_level_gtx_flag[ n ][ 0 ]
                remBinsPass1- -
                if( abs_level_gtx_flag[ n ][ 0 ] ) {
                    par_level_flag[ n ]
                    remBinsPass1- -
                    abs_level_gtx_flag[ n ][ 1 ]
                    remBinsPass1- -
                }
                if( lastSigScanPosSb = = −1 )
                    lastSigScanPosSb = n
                firstSigScanPosSb = n
            }
            AbsLevelPass1[ xC ][ yC ] = sig_coeff_flag[ xC ][ yC ] + par_level_flag[ n ] +
                        abs_level_gtx_flag[ n ][ 0 ] + 2 * abs_level_gtx_flag[ n ][ 1 ]
            if( sh_dep_quant_used_flag )
                QState = QStateTransTable[ QState ][ AbsLevelPass1[ xC ][ yC ] & 1 ]
            firstPosMode1 = n − 1
        }
        for( n = firstPosMode0; n > firstPosMode1; n- - ) {
            xC = ( xS << log2SbW ) + DiagScanOrder[ log2SbW ][ log2SbH ][ n ]
            yC = ( yS << log2SbH ) + DiagScanOrder[ log2SbW ][ log2SbH ][ n ]
            if( abs_level_gtx_flag[ n ][ 1 ] )
                abs_remainder[ n ]
            AbsLevel[ xC ][ yC ] = AbsLevelPass1[ xC ][ yC ] +2 * abs_remainder[ n ]
        }
        for( n = firstPosMode1; n >= 0; n- - ) {
            xC = ( xS << log2SbW ) + DiagScanOrder[ log2SbW ][ log2SbH ][ n ]
            yC = ( yS << log2SbH ) + DiagScanOrder[ log2SbW ][ log2SbH ][ n ]
            if( sb_coded_flag[ xS ][ yS ] )
                dec_abs_level[ n ]
            if( AbsLevel[ xC ][ yC ] > 0 ) {
                if( lastSigScanPosSb = = −1 )
                    lastSigScanPosSb = n
                firstSigScanPosSb = n
            }
            if( sh_dep_quant_used_flag )
                QState = QStateTransTable[ QState ][ AbsLevel[ xC ][ yC ] & 1 ]
        }
        if( sh_dep_quant_used_flag || sh_sign_data_hiding_used_flag )
            signHidden = 0
        else
            signHidden = ( lastSigScanPosSb − firstSigScanPosSb > 3 ? 1 : 0 )
        for( n = numSbCoeff − 1: n >= 0; n- - ) {
            xC = ( xS << log2SbW) + DiagScanOrder[ log2SbW ][ log2SbH ][ n ]
            yC = ( yS << log2SbH ) + DiagScanOrder[ log2SbW ][ log2SbH ][ n ]
``` | ae(v)<br><br><br><br><br><br><br><br><br><br><br><br><br>ae(v)<br><br><br><br><br>ae(v)<br><br>ae(v)<br><br>ae(v)<br><br><br><br><br><br><br><br><br><br><br><br><br>ae(v)<br><br><br><br><br><br><br>ae(v) |

TABLE 2-continued

| | Descriptor |
|---|---|
| ```
        if( ( AbsLevel[ xC ][ yC ] > 0 ) &&
          ( !signHidden || ( n != firstSigScanPosSb ) ) )
          coeff_sign_flag[ n ]
      }
      if( sh_dep_quant_used_flag ) {
        QState = startQStateSb
        for( n = numSbCoeff − 1; n >= 0; n- - )
          xC = ( xS << log2SbW ) + DiagScanOrder[ log2SbW ][ log2SbH ][ n ]
[ 0 ]
          yC = ( yS << log2SbH ) + DiagScanOrder[ log2SbW ][ log2SbH ][ n ]
[ 1 ]
          if( AbsLevel [ xC ][ yC ] > 0 )
            TransCoeffLevel[ x0 ][ y0 ][ cIdx ][ xC ][ yC ] =
              ( 2 * AbsLevel[ xC ][ yC ] − ( QState > 1 ? 1 : 0 ) ) *
              ( 1 − 2 * coeff_sign_flag[ n ] )
          QState = QStateTransTable[ QState ][ AbsLevel[ xC ][ yC ] & 1 ]
      } else {
        sumAbsLevel = 0
        for( n = numSbCoeff − 1; n >= 0; n- - ) {
          xC = ( xS << log2SbW ) + DiagScanOrder[ log2SbW ][ log2SbH ][ n ]
[ 0 ]
          yC = ( yS << log2SbH ) + DiagScanOrder[ log2SbW ][ log2SbH ][ n ]
[ 1 ]
          if( AbsLevel[ xC ][ yC ] > 0 ) {
            TransCoeffLevel[ x0 ][ y0 ][ cIdx ][ xC ][ yC ] =
              AbsLevel[ xC ][ yC ] * ( 1 − 2 * coeff_sign_flag[ n ] )
            if( signHidden ) {
              sumAbsLevel += AbsLevel[ xC ][ yC ]
              if( ( n = = firstSigScanPosSb ) && ( sumAbsLevel % 2 ) = = 1 ) )
                TransCoeffLevel[ x0 ][ y0 ][ cIdx ][ xC ][ yC ] =
                  −TransCoeffLevel[ x0 ][ y0 ][ cIdx ][ xC ][ yC ]
            }
          }
        }
      }
    }
  }
}
``` | |
| | ae(v) |

TABLE 3

| | Descriptor |
|---|---|
| ```
residual_ts_coding( x0, y0, log2TbWidth, log2TbHeight, cIdx ) {
  log2SbW = ( Min( log2TbWidth, log2TbHeight ) < 2 ? 1 : 2 )
  log2SbH = log2SbW
  if( log2TbWidth + log2TbHeight > 3 )
    if( log2TbWidth < 2 ) {
      log2SbW = log2TbWidth
      log2SbH = 4 − log2SbW
    } else if( log2TbHeight < 2 ) {
      log2SbH = log2TbHeight
      log2SbW = 4 − log2SbH
    }
  numSbCoeff = 1 << ( log2SbW + log2SbH )
  lastSubBlock = ( 1 << ( log2TbWidth + log2TbHeight − ( log2SbW +
log2SbH ) ) ) − 1
  inferSbCbf = 1
  RemCcbs = ( ( 1 << ( log2TbWidth + log2TbHeight ) ) * 7 ) >> 2
  for( i =0; i <= lastSubBlock; i++ ) {
    xS = DiagScanOrder[ log2TbWidth − log2SbW ][ log2TbHeight − log2SbH ]
[ i ][ 0 ]
    yS = DiagScanOrder[ log2TbWidth − log2SbW ][ log2TbHeight − log2SbH ]
[ i ][ 1 ]
    if( i != lastSubBlock || !inferSbCbf )
      sb_coded_flag[ xS ][ yS ]
    if( sb_coded_flag[ xS ][ yS ] && i < lastSubBlock )
      inferSbCbf = 0
    /* First scan pass */
    inferSbSigCoeffFlag = 1
    lastScanPosPass1 = −1
    for( n = 0; n <= numSbCoeff − 1 && RemCcbs >= 4; n++ ) {
      xC = ( xS << log2SbW ) + DiagScanOrder[ log2SbW ][ log2SbH ][ n ]
[ 0 ]
      yC = ( yS << log2SbH ) + DiagScanOrder[ log2SbW ][ log2SbH ][ n ]
[ 1 ]
``` | |
| | ae(v) |

TABLE 3-continued

| | Descriptor |
|---|---|
| ```
        lastScanPosPass1 = n
        if( sb_coded_flag[ xS ][ yS ] &&
            ( n != numSbCoeff − 1 || !inferSbSigCoeffFlag ) ) {
          sig_coeff_flag[ xC ][ yC ]
          RemCcbs− −
          if( sig_coeff_flag[ xC ][ yC ] )
            inferSbSigCoeffFlag = 0
        }
        CoeffSignLevel[ xC ][ yC ] = 0
        if( sig_coeff_flag[ xC ][ yC ] ) {
          coeff_sign_flag[ n ]
          RemCcbs− −
          CoeffSignLevel[ xC ][ yC ] = ( coeff_sign_flag[ n ] > 0 ? −1 : 1 )
          abs_level_gtx_flag[ n ][ 0 ]
          RemCcbs− −
          if( abs_level_gtx_flag[ n ][ 0 ] ) {
            par_level_flag[ n ]
            RemCcbs− −
          }
        }
        AbsLevelPass1[ xC ][ yC ] =
            sig_coeff_flag[ xC ][ yC ] + par_level_flag[ n ] + abs_level_gtx-
_flag
[ n ][ 0 ]
      }
  /* Greater than X scan pass (numGtXFlags=5) */
    lastScanPosPass2 = −1
    for( n = 0; n <= numSbCoeff − 1 && RemCcbs >= 4; n++ ) {
      xC = ( xS << log2SbW ) + DiagScanOrder[ log2SbW ][ log2SbH ][ n ]
[ 0 ]
      yC = ( yS << log2SbH ) + DiagScanOrder[ log2SbW ][ log2SbH ][ n ]
[ 1 ]
      AbsLevelPass2[ xC ][ yC ] = AbsLevelPass1[ xC ][ yC ]
      for( j = 1; j < 5; j++ ) {
        if( abs_level_gtx_flag[ n ][ j − 1 ] ) {
          abs_level_gtx_flag[ n ][ j ]
          RemCcbs− −
        }
        AbsLevelPass2[ xC ][ yC ] += 2 * abs_level_gtx_flag[ n ][ j ]
      }
      lastScanPosPass2 = n
    }
  /* remainder scan pass */
    for( n = 0; n <= numSbCoeff − 1; n++ ) {
      xC = ( xS << log2SbW ) + DiagScanOrder[ log2SbW ][ log2SbH ][ n ]
[ 0 ]
      yC = ( yS << log2SbH ) + DiagScanOrder[ log2SbW ][ log2SbH ][ n ]
[ 1 ]
      if( ( n <= lastScanPosPass2 && AbsLevelPass2[ xC ][ yC ] >= 10 ) ||
          ( n > lastScanPosPass2 && n <= lastScanPosPass1 &&
            AbsLevelPass1[ xC ][ yC ] >= 2 ) ||
          (n > lastScanPosPass1 && sb_coded_flag[ xS ][ yS ] ) )
        abs_remainder[ n ]
      if( n <= lastScanPosPass2 )
        AbsLevels[ xC ][ yC ] = AbsLevelPass2[ xC ][ yC ] + 2 * abs_remain-
der
[ n ]
      else if( n <= lastScanPosPass1 )
        AbsLevels[ xC ][ yC ] = AbsLevelPass1[ xC ][ yC ] + 2 * abs_remain-
der
[ n ]
      else { /* bypass */
        AbsLevel[ xC ][ yC ] = abs_remainder[ n ]
        if( abs_remainder[ n ] )
          coeff_sign_flag[ n ]
      }
      if( BdpcmFlag[ x0 ][ y0 ][ cIdx ] = = 0 && n <= lastScanPosPass1 ) {
        absLeftCoeff = xC > 0 ? AbsLevel[ xC − 1 ][ yC ] ) : 0
        absAboveCoeff = yC > 0 ? AbsLevel[ xC ][ yC − 1 ] ) : 0
        predCoeff = Max( absLeftCoeff, absAboveCoeff )
        if( AbsLevel[ xC ][ yC ] = = 1 && predCoeff > 0 )
          AbsLevel[ xC ][ yC ] = predCoeff
        else if( AbsLevel[ xC ][ yC ] > 0 && AbsLevel[ xC ][ yC ] <=
predCoeff )
          AbsLevel[ xC ][ yC ] − −
      }
``` | ae(v)<br><br><br><br><br><br>ae(v)<br><br>ae(v)<br><br><br>ae(v)<br><br><br><br><br><br><br><br><br><br><br><br><br><br>ae(v)<br><br><br><br><br><br><br><br><br><br><br><br><br>ae(v)<br><br><br><br><br><br><br><br><br>ae(v) |

TABLE 3-continued

Descriptor

```
        TransCoeffLevel[ x0 ][ y0 ][ cIdx ][ xC ][ yC ] = ( 1 − 2 * coeff_sign_flag
[ n ] ) *
            AbsLevel[ xC ][ yC ]
        }
    }
}
```

According to the present embodiment, as shown in Table 1, residual coding may be divided according to a value of the syntax element transform_skip_flag of the transform skip flag. That is, a different syntax element may be used for residual coding based on the value of the transform skip flag (based on whether the transform is skipped). Residual coding used when the transform skip is not applied (that is, when the transform is applied) may be called regular residual coding (RRC), and residual coding used when the transform skip is applied (that is, when the transform is not applied) may be called transform skip residual coding (TSRC). Also, the regular residual coding may be referred to as general residual coding. Also, the regular residual coding may be referred to as a regular residual coding syntax structure, and the transform skip residual coding may be referred to as a transform skip residual coding syntax structure. Table 2 above may show a syntax element of residual coding when a value of transform_skip_flag is 0, that is, when the transform is applied, and Table 3 above may show a syntax element of residual coding when the value of transform_skip_flag is 1, that is, when the transform is not applied.

Specifically, for example, the transform skip flag indicating whether to skip the transform of the transform block may be parsed, and whether the transform skip flag is 1 may be determined. If the value of the transform skip flag is 0, as shown in Table 2, syntax elements last_sig_coeff_x_prefix, last_sig_coeff_y_prefix, last_sig_coeff_x_suffix, last_sig_coeff_y_suffix, sb_coded_flag, sig_coeff_flag, abs_level_gtx_flag, par_level_flag, abs_remainder, coeff_sign_flag and/or dec_abs_level for a residual coefficient of the transform block may be parsed, and the residual coefficient may be derived based on the syntax elements. In this case, the syntax elements may be sequentially parsed, and a parsing order may be changed. In addition, the abs_level_gtx_flag may represent abs_level_gt1_flag, and/or abs_level_gt3_flag. For example, abs_level_gtx_flag[n][0] may be an example of a first transform coefficient level flag (abs_level_gt1_flag), and the abs_level_gtx_flag[n][1] may be an example of a second transform coefficient level flag (abs_level_gt3_flag).

Referring to the Table 2 above, last_sig_coeff_x_prefix, last_sig_coeff_y_prefix, last_sig_coeff_x_suffix, last_sig_coeff_y_suffix, sb_coded_flag, sig_coeff_flag, abs_level_gt1_flag, par_level_flag, abs_level_gt3_flag, abs_remainder, coeff_sign_flag, and/or dec_abs_level may be encoded/decoded. Meanwhile, sb_coded_flag may be represented as coded_sub_block_flag.

In an embodiment, the encoding apparatus may encode (x, y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last_sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last_sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag[xC][yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

A level value remaining after encoding for sig_coeff_flag may be derived as shown in the following equation. That is, the syntax element remAbsLevel indicating a level value to be encoded may be derived from the following equation.

$$remAbsLevel=|coeff|-1 \quad \text{[Equation 1]}$$

Herein, coeff means an actual transform coefficient value.

Additionally, abs_level_gt1_flag may indicate whether or not remAbsLevel' of the corresponding scanning position (n) is greater than 1. For example, when the value of abs_level_gt1_flag is 0, the absolute value of the transform coefficient of the corresponding position may be 1. In addition, when the value of the abs_level_gt1_flag is 1, the remAbsLevel indicating the level value to be encoded later may be updated as shown in the following equation.

$$remAbsLevel=remAbsLevel-1 \quad \text{[Equation 2]}$$

In addition, the least significant coefficient (LSB) value of remAbsLevel described in Equation 2 described above may be encoded as in Equation 3 below through par_level_flag.

$$par\_level\_flag=|coeff| \& 1 \quad \text{[Equation 3]}$$

Herein, par_level_flag[n] may indicate a parity of a transform coefficient level (value) at a scanning position n.

A transform coefficient level value remAbsLevel that is to be encoded after performing par_level_flag encoding may be updated as shown below in the following equation.

$$remAbsLevel=remAbsLevel>>1 \quad \text{[Equation 4]}$$

abs_level_gt3_flag may indicate whether or not remAbsLevel' of the corresponding scanning position (n) is greater than 3. Encoding for abs_remainder may be performed only in a case where rem_abs_gt3_flag is equal to 1. A relationship between the actual transform coefficient value coeff and each syntax element may be as shown below in the following equation.

$$|coeff|=sig\_coeff\_flag+abs\_level\_gt1\_flag+par\_level\_flag+2*(abs\_level\_gt3\_flag+abs\_remainder) \quad \text{[Equation 5]}$$

Additionally, the following table indicates examples related to the above-described Equation 5.

may be changed. In addition, the abs_level_gtx_flag may represent abs_level_gt1_flag, abs_level_gt3_flag, abs_level_gt5_flag, abs_level_gt1_flag, and/or abs_level_gt1_flag. For example, abs_level_gtx_flag[n][j] may be a flag indicating whether an absolute value or a level (a value) of a transform coefficient at a scanning position n is greater than (j<<1)+1. The condition (j<<1)+1 may be optionally replaced with a specific threshold such as a first threshold, a second threshold, or the like.

Meanwhile, CABAC provides high performance, but disadvantageously has poor throughput performance. This is caused by a regular coding engine of the CABAC. Regular encoding (i.e., coding through the regular coding engine of the CABAC) shows high data dependence since it uses a probability state and range updated through coding of a previous bin, and it may take a lot of time to read a probability interval and determine a current state. The throughput problem of the CABAC may be solved by limiting the number of context-coded bins. For example, as shown in Table 2 described above, a sum of bins used to express sig_coeff_flag, abs_level_gt1_flag, par_level_flag, and abs_level_gt3_flag may be limited to the number of bins depending on a size of a corresponding block. Also, for example, as shown in Table 3 described above, a sum of bins used to express sig_coeff_flag, coeff_sign_flag, abs_level_gt1_flag, par_level_flag, abs_level_gt3_flag abs_level_gt5_flag, abs_level_gt7_flag, abs_level_gt9_flag may be limited to the number of bins depending on a size of a corresponding block. For example, if the corresponding block is a block of a 4×4 size, the sum of bins for the sig_coeff_flag, abs_level_gt1_flag, par_level_flag, abs_level_gt3_flag or sig_coeff_flag, coeff_sign_flag, abs_level_gt1_flag, par_level_flag, abs_level_gt3_flag abs_level_gt5_flag, abs_level_gt7_flag, abs_level_gt9_flag may be limited to 32 (or ex. 28), and if the corresponding block is a block of a 2×2 size, the sum of bins for the sig_coeff_flag, abs_level_gt1_flag, par_level_flag,

TABLE 4

| [coeff[n]] | sig_coeff_flag[n] | abs_level_gtX_flag[n] [0] | par_level_flag[n] | abs_level_gtX_flag[n] [1] | abs_remainder[n] |
|---|---|---|---|---|---|
| 0 | 0 | | | | |
| 1 | 1 | 0 | | | |
| 2 | 1 | 1 | 0 | 0 | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 2 |
| ... | ... | ... | ... | | |

Herein, |coeff| indicates a transform coefficient level (value) and may also be indicates as an AbsLevel for a transform coefficient. Additionally, a sign of each coefficient may be encoded by using coeff_sign_flag, which is a 1-bit symbol.

Also, if the value of the transform skip flag is 1, as shown in Table 3, syntax elements sb_coded_flag, sig_coeff_flag, coeff_sign_flag, abs_level_gtx_flag, par_level_flag and/or abs_remainder for a residual coefficient of the transform block may be parsed, and the residual coefficient may be derived based on the syntax elements. In this case, the syntax elements may be sequentially parsed, and a parsing order abs_level_gt3_flag may be limited to 8 (or ex. 7). The limited number of bins may be represented by remBinsPass1 or RemCcbs. Or, for example, for higher CABAC throughput, the number of context coded bins may be limited for a block (CB or TB) including a coding target CG. In other words, the number of context coded bins may be limited in units of blocks (CB or TB). For example, when the size of the current block is 16×16, the number of context coded bins for the current block may be limited to 1.75 times the number of pixels of the current block, i.e., 448, regardless of the current CG.

In this case, if all context-coded bins of which the number is limited are used when a context element is coded, the encoding apparatus may binarize the remaining coefficients through a method of binarizing the coefficient as described below, instead of using the context coding, and may perform bypass encoding. In other words, for example, if the number of context-coded bins which are coded for 4×4 CG is 32 (or ex. 28), or if the number of context-coded bins which are coded for 2x2 CG is 8 (or ex. 7), sig_coeff_flag, abs_level_gt1_flag, par_level_flag, abs_level_gt3_flag which are coded with the context-coded bin may no longer be coded, and may be coded directly to dec_abs_level. Or, for example, when the number of context coded bins coded for a 4×4 block is 1.75 times the number of pixels of the entire block, that is, when limited to 28, the sig_coeff_flag, abs_level_gt1_flag, par_level_flag, and abs_level_gt3_flag coded as context coded bins may not be coded any more, and may be directly coded as dec_abs_level as shown in Table 5 below.

TABLE 5

| [coeff[n]] | dec_abs_level[n] |
|---|---|
| 0 | 0 |
| 1 | 1 |
| 7 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| ... | ... |

A value |coeff| may be derived based on dec_abs_level. In this case, a transform coefficient value, i.e., |coeff|, may be derived as shown in the following equation.

$$|coeff|=dec\_abs\_level \quad \text{[Equation 6]}$$

In addition, the coeff_sign_flag may indicate a sign of a transform coefficient level at a corresponding scanning position n. That is, the coeff_sign_flag may indicate the sign of the transform coefficient at the corresponding scanning position n.

Figure 11:
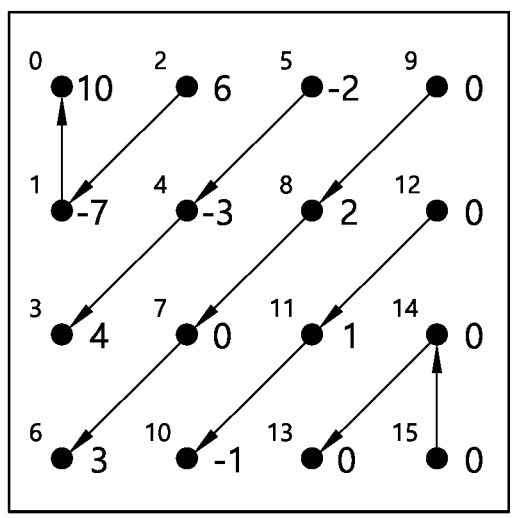
FIG. 11 is a diagram showing exemplary transform coefficients within a 4×4 block.

FIG. 11 shows an example of transform coefficients in a 4×4 block.

The 4×4 block of FIG. 11 represents an example of quantized coefficients. The block of FIG. 11 may be a 4×4 transform block, or a 4×4 sub-block of an 8×8, 16×16, 32×32, or 64×64 transform block. The 4×4 block of FIG. 11 may represent a luma block or a chroma block.

Meanwhile, as described above, when an input signal is not a binary value but a syntax element, the encoding apparatus may transform the input signal into a binary value by binarizing a value of the input signal. In addition, the decoding apparatus may decode the syntax element to derive a binarized value (e.g., a binarized bin) of the syntax element, and may de-binarize the binarized value to derive a value of the syntax element. The binarization process may be performed as a truncated rice (TR) binarization process, a k-th order Exp-Golomb (EGk) binarization process, a limited k-th order Exp-Golomb (limited EGk), a fixed-length (FL) binarization process, or the like. In addition, the de-binarization process may represent a process performed based on the TR binarization process, the EGk binarization process, or the FL binarization process to derive the value of the syntax element.

For example, the TR binarization process may be performed as follows.

An input of the TR binarization process may be cMax and cRiceParam for a syntax element and a request for TR binarization. In addition, an output of the TR binarization process may be TR binarization for symbolVal which is a value corresponding to a bin string.

Specifically, for example, in the presence of a suffix bin string for a syntax element, a TR bin string for the syntax element may be concatenation of a prefix bin string and the suffix bin string, and in the absence of the suffix bin string, the TR bin string for the syntax element may be the prefix bin string. For example, the prefix bin string may be derived as described below.

A prefix value of the symbolVal for the syntax element may be derived as shown in the following equation.

$$prefixVal=symbolVal>>cRiceParam \quad \text{[Equation 7]}$$

Herein, prefixVal may denote a prefix value of the symbolVal. A prefix (i.e., a prefix bin string) of the TR bin string of the syntax element may be derived as described below. For example, if the prefixVal is less than cMax>>cRiceParam, the prefix bin string may be a bit string of length prefixVal+1, indexed by binIdx. That is, if the prefixVal is less than cMax>>cRiceParam, the prefix bin string may be a bit string of which the number of bits is prefixVal+1, indicated by binIdx. A bin for binIdx less than prefixVal may be equal to 1. In addition, a bin for the same binIdx as the prefixVal may be equal to 0.

For example, a bin string derived through unary binarization for the prefixVal may be as shown in the following table.

TABLE 6

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Meanwhile, if the prefixVal is not less than cMax>>cRiceParam, the prefix bin string may be a bit string in which a length is cMax>>cRiceParam and all bits are 1.

In addition, if cMax is greater than symbolVal and if cRiceParam is greater than 0, a bin suffix bin string of a TR bin string may be present. For example, the suffix bin string may be derived as described below.

A suffix value of the symbolVal for the syntax element may be derived as shown in the following equation.

$$suffixVal=symbolVal-((prefixVal)<<cRiceParam) \quad \text{[Equation 8]}$$

Herein, suffixVal may denote a suffix value of the symbolVal.

A suffix of a TR bin string (i.e., a suffix bin string) may be derived based on an FL binarization process for suffixVal of which a value cMax is (1<<cRiceParam)−1.

Meanwhile, if a value of an input parameter, i.e., cRiceParam, is 0, the TR binarization may be precisely truncated unary binarization, and may always use the same value cMax as a possible maximum value of a syntax element to be decoded.

In addition, for example, the EGk binarization process may be performed as follows. A syntax element coded with ue(v) may be a syntax element subjected to Exp-Golomb coding.

For example, a 0-th order Exp-Golomb (EG0) binarization process may be performed as follows.

A parsing process for the syntax element may begin with reading a bit including a first non-zero bit starting at a current position of a bitstream and counting the number of leading bits equal to 0. The process may be represented as shown in the following table.

TABLE 7 leadingZeroBits = −1
for( b = 0; !b; leadingZeroBits++ )
    b = read_bits( 1 )

In addition, a variable 'codeNum' may be derived as shown in the following equation.

$$codeNum = 2^{leadingZeroBits} - 1 + read\_bits(leadingZeroBits)$$ [Equation 9]

Herein, a value returned from read_bits(leadingZeroBits), that is, a value indicated by read_bits(leadingZeroBits), may be interpreted as binary representation of an unsigned integer for a most significant bit recorded first.

A structure of an Exp-Golomb code in which a bit string is divided into a "prefix" bit and a "suffix" bit may be represented as shown in the following table.

TABLE 8

| Bit string form | Range of codeNum |
|---|---|
| 1 | 0 |
| 0 1 $x_0$ | 1 . . . 2 |
| 0 0 1 $x_1$ $x_0$ | 3 . . . 6 |
| 0 0 0 1 $x_2$ $x_1$ $x_0$ | 7 . . . 14 |
| 0 0 0 0 1 $x_3$ $x_2$ $x_1$ $x_0$ | 15 . . . 30 |
| 0 0 0 0 0 1 $x_4$ $x_3$ $x_2$ $x_1$ $x_0$ | 31 . . . 62 |
| . . . | . . . |

The "prefix" bit may be a bit parsed as described above to calculate leadingZeroBits, and may be represented by 0 or 1 of a bit string in Table 8. That is, the bit string disclosed by 0 or 1 in Table 8 above may represent a prefix bit string. The "suffix" bit may be a bit parsed in the computation of codeNum, and may be represented by xi in Table 8 above. That is, a bit string disclosed as xi in Table 8 above may represent a suffix bit string. Herein, i may be a value in the range of LeadingZeroBits−1. In addition, each xi may be equal to 0 or 1.

A bit string assigned to the codeNum may be as shown in the following table.

TABLE 9

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |

TABLE 9-continued

| Bit string | codeNum |
|---|---|
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

If a descriptor of the syntax element is ue(v), that is, if the syntax element is coded with ue(v), a value of the syntax element may be equal to codeNum.

In addition, for example, the EGk binarization process may be performed as follows.

An input of the EGk binarization process may be a request for EGk binarization. In addition, the output of the EGk binarization process may be EGk binarization for symbolVal, i.e., a value corresponding to a bin string.

A bit string of the EGk binarization process for symbolVal may be derived as follows.

TABLE 10 absV = Abs( symbolVal )
stopLoop = 0
do
  if( absV >= ( 1 << k ) ) {
    put( 1 )
    absV = absV − ( 1 << k )
    k++
  } else {
    put( 0 )
    while( k− − )
      put( ( absV >> k ) & 1 )
    stopLoop = 1
  }
while( !stopLoop )

Referring to Table 10 above, a binary value X may be added to an end of a bin string through each call of put(X). Herein, X may be 0 or 1.

In addition, for example, the limited EGk binarization process may be performed as follows.

An input of the limited EGk binarization process may be a request for limited EGk binarization, a rice parameter riceParam, log 2TransformRange as a variable representing a binary logarithm of a maximum value, and maxPreExtLen as a variable representing a maximum prefix extension length. In addition, an output of the limited EGk binarization process may be limited EGk binarization for symbolVal as a value corresponding to an empty string.

A bit string of the limited EGk binarization process for the symbolVal may be derived as follows.

TABLE 11

```
codeValue – symbolVal >> riceParam
PrefixExtensionLength = 0
while( ( PrefixExtensionLength < maxPrefixExtensionLength ) &&
    ( codeValue > ( ( 2 << PrefixExtensionLength ) – 2 ) ) ) {
  PrefixExtensionLength ||
  put( 1 )
}
if( PrefixExtensionLength – – maxPrefixExtensionLength )
  escapeLength – log2TransformRange
else {
  escapeLength = PrefixExtensionLength · riceParam
  put( 0 )
}
symbolVal – symbolVal – ( ( ( 1 << PrefixExtensionLength ) – 1 ) << riceParam )
while( ( escapeLength– – ) > 0 )
  put( ( symbolVal >> escapeLength ) & 1 )
```

In addition, for example, the FL binarization process may be performed as follows.

An input of the FL binarization process may be a request for FL binarization and cMax for the syntax element. In addition, an output of the FL binarization process may be FL binarization for symbolVal as a value corresponding to a bin string.

FL binarization may be configured by using a bit string of which the number of bits has a fixed length of symbolVal. Herein, the fixed-length bit may be an unsigned integer bit string. That is, a bit string for symbolVal as a symbol value may be derived through FL binarization, and a bit length (i.e., the number of bits) of the bit string may be a fixed length.

For example, the fixed length may be derived as shown in the following equation.

$$\text{fixedLength}=\text{Ceil}(\text{Log }2(c\text{Max}+1)) \quad \text{[Equation 10]}$$

Indexing of bins for FL binarization may be a method using a value which increases orderly from a most significant bit to a least significant bit. For example, a bin index related to the most significant bit may be binIdx=0.

Meanwhile, for example, a binarization process for a syntax element abs_remainder in the residual information may be performed as follows.

An input of the binarization process for the abs_remainder may be a request for binarization of a syntax element abs_remainder[n], a color component cIdx, and a luma position (x0, y0). The luma position (x0, y0) may indicate a top-left sample of a current luma transform block based on the top-left luma sample of a picture.

An output of the binarization process for the abs_remainder may be binarization of the abs_remainder (i.e., a binarized bin string of the abs_remainder). Available bin strings for the abs_remainder may be derived through the binarization process.

A rice parameter cRiceParam for the abs_remainder[n] may be derived through a rice parameter derivation process performed by inputting the color component cIdx and luma position (x0, y0), the current coefficient scan position (xC, yC), log 2TbWidth, which is the binary logarithm of the width of the transform block, and log 2TbHeight, which is the binary logarithm of the height of the transform block. A detailed description of the rice parameter derivation process will be described later.

In addition, for example, cMax for abs_remainder[n] to be currently coded may be derived based on the rice parameter cRiceParam. The cMax may be derived as shown in the following equation.

$$c\text{Max}=6<<c\text{RiceParam} \quad \text{[Equation 11]}$$

Meanwhile, binarization for the abs_remainder, that is, a bin string for the abs_remainder, may be concatenation of a prefix bin string and a suffix bin string in the presence of the suffix bin string. In addition, in the absence of the suffix bin string, the bin string for the abs_remainder may be the prefix bin string.

For example, the prefix bin string may be derived as described below.

A prefix value prefixVal of the abs_remainder[n] may be derived as shown in the following equation.

$$\text{prefixVal}=\text{Min}(c\text{Max},\text{abs\_remainder}[n]) \quad \text{[Equation 12]}$$

A prefix of the bin string (i.e., a prefix bin string) of the abs_remainder[n] may be derived through a TR binarization process for the prefixVal, in which the cMax and the cRiceParam are used as an input.

If the prefix bin string is identical to a bit string in which all bits are 1 and a bit length is 6, a suffix bin string of the bin string of the abs_remainder[n] may exist, and may be derived as described below.

The rice parameter deriving process for the dec_abs_level [n] may be as follows.

An input of the rice parameter deriving process may be a color component index cIdx, a luma position (x0, y0), a current coefficient scan position (xC, yC), log 2TbWidth as a binary logarithm of a width of a transform block, and log 2TbHeight as a binary logarithm of a height of the transform block. The luma position (x0, y0) may indicate a top-left sample of a current luma transform block based on a top-left luma sample of a picture. In addition, an output of the rice parameter deriving process may be the rice parameter cRiceParam.

For example, a variable locSumAbs may be derived similarly to a pseudo code disclosed in the following table, based on an array AbsLevel[x][y] for a transform block having the given component index cIdx and the top-left luma position (x0, y0).

TABLE 12

```
locSumAbs = 0
if( xC < (1 << log2TbWidth) – 1 ) {
  locSumAbs += AbsLevel[ xC + 1 ][ yC ]
  if( xC < (1 << log2TbWidth) – 2 )
    locSumAbs += AbsLevel[ xC + 2 ][ yC ]
  if( yC < (1 << log2TbHeight) – 1 )
    locSumAbs += AbsLevel[ xC + 1 ][ yC + 1 ]
}
```

TABLE 12-continued

```
if( yC < (1 << log2TbHeight) − 1 ) {
  locSumAbs += AbsLevel[ xC ][ yC + 1 ]
  if( yC < (1 << log2TbHeight) − 2 )
    locSumAbs += AbsLevel[ xC ][ yC + 2 ]
}
locSumAbs = Clip3( 0, 31, locSumAbs − baseLevel * 5 )
```

Then, based on the given variable locSumAbs, the rice parameter cRiceParam may be derived as shown in the following table.

TABLE 13

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Also, for example, in the rice parameter derivation process for abs_remainder[n], the baseLevel may be set to 4.

Alternatively, for example, the rice parameter cRiceParam may be determined based on whether a transform skip is applied to a current block. That is, if a transform is not applied to a current TB including a current CG, in other words, if the transform skip is applied to the current TB including the current CG, the rice parameter cRiceParam may be derived to be 1.

Also, a suffix value suffixVal of the abs_remainder may be derived as shown in the following equation.

$$\text{suffixVal} = \text{abs\_remainder}[n] - c\text{Max} \qquad \text{[Equation 13]}$$

A suffix bin string of the bin string of the abs_remainder may be derived through a limited EGk binarization process for the suffixVal in which k is set to cRiceParam+1, riceParam is set to cRiceParam, and log 2TransformRange is set to 15, and maxPreExtLen is set to 11.

Meanwhile, for example, a binarization process for a syntax element dec_abs_level in the residual information may be performed as follows.

An input of the binarization process for the dec_abs_level may be a request for binarization of a syntax element dec_abs_level[n], a color component cIdx, a luma position (x0, y0), a current coefficient scan position (xC, yC), log 2TbWidth as a binary logarithm of a width of a transform block, and log 2TbHeight as a binary logarithm of a height of the transform block. The luma position (x0, y0) may indicate a top-left sample of a current luma transform block based on a top-left luma sample of a picture.

An output of the binarization process for the dec_abs_level may be binarization of the dec_abs_level (i.e., a binarized bin string of the dec_abs_level). Available bin strings for the dec_abs_level may be derived through the binarization process.

A rice parameter cRiceParam for dec_abs_level[n] may be derived through a rice parameter deriving process performed with an input of the color component cIdx, the luma position (x0, y0), the current coefficient scan position (xC, yC), the log 2TbWidth as the binary logarithm of the width of the transform block, and the log 2TbHeight as the binary logarithm of the height of the transform block. The rice parameter deriving process will be described below in detail.

In addition, for example, cMax for the dec_abs_level[n] may be derived based on the rice parameter cRiceParam. The cMax may be derived as shown in the following table.

$$c\text{Max} = 6 << c\text{RiceParam} \qquad \text{[Equation 14]}$$

Meanwhile, binarization for the dec_abs_level[n], that is, a bin string for the dec_abs_level[n], may be concatenation of a prefix bin string and a suffix bin string in the presence of the suffix bin string. In addition, in the absence of the suffix bin string, the bin string for the dec_abs_level[n] may be the prefix bin string.

For example, the prefix bin string may be derived as described below.

A prefix value prefixVal of the dec_abs_level[n] may be derived as shown in the following equation.

$$\text{prefixVal} = \text{Min}(c\text{Max}, \text{dec\_abs\_level}[n]) \qquad \text{[Equation 15]}$$

A prefix of the bin string (i.e., a prefix bin string) of the dec_abs_level[n] may be derived through a TR binarization process for the prefixVal, in which the cMax and the cRiceParam are used as an input.

If the prefix bin string is identical to a bit string in which all bits are 1 and a bit length is 6, a suffix bin string of the bin string of the dec_abs_level[n] may exist, and may be derived as described below.

The rice parameter deriving process for the dec_abs_level[n] may be as follows.

An input of the rice parameter deriving process may be a color component index cIdx, a luma position (x0, y0), a current coefficient scan position (xC, yC), log 2TbWidth as a binary logarithm of a width of a transform block, and log 2TbHeight as a binary logarithm of a height of the transform block. The luma position (x0, y0) may indicate a top-left sample of a current luma transform block based on a top-left luma sample of a picture. In addition, an output of the rice parameter deriving process may be the rice parameter cRiceParam.

For example, a variable locSumAbs may be derived similarly to a pseudo code disclosed in the following table, based on an array AbsLevel[x][y] for a transform block having the given component index cIdx and the top-left luma position (x0, y0).

TABLE 14

```
locSumAbs = 0
if( xC < (1 << log2TbWidth) − 1 ) {
  locSumAbs += AbsLevel[ xC + 1 ][ yC ]
  if( xC < (1 << log2TbWidth) − 2 )
    locSumAbs += AbsLevel[ xC + 2 ][ yC ]
  if( yC < (1 << log2TbHeight) − 1 )
    locSumAbs += AbsLevel[ xC + 1 ][ yC + 1 ]
}
if( yC < (1 << log2TbHeight) − 1 ) {
  locSumAbs += AbsLevel[ xC ][ yC + 1 ]
  if( yC < (1 << log2TbHeight) − 2 )
    locSumAbs += AbsLevel[ xC ][ yC + 2 ]
}
locSumAbs = Clip3( 0, 31, locSumAbs − baseLevel * 5 )
```

Then, based on the given variable locSumAbs, the rice parameter cRiceParam may be derived as shown in the following table.

TABLE 15

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 26 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Also, for example, in the rice parameter derivation process for dec_abs_level[n], the baseLevel may be set to 0, and the ZeroPos[n] may be derived as follows.

$$ZeroPos[n]=(QState<2?1:2)<<cRiceParam \quad \text{[Equation 16]}$$

In addition, a suffix value suffixVal of the dec_abs_level [n] may be derived as shown in the following equation.

$$suffixVal=dec\_abs\_level[n]-cMax \quad \text{[Equation 17]}$$

A suffix bin string of the bin string of the dec_abs_level[n] may be derived through a limited EGk binarization process for the suffixVal in which k is set to cRiceParam+1, truncSuffixLen is set to 15, and maxPreExtLen is set to 11.

Meanwhile, the RRC and the TSRC may have the following differences.

For example, the rice parameter cRiceParam of the syntax element abs_remainder[ ] and dec_abs_level[ ] in the RRC may be derived based on the locSumAbs, the look-up table and/or the baseLevel (Table 13 and Table 14) as described above, but the rice parameter cRiceParam of the syntax element abs_remainder[ ] in the TSRC may be derived as 1. That is, for example, when transform skip is applied to the current block (e.g., the current TB), the Rice parameter cRiceParam for abs_remainder[ ] of the TSRC for the current block may be derived as 1.

Also, for example, referring to Table 3 and Table 4, in the RRC, abs_level_gtx_flag[n][0] and/or abs_level_gtx_flag[n][1] may be signaled, but in the TSRC, abs_level_gtx_flag [n] [0], abs_level_gtx_flag[n][1], abs_level_gtx_flag[n][2], abs_level_gtx_flag [n] [3], and abs_level_gtx_flag [n] [4] may be signaled. Here, the abs_level_gtx_flag[n][0] may be expressed as abs_level_gt1_flag or a first coefficient level flag, the abs_level_gtx_flag[n][1] may be expressed as abs_level_gt3_flag or a second coefficient level flag, the abs_level_gtx_flag[n][2] may be expressed as abs_level_gt5_flag or a third coefficient level flag, the abs_level_gtx_flag[n][3] may be expressed as abs_level_gt7_flag or a fourth coefficient level flag, and the abs_level_gtx_flag [n][4] may be expressed as abs_level_gt9_flag or a fifth coefficient level flag. Specifically, the first coefficient level flag may be a flag for whether a coefficient level is greater than a first threshold (for example, 1), the second coefficient level flag may be a flag for whether a coefficient level is greater than a second threshold (for example, 3), the third coefficient level flag may be a flag for whether a coefficient level is greater than a third threshold (for example, 5), the fourth coefficient level flag may be a flag for whether a coefficient level is greater than a fourth threshold (for example, 7), the fifth coefficient level flag may be a flag for whether a coefficient level is greater than a fifth threshold (for example, 9). As described above, in the TSRC, compared to the RRC, abs_level_gtx_flag[n][0], abs_level_gtx_flag[n][1], and abs_level_gtx_flag [n][2], abs_level_gtx_flag [n][3], abs_level_gtx_flag [n][4] may be further included.

Also, for example, in the RRC, the syntax element coeff_sign_flag may be bypass coded, but in the TSRC, the syntax element coeff_sign_flag may be bypass coded or context coded.

Further, for a residual sample quantization process, dependent quantization may be proposed. The dependent quantization may represent a method dependent on a value of a transform coefficient (value of a transform coefficient level) in which a reconstructed value set allowed for a current transform coefficient precedes the current transform coefficient in a reconstruction order. That is, for example, the dependent quantization may be realized by (a) defining two scalar quantizers having different reconstruction levels, and (b) defining a process for transition between the scalar quantizers. The dependent quantization may have an effect on that an allowed reconstructed vector is more concentrated in an N-dimensional vector space in comparison to the existing independent scalar quantization. Here, N may represent the number of transform coefficients of a transform block.

Figure 12:
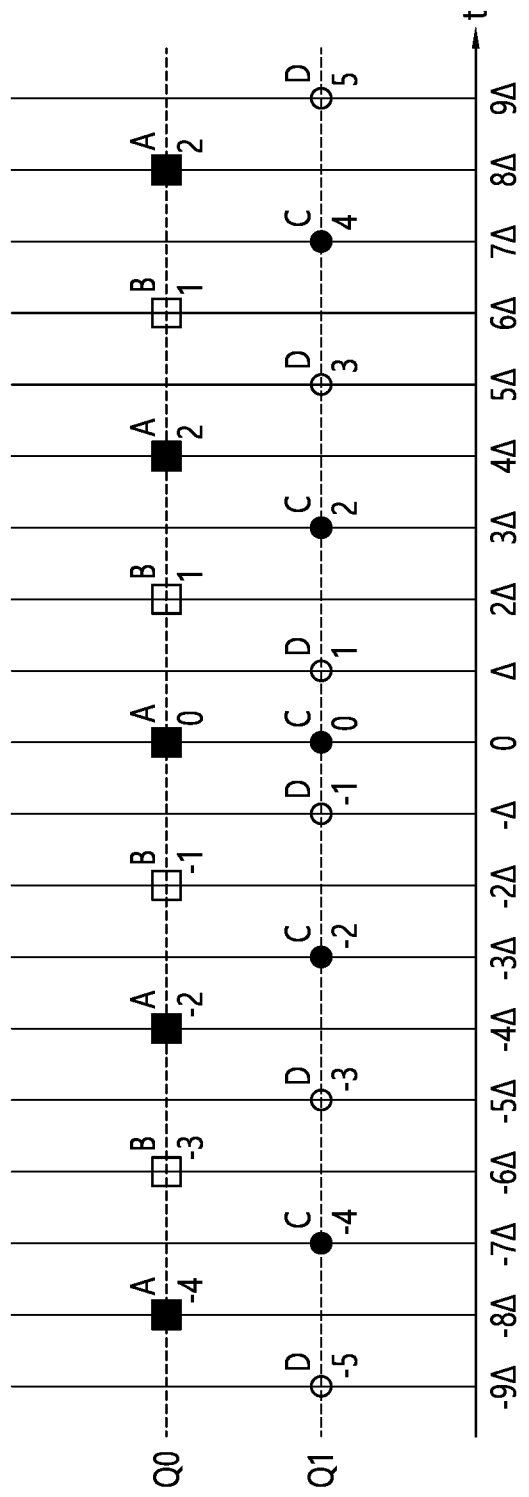
FIG. 12 exemplarily illustrates scalar quantizers being used in dependent quantization.

FIG. 12 exemplarily illustrates scalar quantizers being used in dependent quantization. Referring to FIG. 12, the position of the enabled reconstructed levels may be designated by a quantization step size Δ. Referring to FIG. 12, the scalar quantizers may be represented as Q0 and Q1. The scalar quantizer being used may be derived without being explicitly signaled from a bitstream. For example, the quantizer being used for the current transform coefficient may be determined by parities of the transform coefficient level preceding the current transform coefficient in the coding/reconstruction order.

Figure 13:
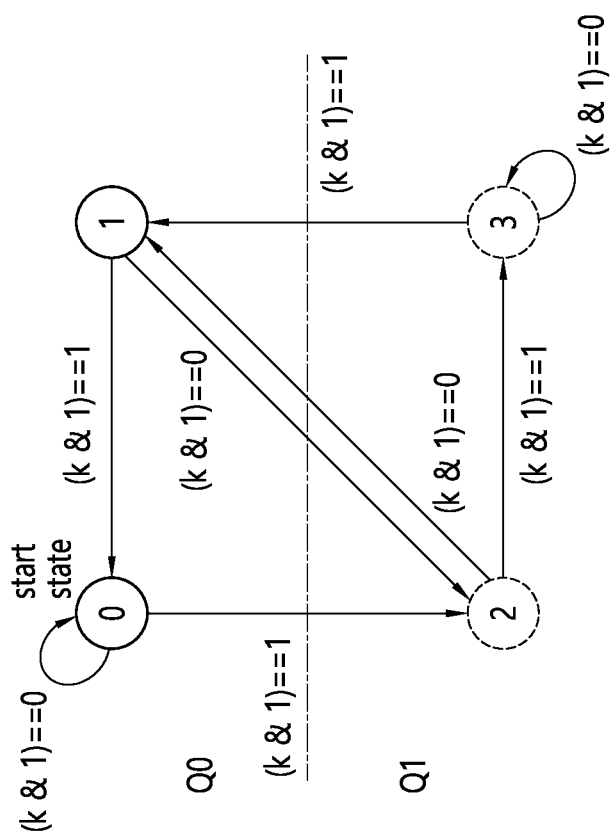
FIG. 13 exemplarily illustrates state transition and quantizer selection for dependent quantization.

FIG. 13 exemplarily illustrates the state transition and quantizer selection for the dependent quantization.

Referring to FIG. 13, the transition between the two scalar quantizers Q0 and Q1 may be realized through a state machine having four states. The four states may have four different values (0, 1, 2, and 3). In the coding/reconstructed order, the state for the current transform coefficient may be determined by the parities of the transform coefficient level prior to the current transform coefficient.

For example, in case that a dequantization process for the transform block starts, the state for the dependent quantization may be configured as 0. Thereafter, the transform coefficients of the transform block may be reconstructed in the scan order (i.e., the same order as that of entropy decoding). For example, after the current transform coefficient is reconstructed, as illustrated in FIG. 13, the state for the dependent quantization may be updated. In the scan order, the dequantization process for the transform coefficient being reconstructed after the current transform coefficient is reconstructed may be performed based on an updated state. In FIG. 13, k may represent a value of the transform coefficient, that is, the value of the transform coefficient level value. For example, if k (value of the current transform coefficient) & 1 is 0 in a state where the current state is 0, the state may be updated to 0, whereas if the k&1 is 1, the state may be updated to 2. Further, for example, if the k&1 is 0 in a state where the current state is 1, the state may be updated to 2, whereas if the k&1 is 1, the state may be updated to 0. Further, for example, if the k&1 is 0 in a state where the current state is 2, the state may be updated to 1, whereas if the k&1 is 1, the state may be updated to 3. Further, for example, if the k&1 is 0 in a state where the current state is 3, the state may be updated to 3, whereas if the k&1 is 1, the state may be updated to 1. Referring to FIG. 13, if the state is either 0 or 1, the scalar quantizer being used in the dequantization process may be Q0, and if the state is either 2 or 3, the scalar quantizer being used in the dequantization process may be Q1. The transform coefficient may be dequantized by the scalar quantizer for the current state based on a quantization parameter for a reconstructed level of the transform coefficient.

Meanwhile, the present disclosure proposes embodiments related to residual data coding. The embodiments being explained in the present disclosure may be combined with each other. In the residual data coding method as described above, regular residual coding (RRC) and transform skip residual coding (TSRC) may be present.

Of the two methods as described above, the residual data coding method for the current block may be determined based on values of transform_skip_flag and sh_ts_residual_coding_disabled_flag as illustrated in Table 1. Here, the syntax element sh_ts_residual_coding_disabled_flag may represent whether the TSRC is enabled. Accordingly, if the slice_ts_residual_coding_disabled_flag represents that the TSRC is not enabled even in case that the transform_skip_flag represents the transform skip, the syntax elements according to the RRC may be signaled for the transform skip block. That is, if the value of the transform_skip_flag is 0, or if the value of the slice_ts_residual_coding_disabled_flag is 1, the RRC may be used, whereas otherwise, the TSRC may be used.

Although high coding efficiency may be obtained in specific applications (e.g., lossless coding and the like) by using the slice_ts_residual_coding_disabled_flag, in the existing video/image coding standard, restrictions on a case that the dependent quantization and the slice_ts_residual_coding_disabled_flag are used together have not been proposed. That is, the dependent quantization may be activated at a high level (e.g., sequence parameter set (SPS) syntax/video parameter set (VPS) syntax/decoding parameter set (DPS) syntax/picture header syntax/slice header syntax) or at a low level (CU/TU), and if the slice_ts_residual_coding_disabled_flag is 1, the values dependent on the state of the dependent quantization in the RRC may perform an unnecessary operation (i.e., operation according to the dependent quantization) to degrade the coding performance, or an unintended loss of coding performance may occur due to wrong configuration in the encoding apparatus. Accordingly, the present embodiment proposes schemes for configuring dependencies/restrictions between two technologies of the dependent quantization and the residual coding (i.e., coding of residual samples of a transform skip block in the current slice through the RRC) in case that the slice_ts_residual_coding_disabled_flag=1, which are used together to prevent unintended coding loss or malfunction from occurring.

As an embodiment, the present disclosure proposes a method in which the slice_ts_residual_coding_disabled_flag is dependent on the ph_dep_quant_enabled_flag. For example, the syntax elements proposed in the present embodiment may be in the following table.

TABLE 16

| | Descriptor |
|---|---|
| slice_header( ) { | |
|   picture header in slice header flag | u(1) |
|   if( picture header in slice header flag ) | |
|     picture header structure( ) | |
|   (...) | |
|   if(!ph dep quant enabled flag) | |
|     slice ts residual coding disabled flag | u(1) |
|   if( ph lmcs enabled flag ) | |
|     slice lmcs enabled flag | u(1) |
|   if( pic scaling list enabled flag ) | |
|     slice scaling list present flag | u(1) |
|   if( NumEntryPoints > 0 ) { | |
|     offset len minus1 | ue(v) |
|     for( i = 0; i < NumEntryPoints; i++ ) | |
|       entry point offset minus1[ i ] | u(v) |
|   } | |
|   if( slice header extension present flag ) { | |
|     slice header extension length | ue(v) |
|     for( i = 0; i < slice header extension length; i++) | |
|       slice header extension data byte[ i ] | u(8) |
|   } | |
|   byte alignment( ) | |
| } | |

According to the present embodiment, the slice_ts_residual_coding_disabled_flag may be signaled in case that the value of the ph_dep_quant_enabled_flag is 0. Here, the ph_dep_quant_enabled_flag may represent whether the dependent quantization is enabled. For example, if the value of the ph_dep_quant_enabled_flag is 1, it may represent that the dependent quantization is enabled, whereas if the value of the ph_dep_quant_enabled_flag is 0, it may represent that the dependent quantization is not enabled.

Accordingly, according to the present embodiment, the slice_ts_residual_coding_disabled_flag may be signaled only in case that the dependent quantization is not enabled, and in case that the dependent quantization is enabled, and thus the slice_ts_residual_coding_disabled_flag is not signaled, the slice_ts_residual_coding_disabled_flag may be inferred to as 0. Meanwhile, the ph_dep_quant_enabled_flag and the slice_ts_residual_coding_disabled_flag may be signaled to the picture header syntax and/or the slice header syntax, or may be signaled to another high level syntax (HLS) (e.g., SPS syntax/VPS syntax/DPS syntax) that is not the picture header syntax and the slice header syntax or at the low level (CU/TU). If the ph_dep_quant_enabled_flag is signaled to a syntax excluding the picture header syntax, it may be called another name. For example, the ph_dep_quant_enabled_flag may be represented as the sh_dep_quant_enabled_flag, the sh_dep_quant_used_flag, or the sps_dep_quant_enabled_flag.

Further, the present disclosure proposes another embodiment for configuring dependencies/restrictions between the dependent quantization and the residual coding (i.e., coding of residual samples of the transform skip block in the current slice through the RRC) in case that the slice_ts_residual_coding_disabled_flag=1. For example, the present embodiment proposes a scheme for making the state of the dependent quantization not in use in coding the level value of the transform coefficient in case that the value of the slice_ts_residual_coding_disabled_flag is 1 in order to prevent the unintended coding loss or the malfunction from occurring through the use of the dependent quantization and the residual coding (i.e., coding of residual samples of the transform skip block in the current slice through the RRC) in case that the slice_ts_residual_coding_disabled_flag=1 together. The residual coding syntax according to the present embodiment may be as in the following table.

TABLE 17

| | Descriptor |
|---|---|
| residual coding( x0, y0, log2TbWidth, log2TbHeight, cIdx ) { | |
|   if( sps_mts_enabled_flag && cu_sbt_flag && cIdx = = 0 && | |
|       log2TbWidth = = 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|       log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ] | |
|             [ lastSubBlock ][ 0 ] | |
|     yS = DiagScanOrder[ log2TbWidth − log2SbW ][ log2TbHeight − log2SbH ] | |
|             [ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
|   } while( ( xC != LastSignificantCoeffX ) \|\| ( yC != LastSignificantCoeffY ) ) | |
|   if( lastSubBlock = = 0 && log2TbWidth >= 2 && log2TbHeight >= 2 && | |
|       !transform_skip_flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight >= 2 ) \|\| | |
|     ( lastScanPos > 7 && ( log2TbWidth = = 2 \|\| log2TbWidth = = 3 ) && | |
|     log2TbWidth = = log2TbHeight ) ) | |
|     LfnstZeroOutSigCoeffFlag = 0 | |
|   if( ( lastSubBlock > 0 \|\| lastScanPos > 0 ) && cIdx = = 0 ) | |
|     MtsDcOnly = 0 | |
|   QState = 0 | |

TABLE 17-continued

|  | Descriptor |
|---|---|
| ```
for( i = lastSubBlock; i >= 0; i- - ) {
   startQStateSb = QState
   xS = DiagScanOrder[ log2TbWidth – log2SbW ][ log2TbHeight –
log2SbH ]
              [ i ][ 0 ]
   yS = DiagScanOrder[ log2TbWidth – log2SbW ][ log2TbHeight –
log2SbH ]
              [ i ][ 1 ]
   inferSbDcSigCoeffFlag = 0
   if( i < lastSubBlock && i > 0 ) {
      coded_sub_block_flag[ xS ][ yS ]
      inferSbDcSigCoeffFlag = 1
   }
   if(coded_sub_block_flag[ xS ][ yS ] && ( xS > 3 || yS > 3 ) &&
cIdx = = 0 )
      MtsZeroOutSigCoeffFlag = 0
   firstSigScanPosSb = numSbCoeff
   lastSigScanPosSb = −1
   firstPosMode0 = ( i = = lastSubBlock ? lastScanPos : numSbCoeff − 1 )
   firstPosMode1 = firstPosMode0
   for( n = firstPosMode0; n >= 0 && remBinsPass1 >= 4; n- - ) {
      xC = ( xS << log2SbW ) + DiagScanOrder[ log2SbW ][ log2SbH ][ n ]
[ 0 ]
      yC = ( yS << log2SbH ) + DiagScanOrder[ log2SbW ][ log2SbH ][ n ]
[ 1 ]
      if( coded_sub_block_flag[ xS ][ yS ] && ( n > 0 || !inferSbDcSigCoeff
Flag ) &&
          ( xC != LastSignificantCoeffX || yC != LastSignificantCoeffY ) ) {
         sig_coeff_flag[ xC ][ yC ]
         remBinsPass1- -
         if( sig_coeff_flag[ xC ][ yC ] )
            inferSbDcSigCoeffFlag = 0
      }
      if( sig_coeff_flag[ xC ][ yC ] ) {
         abs_level_gtx_flag[ n ][ 0 ]
         remBinsPass1- -
         if( abs_level_gtx_flag[ n ][ 0 ] ) {
            par_level_flag[ n ]
            remBinsPass1- -
            abs_level_gtx_flag[ n ][ 1 ]
            remBinsPass1- -
         }
         if( lastSigScanPosSb = = −1 )
            lastSigScanPosSb = n
         firstSigScanPosSb = n
      }
      AbsLevelPass1[ xC ][ yC ] = sig_coeff_flag[ xC ][ yC ] + par_level_flag
[ n ] +
                  abs_level_gtx_flag[ n ][ 0 ] + 2 * abs_level_gtx_flag[ n ]
[ 1 ]
      if( ph_dep_quant_enabled_flag )
         QState = QStateTransTable[ QState ][ AbsLevelPass1[ xC ][ yC ] & 1 ]
      firstPosMode1 = n − 1
   }
   for( n = firstPosMode0; n > firstPosMode1; n- - ) {
      xC = ( xS << log2SbW ) + DiagScanOrder[ log2SbW ][ log2SbH ][ n ]
[ 0 ]
      yC = (yS << log2SbH ) + DiagScanOrder[ log2SbW ][ log2SbH ][ n ]
[ 1 ]
      if( abs_level_gtx_flag[ n ][ 1 ] )
         abs_remainder[ n ]
      AbsLevel[ xC ][ yC ] = AbsLevelPass1[ xC ][ yC ] +2 * abs_remainder
[ n ]
   }
   for( n = firstPosMode1; n >= 0; n- - ) {
      xC = ( xS << log2SbW ) + DiagScanOrder[ log2SbW ][ log2SbH ][ n ]
[ 0 ]
      yC = ( yS << log2SbH ) + DiagScanOrder[ log2SbW ][ log2SbH ][ n ]
[ 1 ]
      if( coded_sub_block_flag[ xS ][ yS ] )
         dec_abs_level[ n ]
      if( AbsLevel[ xC ][ yC ] > 0 ) {
         if( lastSigScanPosSb = = −1 )
            lastSigScanPosSb = n
         firstSigScanPosSb = n
      }
``` | ae(v)<br><br><br><br><br><br><br><br><br><br><br><br><br>ae(v)<br><br><br><br>ae(v)<br><br><br>ae(v)<br><br>ae(v)<br><br><br><br><br><br><br><br><br><br><br><br><br><br><br><br><br><br><br>ae(v)<br><br><br><br><br><br><br>ae(v) |

TABLE 17-continued

Descriptor

```
        if( ph dep quant enabled flag )
            QState = QStateTransTable[ QState ][ AbsLevel[ xC ][ yC ] & 1 ]
    }
    if( ph dep quant enabled flag || !pic sign data hiding enabled flag )
        signHidden = 0
    else
        signHidden = ( lastSigScanPosSb − firstSigScanPosSb > 3 ? 1 : 0 )
    for( n = numSbCoeff − 1; n >= 0; n− − ) {
        xC = ( xS << log2SbW ) + DiagScanOrder[ log2SbW ][ log2SbH ][ n ]
[ 0 ]
        yC = ( yS << log2SbH ) + DiagScanOrder[ log2SbW ][ log2SbH ][ n ]
[ 1 ]
        if( ( AbsLevel[ xC ][ yC ] > 0 ) &&
          ( !signHidden || ( n != firstSigScanPosSb ) ) )
            coeff_sign_flag[ n ]                                                    ae(v)
    }
    if( ph_dep_quant_enabled_flag &&! slice_ts_residual_coding_disabled_flag )
{
        QState = startQStateSb
        for( n = numSbCoeff − 1; n >= 0; n− − ) {
            xC = ( xS << log2SbW ) + DiagScanOrder[ log2SbW ][ log2SbH ]
[ n ][ 0 ]
            yC = ( yS << log2SbH ) + DiagScanOrder[ log2SbW ][ log2SbH ][ n ]
[ 1 ]
            if( AbsLevel[ xC ][ yC ] > 0 )
                TransCoeffLevel[ x0 ][ y0 ][ cIdx ][ xC ][ yC ] =
                    ( 2 * AbsLevel[ xC ][ yC ] − ( QState > 1 ? 1 : 0 ) ) *
                    ( 1 − 2 * coeff sign flag[ n ] )
            QState = QStateTransTable[ QState ][ AbsLevel[ xC ][ yC ] & 1 ]
    } else {
        sumAbsLevel = 0
        for( n = numSbCoeff − 1; n >= 0; n− − ) {
            xC = ( xS << log2SbW ) + DiagScanOrder[ log2SbW ][ log2SbH ]
[ n ][ 0 ]
            yC = ( yS << log2SbH ) + DiagScanOrder[ log2SbW ][ log2SbH ][ n ]
[ 1 ]
            if( AbsLevel[ xC ][ yC ] > 0 ) {
                TransCoeffLevel[ x0 ][ y0 ][ cIdx ][ xC ][ yC ] =
                    AbsLevel[ xC ][ yC ] * ( 1 − 2 * coeff sign flag[ n ] )
                if( signHidden ) {
                    sumAbsLevel += AbsLevel[ xC ][ yC ]
                    if( ( n = = firstSigScanPosSb ) && ( sumAbsLevel % 2 ) = =
1 ) )
                        TransCoeffLevel[ x0 ][ y0 ][ cIdx ][ xC ][ yC ] =
                            −TransCoeffLevel[ x0 ][ y0 ][ cIdx ][ xC ][ yC ]
                }
            }
        }
    }
  }
 }
}
```

Referring to Table 17 as described above, in case that the value of the ph_dep_quant_enabled_flag is 1, and the value of the slice_ts_residual_coding_disabled_flag is 0, the Qstate may be derived, and the value of the transform coefficient (transform coefficient level) may be derived based on the Qstate. For example, referring to Table 17, the transform coefficient level TransCoeffLevel[x0][y0][cIdx][xC][yC] may be derived as (2*AbsLevel[xC][yC]−(QState>1?1:0)) (1−2*coeff_sign_flag[n]). Here, the AbsLevel[xC][yC] may be an absolute value of the transform coefficient derived based on the syntax elements of the transform coefficient, the coeff_sign_flag[n] may be a syntax element of a sign flag representing the sign of the transform coefficient, and the (QState>1?1:0) may represent 1 if the value of the state QState is larger than 1, that is, if the value of the state Qstate is 2 or 3, and may represent 0 if the value of the state Qstate is equal to or smaller than 1, that is, if the value of the state Qstate is 0 or 1.

Further, referring to Table 17 as described above, if the value of the slice_ts_residual_coding_disabled_flag is 1, the value of the transform coefficient (transform coefficient level) may be derived without using the Qstate. For example, referring to Table 17, the transform coefficient level TransCoeffLevel[x0][y0][cIdx][xC][yC] may be derived as AbsLevel[xC][yC]*(1-2*coeff_sign_flag[n]). Here, the AbsLevel[xC][yC] may be an absolute value of the transform coefficient derived based on the syntax elements of the transform coefficient, and the coeff_sign_flag[n] may be an syntax element of a sign flag representing the sign of the transform coefficient.

Further, according to the present embodiment, if the value of the slice_ts_residual_coding_disabled_flag is 1, the state of the dependent quantization may not be used in coding the level value of the transform coefficient, and the state update may also not be performed. For example, the residual coding syntax according to the present embodiment may be as in the following table.

TABLE 18

| residual coding( x0, y0, log2TbWidth, log2TbHeight, cIdx ) { | Descriptor |
|---|---|
|   if( sps_mts_enabled_flag && cu_sbt_flag && cIdx = = 0 && | |
|     log2TbWidth = = 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|     log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 - log2SbW | |
|     } else if( log2TbHeight < 2 ) { | |
|       log2SbH = log2TbHeight | |
|       log2SbW = 4 - log2SbH | |
|     } | |
|   numSbCoeff = 1 << ( log2SbW + log2SbH ) | |
|   lastScanPos = numSbCoeff | |
|   lastSubBlock = ( 1 << ( log2TbWidth + log2TbHeight - (log2SbW + log2SbH ) ) ) - 1 | |
|   do { | |
|     if( lastScanPos = = 0 ) { | |
|       lastScanPos = numSbCoeff | |
|       lastSubBlock- - | |
|     } | |
|     lastScanPos- - | |
|     xS = DiagScanOrder[ log2TbWidth - log2SbW ][ log2TbHeight - log2SbH ][ lastSubBlock ][ 0 ] | |
|     yS = DiagScanOrder[ log2TbWidth - log2SbW ][ log2TbHeight - log2SbH ][ lastSubBlock ][ 1 ] | |
|     xC = ( xS << log2SbW) + DiagScanOrder[ log2SbW ][ log2SbH ][ lastScanPos ][ 0 ] | |
|     yC = ( yS << log2SbH ) + DiagScanOrder log2SbW ][ log2SbH ][ lastScanPos ][ 1 ] | |
|   } while( ( xC != LastSignificantCoeffX ) | | ( yC != LastSignificantCoeffY ) ) | |
|   if( lastSubBlock = = 0 && log2TbWidth >= 2 && log2TbHeight >= 2 && | |
|     !transform_skip_flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight > 2 ) | | | |
|     ( lastScanPos > 7 && ( log2TbWidth = = 2 | | log2TbWidth = = 3 ) && | |
|     log2TbWidth = = log2TbHeight ) ) | |
|     LfnstZeroOutSigCoeffFlag = 0 | |
|   if( ( lastSubBlock > 0 | | lastScanPos > 0 ) && cIdx = = 0 ) | |
|     MtsDcOnly = 0 | |
|   QState = 0 | |
|   for( i = lastSubBlock; i >= 0; i- - ) { | |
|     startQStateSb = QState | |
|     xS = DiagScanOrder[ log2TbWidth - log2SbW ][ log2TbHeight - log2SbH ][ i ][ 0 ] | |
|     yS = DiagScanOrder[ log2TbWidth - log2SbW ][ log2TbHeight - log2SbH ][ i ][ 1 ] | |
|     inferSbDcSigCoeffFlag = 0 | |
|     if( i < lastSubBlock && i > 0 ) { | |
|       coded_sub_block_flag[ xS ][ yS ] | ae(v) |
|       inferSbDcSigCoeffFlag = 1 | |
|     } | |

TABLE 18-continued

| residual coding( x0, y0, log2TbWidth, log2TbHeight, cIdx ) { | Descriptor |
|---|---|
|     if( coded_sub_block_flag[ xS ][ yS ] && ( xS > 3 \|\| yS > 3 ) && cIdx == 0 ) | |
|       MtsZeroOutSigCoeffFlag = 0 | |
|     firstSigScanPosSb = numSbCoeff | |
|     lastSigScanPosSb = −1 | |
|     firstPosMode0 = ( i == lastSubBlock ? lastScanPos : numSbCoeff - 1 ) | |
|     firstPosMode1 = firstPosMode0 | |
|     for( n = firstPosMode0; n >= 0 && remBinsPass1 >= 4; n- - ) { | |
|       xC = (xS << log2SbW ) + DiagScanOrder[ log2SbW ][ log2SbH ][ n ][ 0 ] | |
|       yC = ( yS << log2SbH) + DiagScanOrder[ log2SbW ][ log2SbH ][ n ][ 1 ] | |
|       if( coded_sub_block_flag[ xS ][ yS ] && (n > 0 \|\| !inferSbDcSigCoeffFlag ) && | |
|         (xC != LastSignificantCoefX \|\| yC != Last SignificantCoeffY ) ) { | |
|         sig coeff flag[ xC ][ yC ] | ae(v) |
|         remBinsPass1- - | |
|         if( sig coeff flag[ xC ][ yC ] ) | |
|           inferSbDcSigCoeffFlag = 0 | |
|       } | |
|       if( sig coeff flag[ xC ][ yC ] ) { | |
|         abs_level_gtx_flag[ n ][ 0 ] | ae(v) |
|         remBinsPass1- - | |
|         if( abs level gtx flag[ n ][ 0 ] ) { | |
|           par_level_flag[ n ] | ae(v) |
|           remBinsPass1- - | |
|           abs_level_gtx_flag[ n ][ 1 ] | ae(v) |
|           remBinsPass1- - | |
|         } | |
|         if( lastSigScanPosSb == -1 ) | |
|           lastSigScanPosSb = n | |
|         firstSigScanPosSb = n | |
|       } | |
|       AbsLevelPass1[ xC ][ yC ] = sig_coeff_flag[ xC ][ yC ] + par_level_flag[ n ] + | |
|           abs_level_gtx_flag[ n ][ 0 ] + 2 * abs_level_gtx_flag[ n ][ 1 ] | |
|       if( ph_dep_quant_enabled_flag && !slice_ts_residual_coding_disabled_flag ) | |
|         QState = QStateTransTable[ QState ][ AbsLevelPass1[ xC ][ yC ] & 1 ] | |
|       firstPosMode 1 = n - 1 | |
|     } | |
|     for( n = firstPosMode0; n > firstPosMode 1; n- - ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( abs level gtx flag[ n ][ 1 ] ) | |
|         abs_remainder[ n ] | ae(v) |
|       AbsLevel[ xC ][ yC ] = AbsLevelPass1[ xC ][ yC ] +2 * abs_remainder[ n ] | |
|     } | |
|     for( n = firstPosMode1; n >= 0; n- - ) { | |
|       xC = ( xS << log2SbW) + DiagScanOrder[ log2SbW ][ log2SbH ] [ n ][ 0 ] | |
|       yC = ( yS << log2SbH) + DiagScanOrder[ log2SbW ][ log2SbH ][ n ][ 1 ] | |
|       if( coded sub block flag[ xS ][ yS ] ) | |
|         dec_abs_level[ n ] | ae(v) |
|       if( AbsLevel[ xC ][ yC ] > 0 ) { | |
|         if( lastSigScanPosSb == −1 ) | |
|           lastSigScanPosSb = n | |
|         firstSigScanPosSb = n | |
|       } | |
|       if( ph_dep_quant_enabled_flag && !slice_ts_residual_coding_disabled_flag ) | |
|         QState = QStateTransTable[ QState ][ AbsLevel[ xC ][ yC ] & 1 ] | |
|     } | |
|     if( ph dep quant enabled flag \|\| !pic sign data hiding enabled flag) | |
|       signHidden = 0 | |
|     else | |
|       signHidden = ( lastSigScanPosSb - firstSigScanPosSb > 3 ? 1 : 0 ) | |
|     for( n = numSbCoeff - 1; n >= 0; n- - ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( ( AbsLevel[ xC ][ yC ] > 0 ) && | |

TABLE 18-continued

```
residual coding( x0, y0, log2TbWidth, log2TbHeight, cIdx ) {                              Descriptor
            ( !signHidden | | (n != firstSigScanPosSb ) ) )
            coeff_sign_flag[ n ]                                                          ae(v)
        }
        if( ph_dep_quant_enabled_flag && !slice_ts_residual_coding_disabled_flag
) {
            QState = startQStateSb
            for( n = numSbCoeff - 1; n >= 0; n- - ) {
                xC = ( xS << log2SbW) + DiagScanOrder[log2SbW ][ log2SbH ]
[ n ][ 0 ]
                yC = ( yS << log2SbH ) + DiagScanOrder[ log2SbW ][ log2SbH ][ n ]
[ 1 ]
                if( AbsLevel[ xC ][ yC ] > 0 )
                    TransCoeffLevel[ x0 ] [ y0 ][ cIdx ][ xC ][ yC ] =
                        ( 2 * AbsLevel[ xC ][ yC ] - ( QState > 1 ? 1 : 0 ) ) *
                        ( 1 - 2 * coeff sign flag[ n ] )
                QState = QStateTransTable[ QState ][ AbsLevel ][ xC ][ yC ] & 1 ]
        } else {
            sumAbsLevel = 0
            for( n = numSbCoeff - 1: n >= 0; n- - ) {
                xC = ( xS << log2SbW ) + DiagScanOrder[ log2SbW ][ log2SbH ]
[ n ][ 0 ]
                yC = ( yS << log2SbH ) + DiagScanOrder[ log2SbW ][ log2SbH ][ n ]
[ 1 ]
                if( AbsLevel[ xC ][ yC ] > 0 ) {
                    TransCoeffLevel[ x0 ] [ y0 ][ cIdx ][ xC ][ yC ] =
                        AbsLevel[ xC ][ yC ] * ( 1 - 2 * coeff sign flag[ n ] )
                    if( signHidden ) {
                        sumAbsLevel += AbsLevel[ xC ][ yC ]
                        if( (n = = firstSigScanPosSb ) && ( sumAbsLevel % 2 ) = =
1 ) )
                            TransCoeffLevel[ x0 ][ y0 ][ cIdx ][ xC ][ yC ] =
                                -TransCoeffLevel[ x0 ][ y0 ][ cIdx ][ xC ][ yC ]
                    }
                }
            }
        }
    }
}
```

Referring to Table 18 as described above, if the value of the ph_dep_quant_enabled_flag is 1, and the value of the slice_ts_residual_coding_disabled_flag is 0, the Qstate may be updated. For example, if the value of the ph_dep_quant_enabled_flag is 1, and the value of the slice_ts_residual_coding_disabled_flag is 0, the QState may be updated as QStateTransTable[QState][AbsLevelPass1[xC][yC] & 1] or QStateTransTable[QState][AbsLevel[xC][yC] & 1]. Further, if the value of the slice_ts_residual_coding_disabled_flag is 1, a process of updating the Qstate may not be performed.

Further, referring to Table 18 as described above, if the value of the ph_dep_quant_enabled_flag is 1, and the value of the slice_ts_residual_coding_disabled_flag is 0, the value of the transform coefficient (transform coefficient level) may be derived based on the QState. For example, referring to Table 18, the transform coefficient level TransCoeffLevel[x0][y0][cIdx][xC][yC] may be derived as (2*AbsLevel[xC][yC]-(QState>1?1:0))*(1-2*coeff_sign_flag[n]). Here, the AbsLevel[xC][yC] may be an absolute value of the transform coefficient derived based on the syntax elements of the transform coefficient, the coeff_sign_flag[n] may be the syntax element of the sign flag representing the sign of the transform coefficient, and the (QState>1? 1:0) may represent 1 if the value of the state QState is larger than 1, that is, if the value of the state Qstate is 2 or 3, and may represent 0 if the value of the state Qstate is equal to or smaller than 1, that is, if the value of the state Qstate is 0 or 1.

Further, referring to Table 18 as described above, if the value of the slice_ts_residual_coding_disabled_flag is 1, the value of the transform coefficient (transform coefficient level) may be derived without using the Qstate. For example, referring to Table 18, the transform coefficient level TransCoeffLevel[x0][y0][cIdx][xC][yC] may be derived as AbsLevel[xC][yC] *(1-2*coeff_sign_flag[n]). Here, the AbsLevel[xC][yC] may be an absolute value of the transform coefficient derived based on the syntax elements of the transform coefficient, and the coeff_sign_flag[n] may be an syntax element of a sign flag representing the sign of the transform coefficient.

Further, the present disclosure proposes another embodiment for configuring dependencies/restrictions between the dependent quantization and the residual coding (i.e., coding of residual samples of the transform skip block in the current slice through the RRC) in case that the slice_ts_residual_coding_disabled_flag=1. For example, the present embodiment proposes a scheme for adding restrictions using a transform_skip_flag in a process of deriving the value of the transform coefficient (transform coefficient level) dependently on the state update or the state of the dependent quantization in the RRC. That is, the present embodiment proposes a scheme for making the process of deriving the value of the transform coefficient (transform coefficient level) not in use dependently on the state update and/or the state of the dependent quantization in the RRC based on the transform_skip_flag. The residual coding syntax according to the present embodiment may be as in the following Table.

TABLE 19

| residual coding( x0, y0, log2TbWidth, log2TbHeight, cIdx ) { | Descriptor |
|---|---|
|   if( sps_mts_enabled_flag && cu_sbt_flag && cIdx = = 0 && | |
|     log2TbWidth = = 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|     log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 - log2SbW | |
|     } else if( log2TbHeight < 2 ) { | |
|       log2SbH = log2TbHeight | |
|       log2SbW = 4 - log2SbH | |
|     } | |
|   numSbCoeff = 1 << ( log2SbW + log2SbH ) | |
|   lastScanPos = numSbCoeff | |
|   lastSubBlock = ( 1 << ( log2TbWidth + log2TbHeight - (log2SbW + log2SbH ) ) ) - 1 | |
|   do { | |
|     if( lastScanPos = = 0 ) { | |
|       lastScanPos = numSbCoeff | |
|       lastSubBlock- - | |
|     } | |
|     lastScanPos- - | |
|     xS = DiagScanOrder[ log2TbWidth - log2SbW ][ log2TbHeight - log2SbH ] | |
|       [ lastSubBlock ][ 0 ] | |
|     yS = DiagScanOrder[ log2TbWidth - log2SbW ][ log2TbHeight - log2SbH ] | |
|       [ lastSubBlock ][ 1 ] | |
|     xC = ( xS << log2SbW) + DiagScanOrder[ log2SbW ][ log2SbH ][ lastScanPos ][ 0 ] | |
|     yC = ( yS << log2SbH ) + DiagScanOrder log2SbW ][ log2SbH ][ lastScanPos ][ 1 ] | |
|   } while( ( xC != LastSignificantCoeffX ) | | ( yC != LastSignificantCoeffY ) ) | |
|   if( lastSubBlock = = 0 && log2TbWidth >= 2 && log2TbHeight >= 2 && | |
|     !transform_skip_flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight > 2 ) | | | |
|     ( lastScanPos > 7 && ( log2TbWidth = = 2 | | log2TbWidth = = 3 ) && | |
|     log2TbWidth = = log2TbHeight ) ) | |
|     LfnstZeroOutSigCoeffFlag = 0 | |
|   if( ( lastSubBlock > 0 | | lastScanPos > 0 ) && cIdx = = 0 ) | |
|     MtsDcOnly = 0 | |
|   QState = 0 | |
|   for( i = lastSubBlock; i >= 0; i- - ) { | |
|     startQStateSb = QState | |
|     xS = DiagScanOrder[ log2TbWidth - log2SbW ][ log2TbHeight - log2SbH ] | |
|       [ i ][ 0 ] | |
|     yS = DiagScanOrder[ log2TbWidth - log2SbW ][ log2TbHeight - log2SbH ] | |
|       [ i ][ 1 ] | |
|     inferSbDcSigCoeffFlag = 0 | |
|     if( i < lastSubBlock && i > 0 ) { | |
|       coded_sub_block_flag[ xS ][ yS ] | ae(v) |
|       inferSbDcSigCoeffFlag = 1 | |
|     } | |

TABLE 19-continued

| residual coding( x0, y0, log2TbWidth, log2TbHeight, cIdx ) { | Descriptor |
|---|---|
|     if( coded_sub_block_flag[ xS ][ yS ] && ( xS > 3 \|\| yS > 3 ) && cIdx == 0 ) | |
|         MtsZeroOutSigCoeffFlag = 0 | |
|     firstSigScanPosSb = numSbCoeff | |
|     lastSigScanPosSb = −1 | |
|     firstPosMode0 = ( i == lastSubBlock ? lastScanPos : numSbCoeff - 1 ) | |
|     firstPosMode1 = firstPosMode0 | |
|     for( n = firstPosMode0; n >= 0 && remBinsPass1 >= 4; n- - ) { | |
|         xC = (xS << log2SbW ) + DiagScanOrder[ log2SbW ][ log2SbH ][ n ][ 0 ] | |
|         yC = ( yS << log2SbH) + DiagScanOrder[ log2SbW ][ log2SbH ][ n ][ 1 ] | |
|         if( coded_sub_block_flag[ xS ][ yS ] && (n > 0 \|\| !inferSbDcSigCoeffFlag ) && | |
|             (xC != LastSignificantCoefX \|\| yC != Last SignificantCoeffY ) ) { | |
|             sig coeff flag[ xC ][ yC ] | ae(v) |
|             remBinsPass1- - | |
|             if( sig coeff flag[ xC ][ yC ] ) | |
|                 inferSbDcSigCoeffFlag = 0 | |
|         } | |
|         if( sig coeff flag[ xC ][ yC ] ) { | |
|             abs level gtx flag[ n ][ 0 ] | ae(v) |
|             remBinsPass1- - | |
|             if( abs level gtx flag[ n ][ 0 ] ) { | |
|                 par level flag[ n ] | ae(v) |
|                 remBinsPass1- - | |
|                 abs level gtx flag[ n ][ 1 ] | ae(v) |
|                 remBinsPass1- - | |
|             } | |
|             if( lastSigScanPosSb == -1 ) | |
|                 lastSigScanPosSb = n | |
|             firstSigScanPosSb = n | |
|         } | |
|         AbsLevelPass1[ xC ][ yC ] = sig_coeff_flag[ xC ][ yC ] + par_level_flag[ n ] + | |
|             abs_level_gtx_flag[ n ][ 0 ] + 2 * abs_level_gtx_flag[ n ][ 1 ] | |
|         if( ph_dep_quant_enabled_flag && !transform_skip_flag[ x0 ][y0 ][ cIdx ] ) | |
|             QState = QStateTransTable[ QState ][ AbsLevelPass1[ xC ][ yC ] & 1 ] | |
|         firstPosMode 1 = n - 1 | |
|     } | |
|     for( n = firstPosMode0; n > firstPosMode 1; n- - ) { | |
|         xC = ( xS << log2SbW ) + DiagScanOrder[ log2SbW ][ log2SbH ][ n ][ 0 ] | |
|         yC = ( yS << log2SbH ) + DiagScanOrder[ log2SbW ][ log2SbH ][ n ][ 1 ] | |
|         if( abs level gtx flag[ n ][ 1 ] ) | |
|             abs_remainder[ n ] | ae(v) |
|         AbsLevel[ xC ][ yC ] = AbsLevelPass1[ xC ][ yC ] +2 * abs_remainder[ n ] | |
|     } | |
|     for( n = firstPosMode1; n >= 0; n- - ) { | |
|         xC = ( xS << log2SbW) + DiagScanOrder[ log2SbW ][ log2SbH ] [ n ][ 0 ] | |
|         yC = ( yS << log2SbH) + DiagScanOrder[ log2SbW ][ log2SbH ][ n ][ 1 ] | |
|         if( coded sub block flag[ xS ][ yS ] ) | |
|             dec_abs_level[ n ] | ae(v) |
|         if( AbsLevel[ xC ][ yC ] > 0 ) { | |
|             if( lastSigScanPosSb == −1 ) | |
|                 lastSigScanPosSb = n | |
|             firstSigScanPosSb = n | |
|         } | |
|         if( ph_dep_quant_enabled_flag && !transform_skip_flag[ x0 ][y0 ][ cIdx ] ) | |
|             QState = QStateTransTable[ QState ][ AbsLevel[ xC ][ yC ] & 1 ] | |
|     } | |
|     if( ph dep quant enabled flag \|\| !pic sign data hiding enabled flag) | |
|         signHidden = 0 | |
|     else | |
|         signHidden = ( lastSigScanPosSb - firstSigScanPosSb > 3 ? 1 : 0 ) | |
|     for( n = numSbCoeff - 1; n >= 0; n- - ) { | |
|         xC = ( xS << log2SbW ) + DiagScanOrder[ log2SbW ][ log2SbH ][ n ][ 0 ] | |
|         yC = ( yS << log2SbH) + DiagScanOrder[ log2SbW ][ log2SbH ][ n ][ 1 ] | |
|         if( ( AbsLevel[ xC ][ yC ] > 0 ) && | |

TABLE 19-continued

| residual coding( x0, y0, log2TbWidth, log2TbHeight, cIdx ) { | Descriptor |
|---|---|
|       ( !signHidden | | (n != firstSigScanPosSb ) ) ) | |
|         coeff_sign_flag[ n ] | ae(v) |
|   } | |
|   if( ph_dep_quant_enabled_flag && !transform_skip_flag[ x0 ][y0 ][ cIdx ] ) | |
| { | |
|     QState = startQStateSb | |
|     for( n = numSbCoeff - 1; n >= 0; n- - ) { | |
|       xC = ( xS << log2SbW) + DiagScanOrder[log2SbW ][ log2SbH ] | |
| [ n ][ 0 ] | |
|       yC = ( yS << log2SbH ) + DiagScanOrder[ log2SbW ][ log2SbH ][ n ] | |
| [ 1 ] | |
|       if( AbsLevel[ xC ][ yC ] > 0 ) | |
|         TransCoeffLevel[ x0 ] [ y0 ][ cIdx ][ xC ][ yC ] = | |
|           ( 2 * AbsLevel[ xC ][ yC ] - ( QState > 1 ? 1 : 0 ) ) * | |
|           ( 1 - 2 * coeff sign flag[ n ] ) | |
|       QState = QStateTransTable[ QState ][ AbsLevel ][ xC ][ yC ] & 1 ] | |
|     } else { | |
|     sumAbsLevel = 0 | |
|     for( n = numSbCoeff - l; n >= 0; n- - ) { | |
|       xC = ( xS << log2SbW ) + DiagScanOrder[ log2SbW ][ log2SbH ] | |
| [ n ][ 0 ] | |
|       yC = ( yS << log2SbH ) + DiagScanOrder[ log2SbW ][ log2SbH ][ n ] | |
| [ 1 ] | |
|       if( AbsLevel[ xC ][ yC ] > 0 ) { | |
|         TransCoeffLevel[ x0 ] [ y0 ][ cIdx ][ xC ][ yC ] = | |
|           AbsLevel[ xC ][ yC ] * ( 1 - 2 * coeff sign flag[ n ] ) | |
|       if( signHidden ) { | |
|         sumAbsLevel += AbsLevel[ xC ][ yC ] | |
|         if( (n = = firstSigScanPosSb ) && ( sumAbsLevel % 2 ) = = | |
| 1 ) ) | |
|           TransCoeffLevel[ x0 ][ y0 ][ cIdx ][ xC ][ yC ] = | |
|             -TransCoeffLevel[ x0 ][ y0 ][ cIdx ][ xC ][ yC ] | |
|         } | |
|       } | |
|     } | |
|   } | |
| } | |

Referring to Table 19 as described above, if the value of the ph_dep_quant_enabled_flag is 1, and the value of the transform_skip_flag is 0, the Qstate may be updated. For example, if the value of the ph_dep_quant_enabled_flag is 1, and the value of the transform_skip_flag is 0, the Qstate may be updated as QStateTransTable[QState][AbsLevelPass1][xC][yC] & 1] or QStateTransTable[QState][AbsLevel[xC][yC] & 1]. Further, if the value of the transform_skip_flag is 1, the process of updating the Qstate may not be performed.

Further, referring to Table 19 as described above, if the value of the ph_dep_quant_enabled_flag is 1, and the value of the transform_skip_flag is 0, the Qstate may be derived, and the value of the transform coefficient (transform coefficient level) may be derived based on the QState. For example, referring to Table 19, the transform coefficient level TransCoeffLevel[x0][y0][cIdx][xC][yC] may be derived as (2*AbsLevel[xC][yC]−(QState>1? 1:0))*(1-2*coeff_sign_flag[n]). Here, the AbsLevel[xC][yC] may be an absolute value of the transform coefficient derived based on the syntax elements of the transform coefficient, the coeff_sign_flag[n] may be the syntax element of the sign flag representing the sign of the transform coefficient, and the (QState>1? 1:0) may represent 1 if the value of the state QState is larger than 1, that is, if the value of the state Qstate is 2 or 3, and may represent 0 if the value of the state Qstate is equal to or smaller than 1, that is, if the value of the state Qstate is 0 or 1.

Further, referring to Table 19 as described above, if the value of the transform_skip_flag is 1, the value of the transform coefficient (transform coefficient level) may be derived without using the Qstate. Accordingly, in case that the residual data according to the RRC is coded for the transform skip block, the value of the transform coefficient may be derived without using the Qstate. For example, referring to Table 19, the transform coefficient level TransCoeffLevel[x0][y0][cIdx][xC][yC] may be derived as AbsLevel[xC][yC] *(1-2*coeff_sign_flag[n]). Here, the AbsLevel[xC][yC] may be an absolute value of the transform coefficient derived based on the syntax elements of the transform coefficient, and the coeff_sign_flag[n] may be the syntax element of the sign flag representing the sign of the transform coefficient.

Further, the present disclosure proposes various embodiments related to signalling of the above-described syntax element sh_ts_residual_coding_disabled_flag.

For example, as described above, the sh_ts_residual_coding_disabled_flag is a syntax element defining whether the TSRC is not enabled, and in case that the transform skip block is not used, it may not be necessary to be signaled. That is, only in case that the syntax element for whether the transform skip block is used represents that the transform skip block is used, it may be significant to perform signaling of the sh_ts_residual_coding_disabled_flag.

Accordingly, the present disclosure proposes an embodiment for signaling the sh_ts_residual_coding_disabled_flag only in case that the sps_transform_skip_enabled_flag is 1. The syntax according to the present embodiment is as in the following table.

TABLE 20

| slice header( ) { | Descriptor |
|---|---|
| (...) | |
| if(sps transform skip enabled flag) | |
|    slice_ts_residual_coding_disabled_flag | u(1) |
| (...) | |
| } | |

Referring to Table 20, if the sps_transform_skip_enabled_flag is 1, the sh_ts_residual_coding_disabled_flag may be signaled, whereas if the sps_transform_skip_enabled_flag is 0, the sh_ts_residual_coding_disabled_flag may not be signaled. Here, for example, the sps_transform_skip_enabled_flag may represent whether the transform skip block is used. That is, for example, the sps_transform_skip_enabled_flag may represent whether the transform skip is enabled. For example, if the value of the sps_transform_skip_enabled_flag is 1, the sps_transform_skip_enabled_flag may represent that the transform skip flag (transform_skip_flag) may be present in the transform unit syntax, whereas if the value of the sps_transform_skip_enabled_flag is 0, the sps_transform_skip_enabled_flag may represent that the transform skip flag is not present in the transform unit syntax. Meanwhile, if the sh_ts_residual_coding_disabled_flag is not signaled, it may be inferred that the sh_ts_residual_coding_disabled_flag is 0. Further, the above-described sps_transform_skip_enabled_flag may be signaled in the SPS, or may be signaled in other high-level syntaxes (VPS, PPS, picture header syntax, and slice header syntax) being not the SPS, or low-level syntaxes (slice data syntax, coding unit syntax, and transform unit syntax). Further, it may be signaled prior to the slice_ts_residual_coding_disabled_flag.

Further, the present disclosure proposes an embodiment in which the above-described embodiments are combined in relation to the signaling of the sh_ts_residual_coding_disabled_flag. For example, as in the following table, an embodiment for signalling the sh_ts_residual_coding_disabled_flag may be proposed.

TABLE 21

| slice header( ) { | Descriptor |
|---|---|
| (...) | |
| if(!ph dep quant enabled flag \|\| sps transform skip enabled flag) | |
|    slice_ts_residual_coding_disabled_flag | u(1) |
| (...) | |
| } | |

Referring to Table 21, in case that the sps_transform_skip_enabled_flag is 1, or the ph_dep_quant_enabled_flag is 0, the sh_ts_residual_coding_disabled_flag may be signaled, and otherwise, the sh_ts_residual_coding_disabled_flag may not be signaled. Meanwhile, in case that the sh_ts_residual_coding_disabled_flag is not signaled, the sh_ts_residual_coding_disabled_flag may be inferred as 0.

Further, for example, an embodiment for signaling the sh_ts_residual_coding_disabled_flag as in the following table may be proposed.

TABLE 22

| picture header structure( ) { | Descriptor |
|---|---|
| (...) | |
| ph dep quant enabled flag | |
| if(!ph dep quant enabled flag && sps transform skip enabled flag) | |
|    ph_ts_residual_coding_disabled_flag | u(1) |
| (...) | |
| } | |

Referring to Table 22, the sh_ts_residual_coding_disabled_flag may be signaled to a picture header. The sh_ts_residual_coding_disabled_flag may be represented as the ph_ts_residual_coding_disabled_flag. Further, referring to Table 22, the ph_dep_quant_enabled_flag may be signaled to the picture header.

For example, referring to Table 22, in case that the ph_dep_quant_enabled_flag is 0, and the sps_transform_skip_enabled_flag is 1, the ph_ts_residual_coding_disabled_flag may be signaled, and otherwise, the ph_ts_residual_coding_disabled_flag may not be signaled. Meanwhile, in case that the ph_ts_residual_coding_disabled_flag is not signaled, the ph_ts_residual_coding_disabled_flag may be inferred as 0.

In the existing video/image coding standard in relation to syntax elements described in the embodiments of the present disclosure, the ph_dep_quant_enabled_flag may be signaled in the picture header syntax, and the sh_ts_residual_coding_disabled_flag may be signaled in the slice header syntax. In relation to this, the present disclosure proposes an embodiment for signaling two syntax elements in the same high-level syntax or low-level syntax.

For example, an embodiment may be proposed, in which both the ph_dep_quant_enabled_flag and the sh_ts_residual_coding_disabled_flag are signaled in the picture header syntax. In this case, the sh_ts_residual_coding_disabled_flag may be called the ph_ts_residual_coding_disabled_flag.

Further, for example, an embodiment may be proposed, in which both the ph_dep_quant_enabled_flag and the sh_ts_residual_coding_disabled_flag are signaled in the slice header syntax. In this case, the ph_dep_quant_enabled_flag may be called the sh_dep_quant_enabled_flag, sh_dep_quant_used_flag, or slice_dep_quant_enabled_flag.

Further, for example, an embodiment may be proposed, in which both the ph_dep_quant_enabled_flag and the ph_ts_residual_coding_disabled_flag are signaled in the same HLS, but the ph_ts_residual_coding_disabled_flag is signaled only in case that the value of the ph_dep_quant_enabled_flag is 0. For example, an example in which both the ph_dep_quant_enabled_flag and the ph_ts_residual_coding_disabled_flag are signaled in the picture header syntax may be as in the following table.

TABLE 23

| picture header structure( ) { | Descriptor |
|---|---|
| (...) | |
| ph_dep_quant_enabled_flag | |
| if(!ph dep quant enabled flag) | |
|    ph_ts_residual_coding_disabled_flag | u(1) |
| (...) | |
| } | |

Referring to Table 23, the ph_dep_quant_enabled_flag may be signaled in the picture header syntax, and if the value of the ph_dep_quant_enabled_flag is 0, the ph_ts_residual_coding_disabled_flag may be signaled in the picture header syntax, whereas if the value of the ph_dep_quant_enabled_flag is 1, the ph_ts_residual_coding_disabled_flag may not be signaled. For example, if the ph_ts_residual_coding_disabled_flag is not signaled, the ph_ts_residual_coding_disabled_flag may be inferred as 0.

Meanwhile, the above-described embodiment is an example, and an example may be proposed, in which the ph_dep_quant_enabled_flag and the ph_ts_residual_coding_disabled_flag are signaled in other high-level syntaxes (VPS, SPS, PPS, and slice header syntax) or low-level syntaxes (slice data syntax, coding unit syntax, and transform unit syntax) rather than the picture header syntax.

Further, for example, an embodiment may be proposed, in which both the ph_ts_residual_coding_disabled_flag and the ph_dep_quant_enabled_flag are signaled in the same HLS, but the ph_dep_quant_enabled_flag is signaled only in case that the value of the ph_ts_residual_coding_disabled_flag is 0.

TABLE 24

| picture header structure( ) { | Descriptor |
|---|---|
| (...) | |
| ph_ts_residual_coding_disabled_flag | |
| if(!ph ts residual coding disabled flag) | |
| ph_dep_quant_enabled_flag | u(1) |
| (...) | |
| } | |

Referring to Table 24, the ph_ts_residual_coding_disabled_flag may be signaled in the picture header syntax, and if the value of the ph_ts_residual_coding_disabled_flag is 0, the ph_dep_quant_enabled_flag may be signaled in the picture header syntax, whereas if the value of the ph_ts_residual_coding_disabled_flag is 1, the ph_dep_quant_enabled_flag may not be signaled. For example, if the ph_dep_quant_enabled_flag is not signaled, the ph_dep_quant_enabled_flag may be inferred as 0.

Meanwhile, the above-described embodiment is an example, and an example may be proposed, in which the ph_ts_residual_coding_disabled_flag and the ph_dep_quant_enabled_flag are signaled in other high-level syntaxes (VPS, SPS, PPS, and slice header syntax) or low-level syntaxes (slice data syntax, coding unit syntax, and transform unit syntax) rather than the picture header syntax.

Further, for example, an embodiment in which the above-described embodiments are combined with each other may be proposed. For example, an embodiment may be proposed, in which both the ph_dep_quant_enabled_flag and the ph_ts_residual_coding_disabled_flag are signaled in the same HLS, but the ph_ts_residual_coding_disabled_flag is signaled only in case that the value of the ph_dep_quant_enabled_flag is 0, or the value of the sps_transform_skip_enabled_flag is 1.

TABLE 25

| picture header structure( ) { | Descriptor |
|---|---|
| (...) | |
| ph dep quant enabled flag | |
| if(!ph dep quant enabled flag \|\| sps transform skip enabled flag) | |
| ph_ts_residual_coding_disabled_flag | u(1) |
| (...) | |
| } | |

Referring to Table 25, the ph_dep_quant_enabled_flag may be signaled in the picture header syntax, and in case that the value of the ph_dep_quant_enabled_flag is 0, or the value of the sps_transform_skip_enabled_flag is 1, the ph_ts_residual_coding_disabled_flag may be signaled in the picture header syntax, and otherwise, the ph_ts_residual_coding_disabled_flag may not be signaled. Here, for example, the sps_transform_skip_enabled_flag may represent whether the transform skip block is used. That is, for example, the sps_transform_skip_enabled_flag may represent whether the transform skip is enabled. For example, if the value of the sps_transform_skip_enabled_flag is 1, the sps_transform_skip_enabled_flag may represent that the transform skip flag (transform_skip_flag) may be present in the transform unit syntax, whereas if the value of the sps_transform_skip_enabled_flag is 0, the sps_transform_skip_enabled_flag may represent that the transform skip flag is not present in the transform unit syntax. For example, if the ph_ts_residual_coding_disabled_flag is not signaled, the ph_ts_residual_coding_disabled_flag may be inferred as 0.

Further, for example, an embodiment may be proposed, in which both the ph_dep_quant_enabled_flag and the ph_ts_residual_coding_disabled_flag are signaled in the same HLS (e.g., slice header syntax or the like), but the ph_ts_residual_coding_disabled_flag is signaled only in case that the value of the ph_dep_quant_enabled_flag is 0, and the value of the sps_transform_skip_enabled_flag is 1.

TABLE 26

| picture header structure( ) { | Descriptor |
|---|---|
| (...) | |
| ph_dep_quant_enabled_flag | |
| if(!ph dep quant enabled flag && sps transform skip enabled flag) | |
| ph_ts_residual_coding_disabled_flag | u(1) |
| (...) | |
| } | |

Referring to Table 26, the ph_dep_quant_enabled_flag may be signaled in the picture header syntax, and in case that the value of the ph_dep_quant_enabled_flag is 0, and the value of the sps_transform_skip_enabled_flag is 1, the ph_ts_residual_coding_disabled_flag may be signaled in the picture header syntax, and otherwise, the ph_ts_residual_coding_disabled_flag may not be signaled. For example, if the ph_ts_residual_coding_disabled_flag is not signaled, the ph_ts_residual_coding_disabled_flag may be inferred as 0.

Further, for example, an embodiment may be proposed, in which both the ph_dep_quant_enabled_flag and the ph_ts_residual_coding_disabled_flag are signaled in the same HLS, but the ph_ts_residual_coding_disabled_flag is signaled only in case that the value of the sps_transform_skip_enabled_flag is 1, and the ph_dep_quant_enabled_flag is signaled only in case that the value of the ph_ts_residual_coding_disabled_flag is 0.

TABLE 27

| picture header structure( ) { | Descriptor |
|---|---|
| (...) | |
| if(sps transform skip enabled flag) | |
| ph_ts_residual_coding_disabled_flag | |
| if(!ph ts residual coding disabled flag) | |
| ph dep quant enabled flag | u(1) |
| (...) | |
| } | |

Referring to Table 27, if the value of the sps_transform_skip_enabled_flag is 1, the ph_ts_residual_coding_disabled_flag may be signaled in the picture header syntax, whereas if the value of the ph_ts_residual_coding_disabled_flag is 0, the ph_dep_quant_enabled_flag may be signaled in the picture header syntax. For example, if the value of the sps_transform_skip_enabled_flag is 0, the ph_ts_residual_coding_disabled_flag may not be signaled. For example, if the ph_ts_residual_coding_disabled_flag is not signaled, the ph_ts_residual_coding_disabled_flag may be inferred as 0. Further, for example, if the value of the ph_ts_residual_coding_disabled_flag is 1, the ph_dep_quant_enabled_flag may not be signaled. For example, if the ph_dep_quant_enabled_flag is not signaled, the ph_dep_quant_enabled_flag may be inferred as 0, Meanwhile, as described above, information (syntax elements) in a syntax table disclosed in the present disclosure may be included in image/video information, configured/encoded by the encoding apparatus, and transferred to the decoding apparatus in the form of a bitstream. A decoding apparatus may parse/decode the information (syntax elements) in the corresponding syntax table. The decoding apparatus may perform block/image/video reconstruction procedure based on the decoded information.

Figure 14:
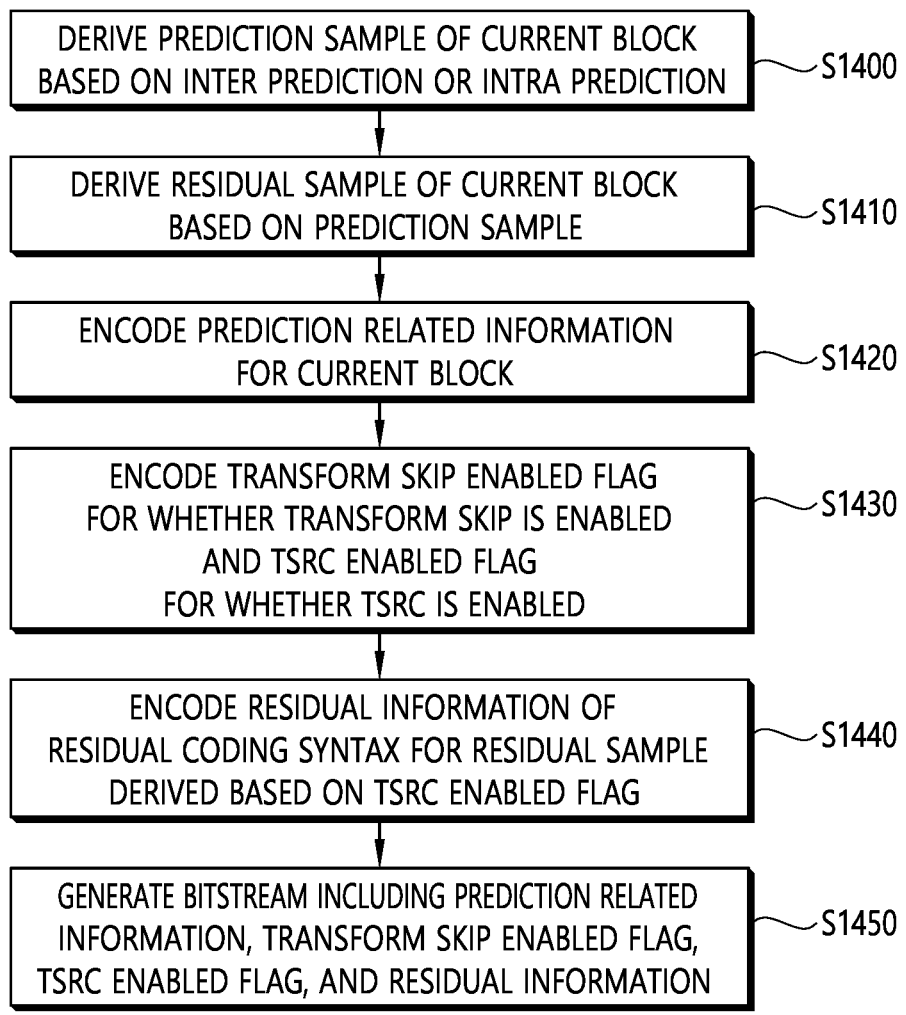
FIG. 14 briefly illustrates an image encoding method performed by an encoding apparatus according to the present disclosure.

FIG. 14 briefly illustrates an image encoding method performed by an encoding apparatus according to the present disclosure. The method disclosed in FIG. 14 may be performed by the encoding apparatus disclosed in FIG. 2. Specifically, for example, S1400 of FIG. 14 may be performed by the predictor of the encoding apparatus, S1410 of FIG. 14 may be performed by the residual processor of the encoding apparatus, and S1420 to S1450 of FIG. 14 may be performed by the entropy encoder of the encoding apparatus. Further, although not illustrated, a process of generating a reconstructed sample and a reconstructed picture for the current block based on the residual sample and the prediction sample for the current block may be performed by the adder of the encoding apparatus.

The encoding apparatus derives a prediction sample of the current block based on inter prediction or intra prediction (S1400). The encoding apparatus may derive prediction samples of the current block based on the prediction mode. In this case, various prediction methods disclosed in the present disclosure, such as inter prediction or intra prediction, may be applied.

For example, the encoding apparatus may determine whether to perform inter prediction or intra prediction for the current block, and may determine a specific inter prediction mode or a specific intra prediction mode based on an RD cost. The encoding apparatus may derive the prediction sample for the current block in accordance with the determined mode.

The encoding apparatus derives a residual sample of the current block based on the prediction sample (S1410). For example, the encoding apparatus may derive the residual sample through subtraction of the prediction sample from the original sample for the current block.

The encoding apparatus encodes prediction related information for the current block (S1420). For example, the encoding apparatus may generate and encode the prediction related information for the current block. The prediction related information may include prediction mode information representing the prediction mode of the current block.

The encoding apparatus encodes a transform skip enabled flag for whether transform skip is enabled and a transform skip residual coding (TSRC) enabled flag for whether TSRC is enabled (S1430).

For example, the encoding apparatus may encode the transform skip enabled flag for whether the transform skip is enabled. Image information may include the transform skip enabled flag. For example, the encoding apparatus may determine whether the transform skip is enabled for blocks of pictures in a sequence, and may encode the transform skip enabled flag for whether the transform skip is enabled. For example, the transform skip enabled flag may be a flag for whether the transform skip is enabled. For example, the transform skip enabled flag may represent whether the transform skip is enabled. That is, for example, the transform skip enabled flag may represent whether the transform skip is enabled for the blocks of the pictures in the sequence. For example, the transform skip enabled flag may represent whether the transform skip flag can be present. For example, the transform skip enabled flag having the value of 1 may represent that the transform skip is enabled, and the transform skip enabled flag having the value of 0 may represent that the transform skip is not enabled. That is, for example, the transform skip enabled flag having the value of 1 may represent that the transform skip flag can be present, and the transform skip enabled flag having the value of 0 may represent that the transform skip flag is not present. Further, for example, the transform skip enabled flag may be signaled to a sequence parameter set (SPS) syntax. The syntax element of the transform skip enabled flag may be the above-described sps_transform_skip_enabled_flag.

Further, for example, the encoding apparatus may encode the transform skip residual coding (TSRC) enabled flag for whether the TSRC is enabled. The image information may include the TSRC enabled flag.

For example, the encoding apparatus may encode the TSRC enabled flag based on the transform skip enabled flag. For example, the TSRC enabled flag may be encoded based on the transform skip enabled flag having the value of 1. That is, for example, if the value of the transform skip enabled flag is 1 (i.e., if the transform skip enabled flag represents that the transform skip is enabled), the TSRC enabled flag may be encoded. In other words, for example, if the value of the transform skip enabled flag is 1 (i.e., if the transform skip enabled flag represents that the transform skip is enabled), the TSRC enabled flag may be signaled. Further, for example, if the value of the transform skip enabled flag is 0, the TSRC enabled flag may not be encoded. That is, for example, if the value of the transform skip enabled flag is 0, the TSRC enabled flag may not be signaled, and the value of the TSRC enabled flag may be derived as 0 in the decoding apparatus.

Here, for example, the TSRC enabled flag may be a flag for whether the TSRC is enabled. That is, for example, the TSRC enabled flag may be a flag representing whether the TSRC is enabled for blocks in a slice. For example, the TSRC enabled flag having the value of 1 may represent that the TSRC is not enabled, and the TSRC enabled flag having the value of 0 may represent that the TSRC is enabled. Further, for example, the TSRC enabled flag may be signaled to a slice header syntax. The syntax element of the transform skip enabled flag may be the sh_ts_residual_coding_disabled_flag as described above.

Meanwhile, for example, the encoding apparatus may determine whether dependent quantization is enabled for the current block, and may encode the dependent quantization enabled flag for whether the dependent quantization is enabled. For example, the image information may include the dependent quantization enabled flag. For example, the dependent quantization enabled flag may be a flag for whether the dependent quantization is enabled, and the TSRC enabled flag may be encoded based on the transform skip enabled flag and the dependent quantization enabled flag. For example, the TSRC enabled flag may be encoded based on the dependent quantization enabled flag having the value of 0 and the transforms skip enabled flag having the value of 1. That is, for example, in case that the value of the dependent quantization enabled flag is 0 (i.e., the dependent quantization enabled flag represents that the dependent quantization is not enabled), and the value of the transform skip enabled flag is 1 (i.e., the transform skip enabled flag represents that the transform skip is enabled), the TSRC enabled flag may be encoded (or signaled). Further, for example, if the value of the dependent quantization enabled flag is 1, the TSRC enabled flag may not be encoded. That is, for example, if the value of the dependent quantization enabled flag is 1, the TSRC enabled flag may not be signaled, and the value of the TSRC enabled flag may be derived as 0 in the decoding apparatus.

Here, for example, the dependent quantization enabled flag may be a flag for whether the dependent quantization is enabled. That is for example, the dependent quantization enabled flag may represent whether the dependent quantization is enabled. For example, the dependent quantization enabled flag having the value of 1 may represent that the dependent quantization is enabled, and the dependent quantization enabled flag having the value of 0 may represent that the dependent quantization is not enabled. Further, for example, the dependent quantization enabled flag may be signaled to the SPS syntax or the slice header syntax. The syntax element of the dependent quantization enabled flag may be the sps_dep_quant_enabled_flag as described above. The sps_dep_quant_enabled_flag may be called the sh_dep_quant_enabled_flag, the sh_dep_quant_used_flag, or the ph_dep_quant_enabled_flag.

The encoding apparatus encodes residual information of a residual coding syntax for the residual sample derived based on the TSRC enabled flag (S1440).

For example, the residual coding syntax for the residual sample may be derived based on the TSRC enabled flag. For example, the encoding apparatus may determine the residual coding syntax for the current block as one of a regular residual coding (RRC) syntax and a transform skip residual coding (TSRC) syntax based on the TSRC enabled flag. The RRC syntax may represent a syntax according to RRC, and the TSRC syntax may represent a syntax according to the TSRC.

For example, based on the TSRC enabled flag having the value of 1, the residual coding syntax for the current block may be derived as the regular residual coding (RRC) syntax. In this case, for example, based on the transform skip enabled flag having the value of 1, the transform skip flag for whether the current block is the transform skip block may be encoded, and the value of the transform skip flag may be 1. For example, the image information may include the transform skip flag for the current block. The transform skip flag may represent whether the current block is the transform skip block. That is, the transform skip flag may represent whether the transform has been applied to the transform coefficients of the current block. The syntax element representing the transform skip flag may be the transform_skip_flag as described above. For example, if the value of the transform skip flag is 1, the transform skip flag may represent that the transform has not been applied to the current block (i.e., transform skipped), whereas if the value of the transform skip flag is 0, the transform skip flag may represent that the transform has been applied to the current block. For example, if the current block is the transform skip block, the value of the transform skip flag for the current block may be 1.

Further, for example, based on the TSRC enabled flag having the value of 0, the residual coding syntax for the current block may be derived as the transform skip residual coding (TSRC) syntax. Further, for example, the transform skip flag for whether the current block is the transform skip block may be encoded, and based on the transform skip flag having the value of 1 and the TSRC enabled flag having the value of 0, the residual coding syntax for the current block may be derived as the transform skip residual coding (TSRC) syntax. Further, for example, the transform skip flag for whether the current block is the transform skip block may be encoded, and based on the transform skip flag having the value of 0 and the TSRC enabled flag having the value of 0, the residual coding syntax for the current block may be derived as the regular residual coding (RRC) syntax.

Thereafter, for example, the encoding apparatus may encode the residual information of the derived residual coding syntax for the residual sample of the current block. The image information may include the residual information.

For example, the encoding apparatus may derive the transform coefficients of the current block based on the residual samples of the current block. For example, the encoding apparatus may determine whether the transform is applied for the current block. That is, the encoding apparatus may determine whether the transform is applied for the residual samples of the current block. The encoding apparatus may determine whether the transform is applied for the current block in consideration of the coding efficiency. For example, the encoding apparatus may determine that the transform is not applied for the current block. The block to which the transform is not applied may be represented as the transform skip block. That is, for example, the current block may be the transform skip block.

If the transform is not applied for the current block, that is, if the transform is not applied for the residual samples, the encoding apparatus may derive the derived residual samples as the current transform coefficients. Further, if the transform is applied for the current block, that is, if the transform is applied for the residual samples, the encoding apparatus may derive the transform coefficients by performing the transform for the residual samples. The current block may include a plurality of subblocks or coefficient groups (CGs). Further, the size of the subblock of the current block may be a 4×4 size or a 2×2 size. That is, the sub-block of the current block may maximally include 16 non-zero transform coefficients or 4 non-zero transform coefficients. Here, the current block may be the coding block (CB) or the transform block (TB). Further, the transform coefficient may be represented as the residual coefficient.

Meanwhile, the encoding apparatus may determine whether the dependent quantization is applied for the current block. For example, if the dependent quantization is applied for the current block, the encoding apparatus may derive the transform coefficients of the current block by performing the dependent quantization process for the transform coefficients. For example, if the dependent quantization is applied for the current block, the encoding apparatus may update the state (Qstate) for the dependent quantization based on the coefficient level of the transform coefficient just before the current transform coefficient in the scanning order, may derive the coefficient level of the current transform coefficient based on the updated state and the syntax elements for the current transform coefficient, and may derive the current transform coefficient by quantizing the derived coefficient level. For example, the current transform coefficient may be quantized based on the quantization parameter for the reconstructed level of the current transform coefficient in a scalar quantizer for the updated state.

For example, if the residual coding syntax for the current block is derived as the RRC syntax, the encoding apparatus may encode the residual information of the RRC syntax for the current block. For example, the residual information of the RRC syntax may include the syntax elements disclosed in Table 2 as described above.

For example, the residual information of the RRC syntax may include the syntax elements for the transform coefficient of the current block. Here, the transform coefficient may be represented as the residual coefficient.

For example, the syntax elements may include syntax elements, such as last_sig_coeff_x_prefix, last_sig_coeff_y_prefix, last_sig_coeff_x_suffix, last_sig_coeff_y_suffix, sb_coded_flag, sig_coeff_flag, par_level_flag, abs_level_gtX_flag (e.g., abs_level_gtx_flag[n][0] and/or abs_level_gtx_flag[n][1]), abs_remainder, dec_abs_level, and/or coeff_sign_flag.

Specifically, for example, the syntax elements may include position information representing the position of the last non-zero transform coefficient in a residual coefficient array of the current block. That is, the syntax elements may include the position information representing the position of the last non-zero transform coefficient in the scanning order of the current block. The position information may include information representing a prefix in a column position of the last non-zero transform coefficient, information representing a prefix in a row position of the last non-zero transform coefficient, information representing a suffix of the column position of the last non-zero transform coefficient, and information representing a suffix in the row position of the last non-zero transform coefficient. The syntax elements for the position information may be last_sig_coeff_x_prefix, last_sig_coeff_y_prefix, last_sig_coeff_x_suffix, and last_sig_coeff_y_suffix. Meanwhile, the non-zero transform coefficient may be called a significant coefficient.

Further, for example, the syntax elements may include a coded subblock flag representing whether the current subblock of the current block includes the non-zero transform coefficient, a significant coefficient flag representing whether the transform coefficient of the current block is the non-zero transform coefficient, a first coefficient level flag for whether the coefficient level for the transform coefficient is larger than a first threshold value, a parity level flag for a parity of the coefficient level, and/or a second coefficient level flag for whether the coefficient level of the transform coefficient is larger than a second threshold value. Here, the coded subblock flag may be the sb_coded_flag or coded_sub_block_flag, the significant coefficient flag may be the sig_coeff_flag, the first coefficient level flag may be the abs_level_gt1_flag or the abs_level_gtx_flag, the parity level flag may be the par_level_flag, and the second coefficient level flag may be the abs_level_gt3_flag or the abs_level_gtx_flag.

Further, for example, the syntax elements may include coefficient value related information for the transform coefficient value of the current block. The coefficient value related information may be an abs remainder and/or a dec_abs_level.

Further, for example, the syntax elements may include a sign flag representing the sign of the transform coefficient. The sign flag may be the coeff_sign_flag.

For example, if the residual coding syntax for the current block is derived as the TSRC syntax, the encoding apparatus may encode the residual information of the TSRC syntax for the current block. For example, the residual information of the TSRC syntax may include the syntax elements disclosed in Table 3 as described above.

For example, the residual information of the TSRC syntax may include the syntax elements for the transform coefficient of the current block. Here, the transform coefficient may be represented as the residual coefficient.

For example, the syntax elements may include context-coded syntax elements for the transform coefficient and/or bypass-coded syntax elements. The syntax elements may include the syntax elements, such as sig_coeff_flag, coeff_sign_flag, par_level_flag, abs_level_gtX_flag (e.g., abs_level_gtx_flag[n][0], abs_level_gtx_flag [n] [1], abs_level_gtx_flag[n][2], abs_level_gtx_flag [n] [3], and/or abs_level_gtx_flag[n][4]), abs_remainder, and/or coeff_sign_flag.

For example, the context-coded syntax elements for the transform coefficient may include a significant coefficient flag representing whether the transform coefficient is the non-zero transform coefficient, a sign flag representing the sign for the transform coefficient, a first coefficient level flag for whether the coefficient level for the transform coefficient is larger than a first threshold value, and/or a parity level flag for the parity of the transform level for the transform coefficient. Further, for example, the context-coded syntax elements may include a second coefficient level flag for whether the coefficient level of the transform coefficient Further, for example, the context-coded syntax elements may include a second coefficient level flag for whether the coefficient level of the transform coefficient is larger than a second threshold value, a third coefficient level flag for whether the coefficient level of the transform coefficient is larger than a third threshold value, a fourth coefficient level flag for whether the coefficient level of the transform coefficient is larger than a fourth threshold value, and/or a fifth coefficient level flag for whether the coefficient level of the transform coefficient is larger than a fifth threshold value. Here, the significant coefficient flag may be the sig_coeff_flag, the sign flag may be the ceff sign_flag, the first coefficient level flag may be the abs_level_gt1_flag, and the parity level flag may be the par_level_flag. Further, the second coefficient level flag may be the abs_level_gt3_flag or the abs_level_gtx_flag, the third coefficient level flag may be the abs_level_gt5_flag or the abs_level_gtx_flag, the fourth coefficient level flag may be the abs_level_gt7_flag or the abs_level_gtx_flag, and the fifth coefficient level flag may be the abs_level_gt9_flag or the abs_level_gtx_flag.

Further, for example, the bypass-coded syntax elements for the transform coefficient may include coefficient level information for the value of the transform coefficient (or coefficient level) and/or a sign flag representing the sign for the transform coefficient. The coefficient level information may be the abs_remainder and/or the dec_abs_level, and the sign flag may be the ceff_sign_flag.

The encoding apparatus generates a bitstream including the prediction related information, the transform skip enabled flag, the TSRC enabled flag, and the residual information (S1450). For example, the encoding apparatus may output image information including the prediction related information, the transform skip enabled flag, the TSRC enabled flag, and the residual information as the bitstream. The bitstream may include the prediction related information, the transform skip enabled flag, the TSRC enabled flag, and the residual information.

Meanwhile, the bitstream may be transmitted to the decoding apparatus through a network or a (digital) storage medium. Here, the network may include a broadcasting network and/or a communication network, and the digital storage medium may include various storage media, such as USB, SD, CD, DVD, Blu-ray, HDD, and SSD.

Figure 15:
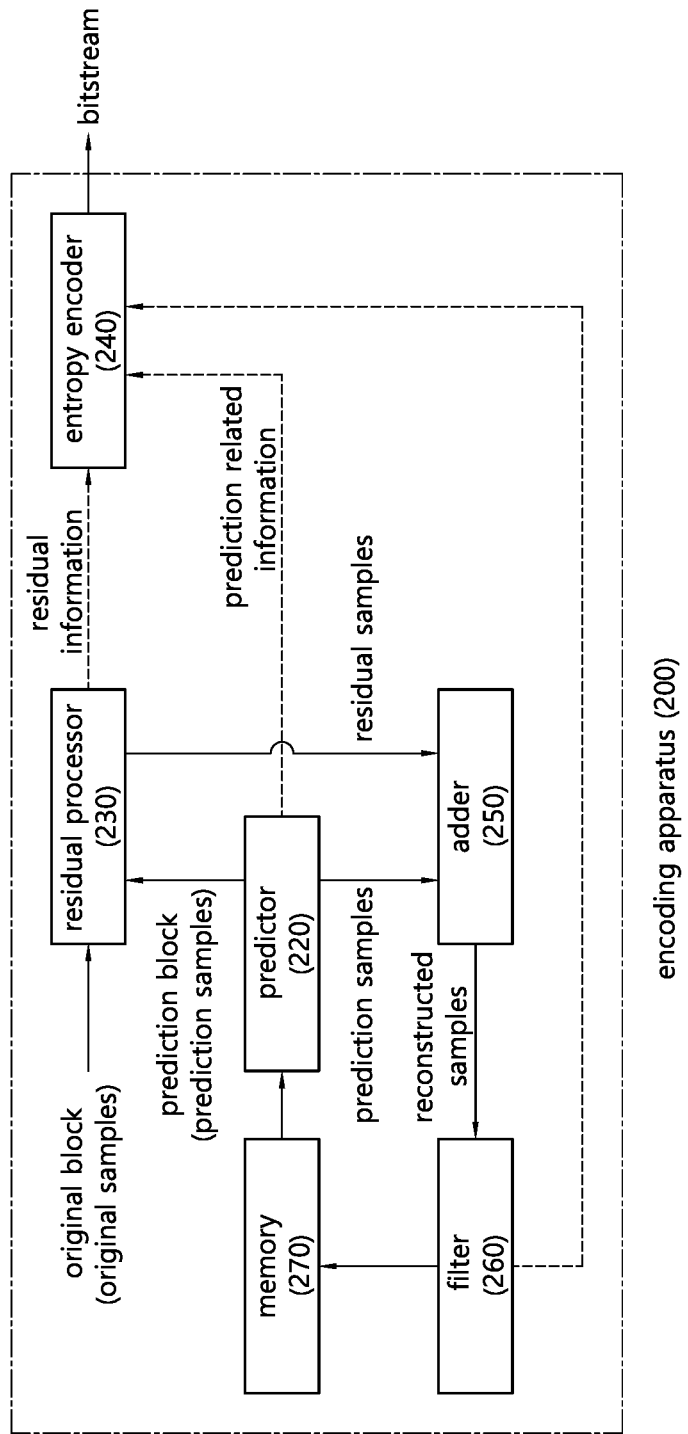
FIG. 15 briefly illustrates an encoding apparatus for performing an image encoding method according to the present disclosure.

FIG. 15 briefly illustrates an encoding apparatus for performing an image encoding method according to the present disclosure. The method disclosed in FIG. 14 may be performed by the encoding apparatus disclosed in FIG. 15. Specifically, for example, the predictor of the encoding apparatus of FIG. 15 may perform S1400 of FIG. 14, the residual processor of the encoding apparatus of FIG. 15 may perform S1410 of FIG. 14, and the entropy encoder of the encoding apparatus of FIG. 15 may perform S1420 to S1450 of FIG. 14. Further, although not illustrated, a process of generating a reconstructed sample and a reconstructed picture for the current block based on the residual sample and the prediction sample for the current block may be performed by the adder of the encoding apparatus.

Figure 16:
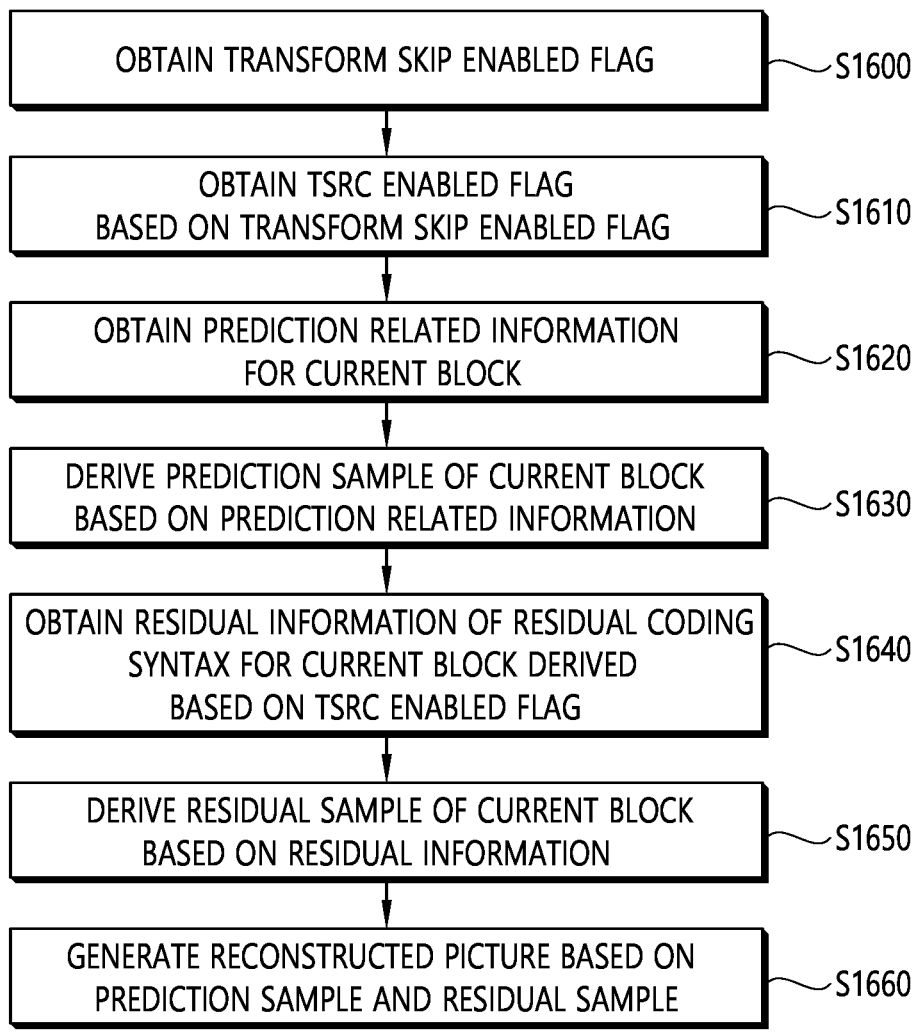
FIG. 16 briefly illustrates an image decoding method performed by a decoding apparatus according to the present disclosure.

FIG. 16 briefly illustrates an image decoding method performed by a decoding apparatus according to the present disclosure. The method disclosed in FIG. 10 may be performed by the decoding apparatus disclosed in FIG. 3. Specifically, for example, S1000 to S1030 of FIG. 10 may be performed by the entropy decoder of the decoding apparatus, S1040 of FIG. 10 may be performed by the residual processor of the decoding apparatus, and S1050 may be performed by the adder of the decoding apparatus. Further, although not illustrated, a process of receiving prediction information for the current block may be performed by the entropy decoder of the decoding apparatus, and a process of deriving a prediction sample of the current block may be performed by the predictor of the decoding apparatus.

The decoding apparatus obtains a transform skip enabled flag (S1600). The decoding apparatus may obtain image information including the transform skip enabled flag through a bitstream. The image information may include the transform skip enabled flag. Here, the current block may be a coding block (CB) or a transform block (TB). For example, the transform skip enabled flag may be a flag for whether transform skip is enabled. For example, the transform skip enabled flag may represent whether the transform skip is enabled. That is, for example, the transform skip enabled flag may represent whether the transform skip is enabled for blocks of pictures in a sequence. For example, the transform skip enabled flag may represent whether the transform skip flag can be present. For example, the transform skip enabled flag having the value of 1 may represent that the transform skip is enabled, and the transform skip enabled flag having the value of 0 may represent that the transform skip is not enabled. That is, for example, the transform skip enabled flag having the value of 1 may represent that the transform skip flag can be present, and the transform skip enabled flag having the value of 0 may represent that the transform skip flag is not present. Further, for example, the transform skip enabled flag may be signaled to a sequence parameter set (SPS) syntax. The syntax element of the transform skip enabled flag may be the above-described sps_transform_skip_enabled_flag.

The decoding apparatus obtains a transform skip residual coding (TSRC) enabled flag based on the transform skip enabled flag (S1610). The image information may include the TSRC enabled flag.

For example, the decoding apparatus may obtain the TSRC enabled flag based on the transform skip enabled flag.

For example, the TSRC enabled flag may be obtained based on the transform skip enabled flag having the value of 1. That is, for example, if the value of the transform skip enabled flag is 1 (i.e., if the transform skip enabled flag represents that the transform skip is enabled), the TSRC enabled flag may be obtained. In other words, for example, if the value of the transform skip enabled flag is 1 (i.e., if the transform skip enabled flag represents that the transform skip is enabled), the TSRC enabled flag may be signaled. Further, for example, if the value of the transform skip enabled flag is 0, the TSRC enabled flag may not be obtained, and the value of the TSRC enabled flag may be derived as 0. That is, for example, if the value of the transform skip enabled flag is 0, the TSRC enabled flag may not be signaled, and the value of the TSRC enabled flag may be derived as 0.

Here, for example, the TSRC enabled flag may be a flag for whether the TSRC is enabled. That is, for example, the TSRC enabled flag may be a flag representing whether the TSRC is enabled for blocks in a slice. For example, the TSRC enabled flag having the value of 1 may represent that the TSRC is not enabled, and the TSRC enabled flag having the value of 0 may represent that the TSRC is enabled. Further, for example, the TSRC enabled flag may be signaled to the slice header syntax. The syntax element of the transform skip enabled flag may be the sh_ts_residual_coding_disabled_flag as described above.

Meanwhile, for example, the decoding apparatus may obtain a dependent quantization enabled flag. For example, the image information may include the dependent quantization enabled flag. For example, the dependent quantization enabled flag may be a flag for whether the dependent quantization is enabled, and the TSRC enabled flag may be obtained based on the transform skip enabled flag and the dependent quantization enabled flag. For example, the TSRC enabled flag may be obtained based on the dependent quantization enabled flag having the value of 0 and the transforms skip enabled flag having the value of 1. That is, for example, in case that the value of the dependent quantization enabled flag is 0 (i.e., the dependent quantization enabled flag represents that the dependent quantization is not enabled), and the value of the transform skip enabled flag is 1 (i.e., the transform skip enabled flag represents that the transform skip is enabled), the TSRC enabled flag may be obtained (or signaled). Further, for example, if the value of the dependent quantization enabled flag is 1, the TSRC enabled flag may not be obtained, and the value of the TSRC enabled flag may be derived as 0. That is, for example, if the value of the dependent quantization enabled flag is 1, the TSRC enabled flag may not be signaled, and the value of the TSRC enabled flag may be derived as 0.

Here, for example, the dependent quantization enabled flag may be a flag for whether the dependent quantization is enabled. That is for example, the dependent quantization enabled flag may represent whether the dependent quantization is enabled. For example, the dependent quantization enabled flag having the value of 1 may represent that the dependent quantization is enabled, and the dependent quantization enabled flag having the value of 0 may represent that the dependent quantization is not enabled. Further, for example, the dependent quantization enabled flag may be signaled to the SPS syntax or the slice header syntax. The syntax element of the dependent quantization enabled flag may be the sps_dep_quant_enabled_flag as described above. The sps_dep_quant_enabled_flag may be called the sh_dep_quant_enabled_flag, the sh_dep_quant_used_flag, or the ph_dep_quant_enabled_flag.

The decoding apparatus obtains prediction related information for the current block (S1620). The decoding apparatus may obtain the prediction related information for the current block through the bitstream. For example, the image information may include the prediction related information for the current block. For example, the prediction related information may include prediction mode information for the current block. The prediction related information may represent whether inter prediction or intra prediction is applied to the current block.

The decoding apparatus derives a prediction sample of the current block based on the prediction related information (S1630). Based on the prediction related information, the decoding apparatus may determine whether the inter prediction or the intra prediction is applied to the current block, and based on this, may perform the prediction.

For example, the decoding apparatus may derive a prediction mode being applied to the current block based on the prediction related information, and may derive a prediction sample of the current block based on the prediction mode. For example, in case that inter prediction is applied to the current block, the decoding apparatus may derive motion information of the current block based on the prediction related information, and may derive the prediction sample of the current block based on the motion information. Further, for example, in case that intra prediction is applied to the current block, the decoding apparatus may derive a reference sample based on a neighboring sample of the current block, and may derive the prediction sample of the current block based on the reference sample and an intra prediction mode of the current block. The reference samples may include top reference samples and left reference samples of the current block. For example, in case that the size of the current block is N×N, and an x component and a y component of a top-left sample position of the current block are 0, respectively, the left reference samples may be p[4][0] to p[4][2N−1], and the top reference samples may be p[0][−1] to p[2N−1][−1].

The decoding apparatus obtains residual information of a residual coding syntax for the current block derived based on the TSRC enabled flag (S1640). For example, the decoding apparatus may obtain the residual information of the residual coding syntax for the current block derived based on the TSRC enabled flag. The image information may include the residual information. For example, the decoding apparatus may derive the residual coding syntax for the current block based on the TSRC enabled flag. For example, the decoding apparatus may derive the residual coding syntax for the current block as one of a regular residual coding (RRC) syntax and a transform skip residual coding (TSRC) syntax based on the TSRC enabled flag. The RRC syntax may represent a syntax according to the RRC, and the TSRC syntax may represent a syntax according to the TSRC.

For example, based on the TSRC enabled flag having the value of 1, the residual coding syntax for the current block may be derived as the regular residual coding (RRC) syntax. In this case, the residual information may be residual information of the RRC syntax. That is, the decoding apparatus may obtain the residual information of the RRC syntax for the current block. For example, in case that the current block is the transform skip block, and the value of the TSRC enabled flag is 1, the residual information may be the residual information of the regular residual coding (RRC) syntax. In this case, for example, the transform skip flag for whether the current block is the transform skip block may be obtained, and the value of the transform skip flag may be 1. For example, the image information may include the transform skip flag for the current block. The transform skip flag may represent whether the current block is the transform skip block. That is, the transform skip flag may represent whether the transform has been applied to the transform coefficients of the current block. The syntax element representing the transform skip flag may be the transform_skip_flag as described above. For example, if the value of the transform skip flag is 1, the transform skip flag may represent that the transform has not been applied to the current block (i.e., transform skipped), whereas if the value of the transform skip flag is 0, the transform skip flag may represent that the transform has been applied to the current block. For example, if the current block is the transform skip block, the value of the transform skip flag for the current block may be 1. Meanwhile, the transform skip flag may be obtained in case that the value of the transform skip enabled flag is 1.

For example, the residual information of the RRC syntax may include syntax elements disclosed in Table 2 described above. For example, the residual information of the RRC syntax may include the syntax elements for the transform coefficients of the current block. Here, the transform coefficient may be represented as a residual coefficient.

For example, the syntax elements may include syntax elements, such as last_sig_coeff_x_prefix, last_sig_coeff_y_prefix, last_sig_coeff_x_suffix, last_sig_coeff_y_suffix, sb_coded_flag, sig_coeff_flag, par_level_flag, abs_level_gtX_flag (e.g., abs_level_gtx_flag[n][0] and/or abs_level_gtx_flag[n][1]), abs_remainder, dec_abs_level, and/or coef_f_sign_flag.

Specifically, for example, the syntax elements may include position information representing the position of the last non-zero transform coefficient in a residual coefficient array of the current block. That is, the syntax elements may include the position information representing the position of the last non-zero transform coefficient in the scanning order of the current block. The position information may include information representing a prefix in a column position of the last non-zero transform coefficient, information representing a prefix in a row position of the last non-zero transform coefficient, information representing a suffix of the column position of the last non-zero transform coefficient, and information representing a suffix in the row position of the last non-zero transform coefficient. The syntax elements for the position information may be last_sig_coeff_x_prefix, last_sig_coeff_y_prefix, last_sig_coeff_x_suffix, and last_sig_coeff_y_suffix. Meanwhile, the non-zero transform coefficient may be called a significant coefficient.

Further, for example, the syntax elements may include a coded subblock flag representing whether the current subblock of the current block includes the non-zero transform coefficient, a significant coefficient flag representing whether the transform coefficient of the current block is the non-zero transform coefficient, a first coefficient level flag for whether the coefficient level for the transform coefficient is larger than a first threshold value, a parity level flag for a parity of the coefficient level, and/or a second coefficient level flag for whether the coefficient level of the transform coefficient is larger than a second threshold value. Here, the coded subblock flag may be the sb_coded_flag or coded_sub_block_flag, the significant coefficient flag may be the sig_coeff_flag, the first coefficient level flag may be the abs_level_gt1_flag or the abs_level_gtx_flag, the parity level flag may be the par_level_flag, and the second coefficient level flag may be the abs_level_gt3_flag or the abs_level_gtx_flag.

Further, for example, the syntax elements may include coefficient value related information for the transform coefficient value of the current block. The coefficient value related information may be an abs remainder and/or a dec_abs_level.

Further, for example, the syntax elements may include a sign flag representing the sign of the transform coefficient. The sign flag may be the coeff_sign_flag.

Further, for example, based on the TSRC enabled flag having the value of 0, the residual coding syntax for the current block may be derived as the transform skip residual coding (TSRC) syntax. In this case, the residual information may be residual information of the transform skip residual coding (TSRC) syntax. That is, the decoding apparatus may obtain the residual information of the TSRC syntax for the current block. Further, for example, the transform skip flag for whether the current block is the transform skip block may be obtained, and based on the transform skip flag having the value of 1 and the TSRC enabled flag having the value of 0, the residual coding syntax for the current block may be derived as the transform skip residual coding (TSRC) syntax. In this case, the residual information may be residual information of the TSRC syntax. Further, for example, the transform skip flag for whether the current block is the transform skip block may be obtained, and based on the transform skip flag having the value of 0 and the TSRC enabled flag having the value of 0, the residual coding syntax for the current block may be derived as the regular residual coding (RRC) syntax. In this case, the residual information may be residual information of the RRC syntax.

For example, the residual information of the TSRC syntax may include syntax elements disclosed in Table 3 described above. For example, the residual information of the TSRC syntax may include the syntax elements for the transform coefficients of the current block. Here, the transform coefficient may be represented as a residual coefficient.

For example, the syntax elements may include context-coded syntax elements for the transform coefficient and/or bypass-coded syntax elements. The syntax elements may include the syntax elements, such as sig_coeff_flag, coeff_sign_flag, par_level_flag, abs_level_gtX_flag (e.g., abs_level_gtx_flag[n] [0], abs_level_gtx_flag [n] [1], abs_level_gtx_flag [n][2], abs_level_gtx_flag [n][3], and/or abs_level_gtx_flag[n][4]), abs_remainder, and/or coeff_sign_flag.

For example, the context-coded syntax elements for the transform coefficient may include a significant coefficient flag representing whether the transform coefficient is the non-zero transform coefficient, a sign flag representing the sign for the transform coefficient, a first coefficient level flag for whether the coefficient level for the transform coefficient is larger than a first threshold value, and/or a parity level flag for the parity of the transform level for the transform coefficient. Further, for example, the context-coded syntax elements may include a second coefficient level flag for whether the coefficient level of the transform coefficient Further, for example, the context-coded syntax elements may include a second coefficient level flag for whether the coefficient level of the transform coefficient is larger than a second threshold value, a third coefficient level flag for whether the coefficient level of the transform coefficient is larger than a third threshold value, a fourth coefficient level flag for whether the coefficient level of the transform coefficient is larger than a fourth threshold value, and/or a fifth coefficient level flag for whether the coefficient level of the transform coefficient is larger than a fifth threshold value. Here, the significant coefficient flag may be the sig_coeff_flag, the sign flag may be the ceff_sign_flag, the first coefficient level flag may be the abs_level_gt1_flag, and the parity level flag may be the par_level_flag. Further, the second coefficient level flag may be the abs_level_gt3_flag or the abs_level_gtx_flag, the third coefficient level flag may be the abs_level_gt5_flag or the abs_level_gtx_flag, the fourth coefficient level flag may be the abs_level_gt7_flag or the abs_level_gtx_flag, and the fifth coefficient level flag may be the abs_level_gt9_flag or the abs_level_gtx_flag.

Further, for example, the bypass-coded syntax elements for the transform coefficient may include coefficient level information for the value of the transform coefficient (or coefficient level) and/or a sign flag representing the sign for the transform coefficient. The coefficient level information may be the abs_remainder and/or the dec_abs_level, and the sign flag may be the ceff_sign_flag.

The decoding apparatus derives the residual sample of the current block based on the residual information (S1650). For example, the decoding apparatus may derive the transform coefficients of the current block based on the residual information, and may derive the residual samples of the current block based on the transform coefficients.

For example, the decoding apparatus may derive the transform coefficients of the current block based on the syntax elements of the residual information. Thereafter, the decoding apparatus may derive the residual samples of the current block based on the transform coefficients. As an example, if it is derived that the transform is not applied for the current block based on the transform skip flag, that is, if the value of the transform skip flag is 1, the decoding apparatus may derive the transform coefficients as the residual samples of the current block. Further, for example, if it is derived that the transform is not applied for the current block based on the transform skip flag, that is, if the value of the transform skip flag is 1, the decoding apparatus may derive the residual samples of the current block by dequantizing the transform coefficients. Further, for example, if it is derived that the transform is applied for the current block based on the transform skip flag, that is, if the value of the transform skip flag is 0, the decoding apparatus may derive the residual samples of the current block by performing inverse transform of the transform coefficients. Further, for example, if it is derived that the transform is applied for the current block based on the transform skip flag, that is, if the value of the transform skip flag is 0, the decoding apparatus may derive the residual samples of the current block by dequantizing the transform coefficients and performing inverse transform of the dequantized transform coefficients.

Meanwhile, in case that the dependent quantization is applied for the current block, the decoding apparatus may derive the residual samples of the current block by performing the dependent quantization process for the transform coefficients. For example, in case that the dependent quantization is applied for the current block, the decoding apparatus may update the state (Qstate) for the dependent quantization based on the coefficient level of the transform coefficient just before the current transform coefficient in the scanning order, may derive the coefficient level of the current transform coefficient based on the updated state and the syntax elements for the current transform coefficient, and may derive the residual sample by dequantizing the derived coefficient level. For example, the current transform coefficient may be dequantized based on the quantization parameter for a reconstructed level of the current transform coefficient in a scalar quantizer for the updated state. Here, the reconstructed level may be derived based on the syntax elements for the current transform coefficient.

The decoding apparatus generates a reconstructed picture based on the prediction sample and the residual sample (S1660). For example, the decoding apparatus may generate the reconstructed sample and/or reconstructed picture of the current block based on the prediction sample and the residual sample. For example, the decoding apparatus may generate the reconstructed sample through addition of the prediction sample and the residual sample to each other.

Thereafter, as needed, in order to enhance the subjective/objective picture quality, an in-loop filtering procedure, such as deblocking filtering, SAO and/or ALF procedure, may be applied to the reconstructed picture as described above.

Figure 17:
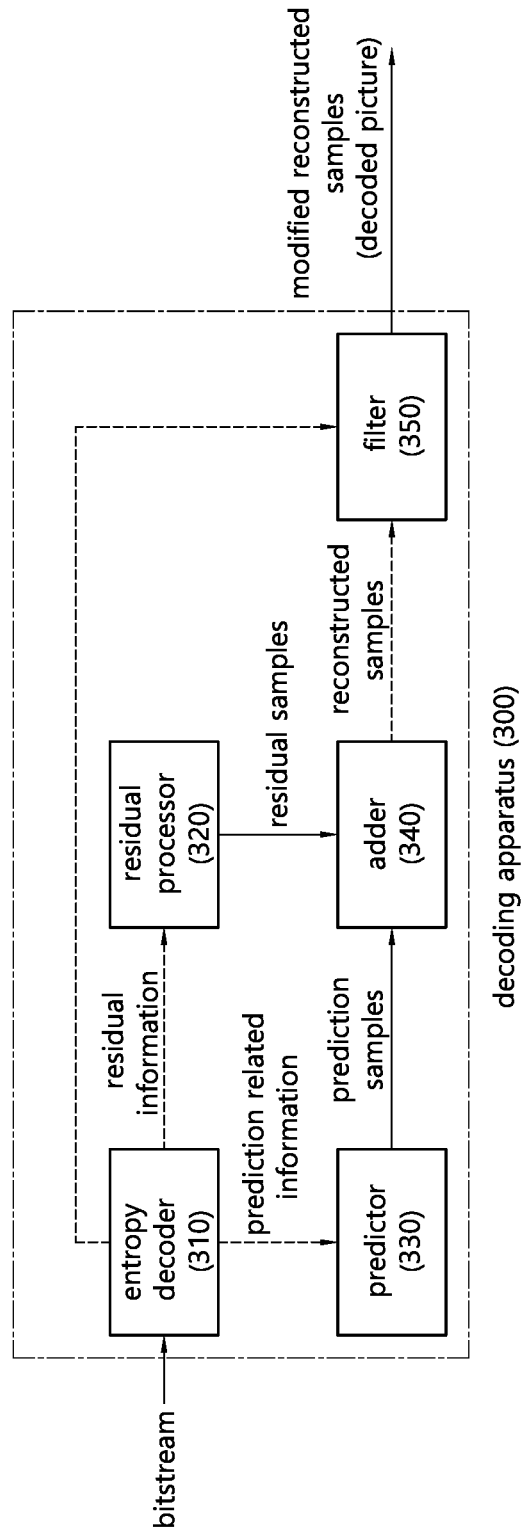
FIG. 17 briefly illustrates a decoding apparatus for performing an image decoding method according to the present disclosure.

FIG. 17 briefly illustrates a decoding apparatus for performing an image decoding method according to the present disclosure. The method disclosed in FIG. 16 may be performed by the decoding apparatus disclosed in FIG. 17. Specifically, for example, the entropy decoder of the decoding apparatus of FIG. 17 may perform S1600 to S1620, and S1640 of FIG. 16, the predictor of the decoding apparatus of FIG. 17 may perform S1630 of FIG. 16, the residual processor of the decoding apparatus of FIG. 17 may perform S1650 of FIG. 16, and the adder of the decoding apparatus of FIG. 17 may perform S1660 of FIG. 16.

According to the present disclosure, the residual coding efficiency can be enhanced.

Further, according to the present disclosure, the signaling relationship between the dependent quantization enabled flag and the TSRC enabled flag can be established, and if the dependent quantization is not enabled, the TSRC enabled flag can be signaled, and through this, if the TSRC is not enabled and then the RRC syntax is coded for the transform skip block, the dependent quantization is not to be used, so that the coding efficiency can be improved, and the overall residual coding efficiency can be improved through the reduction of the amount of bits being coded.

Further, according to the present disclosure, the signaling relationship between the transform skip enabled flag and the TSRC enabled flag can be established, and if the transform skip is enabled, the TSRC enabled flag can be signaled, and through this, the overall residual coding efficiency can be improved through the reduction of the amount of bits being coded.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 18:
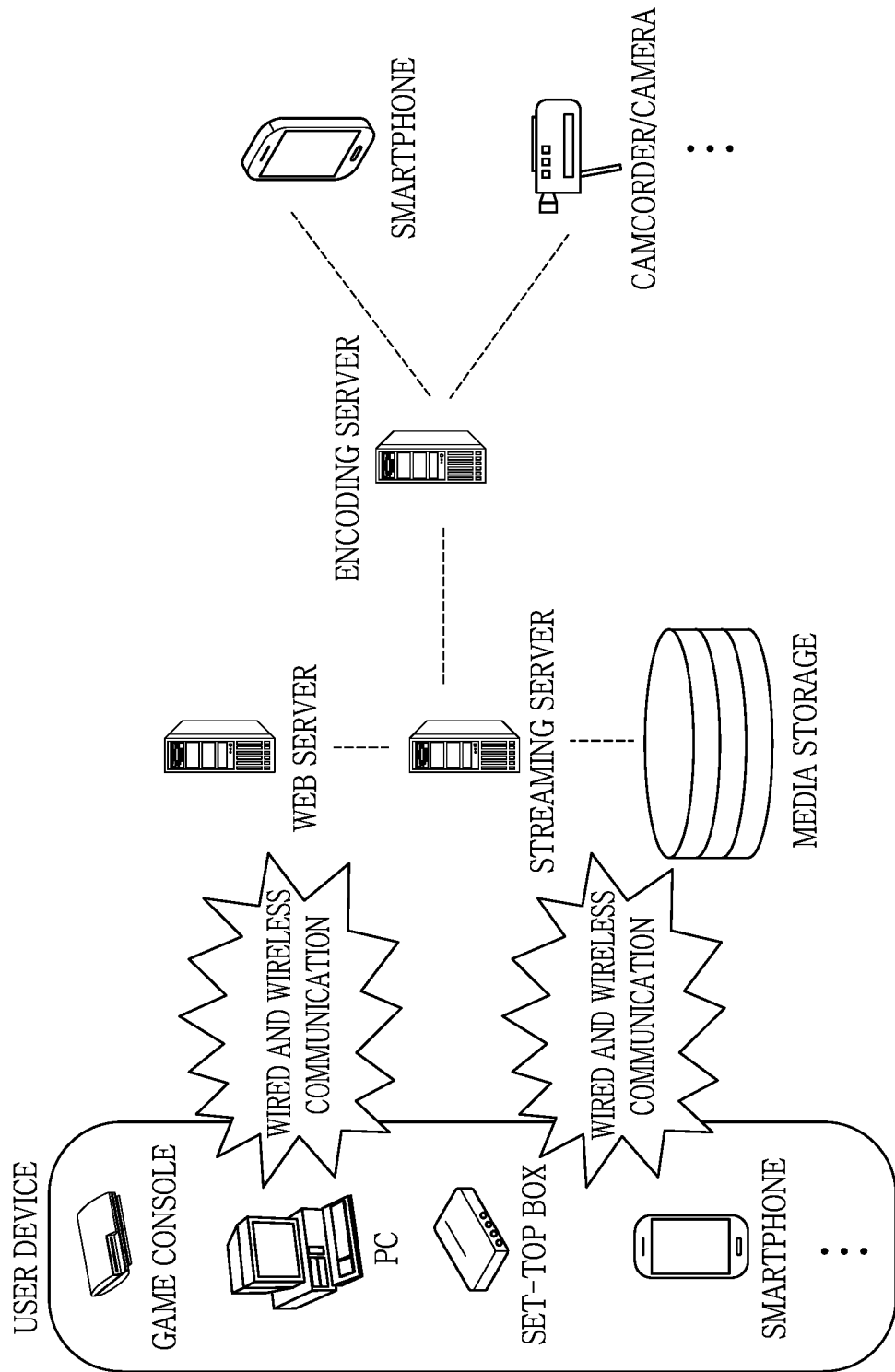
FIG. 18 illustrates a structural diagram of a contents streaming system to which the present disclosure is applied.

FIG. 18 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
obtaining a transform skip enabled flag from a bitstream;
obtaining a dependent quantization enabled flag from the bitstream;
obtaining prediction related information for a current block from the bitstream;
deriving a prediction sample of the current block based on the prediction related information;
obtaining, based on a value of a transform skip residual coding (TSRC) disabled flag, residual information for the current block from the bitstream;
deriving a residual sample of the current block based on the residual information; and
generating a reconstructed picture based on the prediction sample and the residual sample,
wherein the transform skip enabled flag is information for whether transform skip is enabled,
wherein the dependent quantization enabled flag is information for whether dependent quantization is used,
wherein the TSRC disabled flag is information for whether TSRC is used,
wherein, in the case of i) the transform skip enabled flag indicating that the transform skip is enabled and ii) the dependent quantization enabled flag indicating that the dependent quantization is not used, the value of the TSRC disabled flag is obtained from the bitstream, and
wherein, in the case of i) the transform skip enabled flag indicating that the transform skip is enabled and ii) the dependent quantization enabled flag indicating that the dependent quantization is used, the value of the TSRC disabled flag is not obtained from the bitstream, the value of the TSRC disabled flag is inferred as 0, and the TSRC is used for a transform skip block.

2. The image decoding method of claim 1, wherein the residual information for the current block is obtained from a regular residual coding (RRC) syntax in response to the value of the TSRC disabled flag being equal to 1.

3. The image decoding method of claim 2, wherein a transform skip flag for whether the transform skip is applied to the current block is obtained from the bitstream in response to a value of the transform skip enabled flag being equal to 1.

4. The image decoding method of claim 2, wherein the residual information for the current block is obtained from a TSRC syntax in response to the value of the TSRC disabled flag being equal to 0.

5. The image decoding method of claim 1, wherein the dependent quantization enabled flag and the TSRC disabled flag are signaled through the same syntax.

6. The image decoding method of claim 5, wherein the transform skip enabled flag is signaled through a sequence parameter set (SPS) syntax, and
wherein both the dependent quantization enabled flag and the TSRC disabled flag are signaled through a slice header syntax.

7. An image encoding method performed by an encoding apparatus, the method comprising:
deriving a prediction sample of a current block based on inter prediction or intra prediction;
deriving a residual sample of the current block based on the prediction sample;
encoding prediction related information for the current block;
encoding a transform skip enabled flag for whether transform skip is enabled, a dependent quantization enabled flag for whether dependent quantization is used;
encoding, based on a value of a transform skip residual coding (TSRC) disabled flag for whether TSRC is used, residual information for the residual sample; and
generating a bitstream including the prediction related information, the transform skip enabled flag and the residual information,
wherein the TSRC disabled flag is encoded into the bitstream in the case of i) the transform skip enabled flag indicating that the transform skip is enabled and ii) the dependent quantization enabled flag indicating that the dependent quantization is not used, and
wherein, in the case of i) the transform skip enabled flag indicating that the transform skip is enabled and ii) the dependent quantization enabled flag indicating that the dependent quantization is used, the value of the TSRC disabled flag is not encoded into the bitstream, the value of the TSRC disabled flag is inferred as 0, and the TSRC is used for a transform skip block.

8. The image encoding method of claim 7, wherein the residual information for the current block is encoded into a regular residual coding (RRC) syntax in response to the value of the TSRC disabled flag being equal to 1.

9. The image encoding method of claim 8, wherein the residual information for the current block is encoded into a TSRC syntax in response to the value of the TSRC disabled flag being equal to 0.

10. The image encoding method of claim 7, wherein the transform skip enabled flag is signaled through a sequence parameter set (SPS) syntax, and
wherein both the dependent quantization enabled flag and the TSRC disabled flag are signaled through a slice header syntax.

11. A method for transmitting data for image information, comprising:
generating a bitstream for the image information, wherein the bitstream is generated based on deriving a prediction sample of a current block based on inter prediction or intra prediction, deriving a residual sample of the current block based on the prediction sample, encoding prediction related information for the current block, encoding a transform skip enabled flag for whether transform skip is enabled, a dependent quantization enabled flag for whether dependent quantization is used, encoding, based on a value of a transform skip residual coding (TSRC) disabled flag for whether TSRC is used, residual information for the residual sample and generating the bitstream including the prediction related information, the transform skip enabled flag and the residual information; and transmitting the data including the bitstream, wherein the TSRC disabled flag is encoded into the bitstream in the case of i) the transform skip enabled flag indicating that the transform skip is enabled and ii) the dependent quantization enabled flag indicating that the dependent quantization is not used, and wherein, in the case of i) the transform skip enabled flag indicating that the transform skip is enabled and ii) the dependent quantization enabled flag indicating that the dependent quantization is used, the value of the TSRC disabled flag is not encoded into the bitstream, the value of the TSRC disabled flag is inferred as 0, and the TSRC is used for a transform skip block.

\* \* \* \* \*